(12) United States Patent
Yasuda et al.

(10) Patent No.: US 7,104,607 B2
(45) Date of Patent: Sep. 12, 2006

(54) SEAT

(75) Inventors: Eiichi Yasuda, Owariasahi (JP);
Shun'ichi Doi, Takamatsu (JP);
Kazukata Takei, Nishikamo-gun (JP);
Kiyokazu Sunami, Tajimi (JP);
Etsunori Fujita, Hiroshima (JP); Yumi Ogura, Hiroshima (JP); Seiji Kawasaki, Hiroshima (JP); Kazuyoshi Chizuka, Hiroshima (JP); Yasuhide Takata, Hiroshima (JP)

(73) Assignees: Kabushiki Kaisha Toyota Chuo Kenkyusho, Aichi-gun (JP); Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/949,758

(22) Filed: Sep. 27, 2004

(65) Prior Publication Data

US 2005/0093352 A1    May 5, 2005

(30) Foreign Application Priority Data

Sep. 29, 2003 (JP) ............................... 2003-337621
Aug. 26, 2004 (JP) ............................... 2004-246177

(51) Int. Cl.
*B60N 2/02* (2006.01)

(52) U.S. Cl. ............................... 297/354.1; 297/354.11; 297/345.12; 297/230.1; 297/285; 297/299

(58) Field of Classification Search ............ 297/354.1, 297/354.11, 354.12, 230.1, 289, 290, 285
See application file for complete search history.

(56) References Cited

U.S. PATENT DOCUMENTS

| 3,938,858 | A | * | 2/1976 | Drabert et al. ........... 297/284.4 |
| 4,157,203 | A | * | 6/1979 | Ambasz ................... 297/300.5 |
| 4,291,916 | A | * | 9/1981 | Chardon .................... 297/367 |
| 4,703,974 | A | * | 11/1987 | Brauning ................... 297/285 |
| 4,869,552 | A | * | 9/1989 | Tolleson et al. ............ 297/296 |
| 6,213,549 | B1 | * | 4/2001 | Wieclawski ............ 297/216.13 |
| 6,478,379 | B1 | * | 11/2002 | Ambasz ................. 297/354.11 |

FOREIGN PATENT DOCUMENTS

| JP | 11-32865 | 2/1999 |
| JP | 11-115594 | 4/1999 |

* cited by examiner

*Primary Examiner*—Peter M. Cuomo
*Assistant Examiner*—Erika Garrett
(74) *Attorney, Agent, or Firm*—Oblon, Spivak, McClelland, Maier & Neustadt, P.C.

(57) ABSTRACT

This present invention discloses a seat, comprising: a seat cushion; and a seat back frame connected to the seat cushion, the seat back frames being bent in a range of specified bending angle in a direction of moving the top end backward by a backward load over a predetermined value, by way of a joint provided at an intermediate portion in the vertical direction, such that the seat back frame receives a reaction force corresponding to the bending angle.

6 Claims, 39 Drawing Sheets

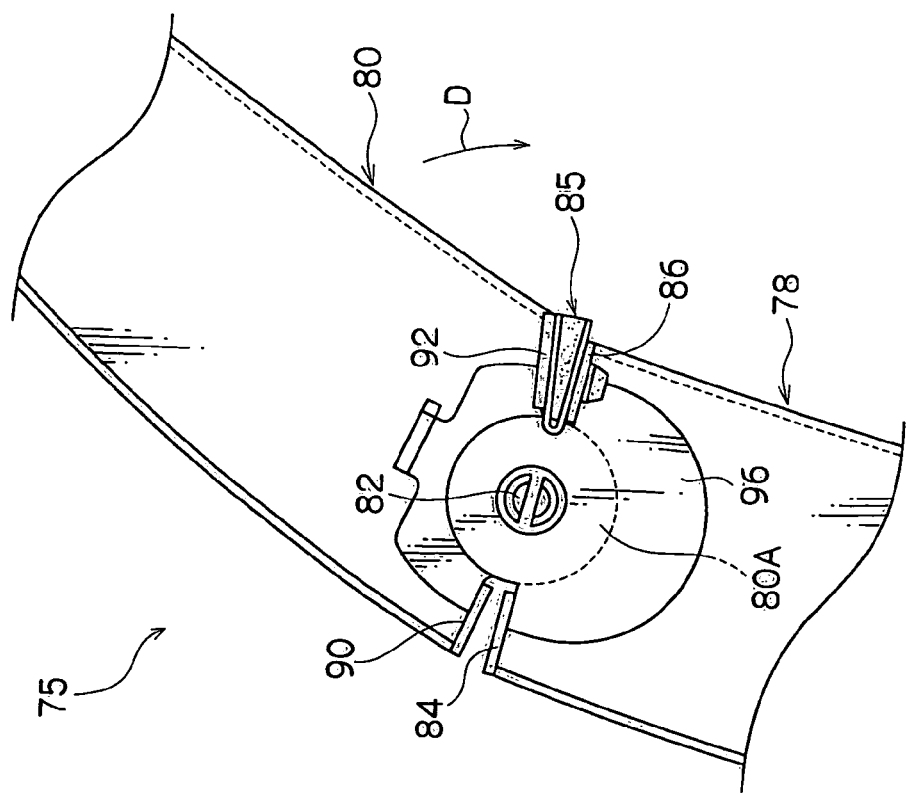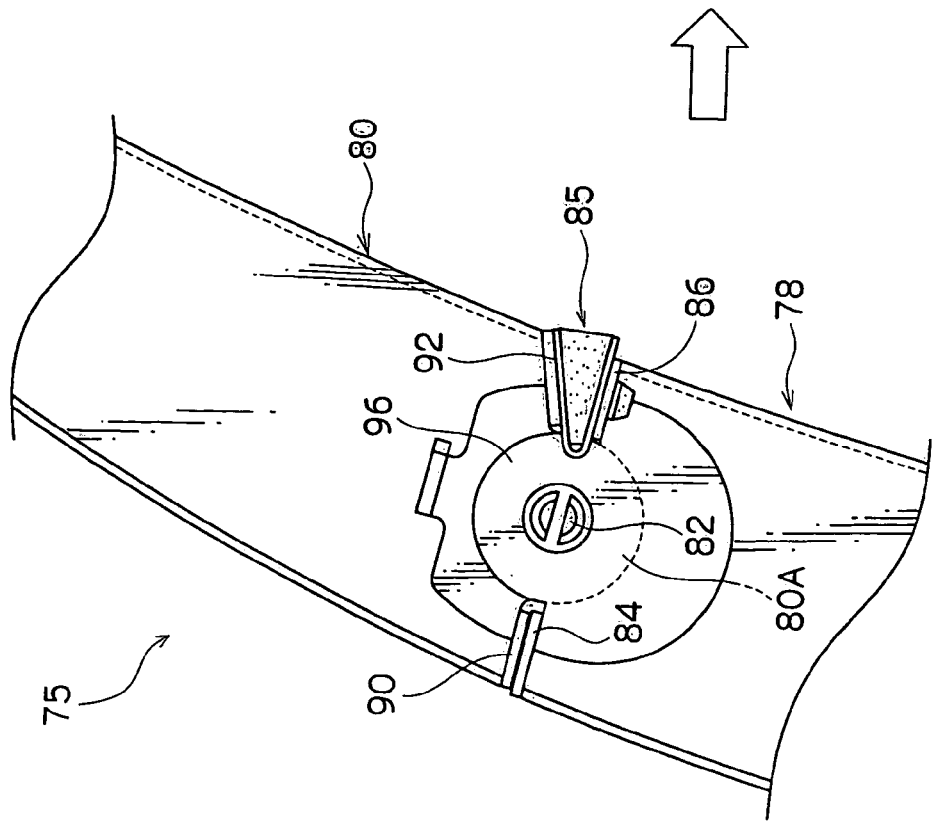

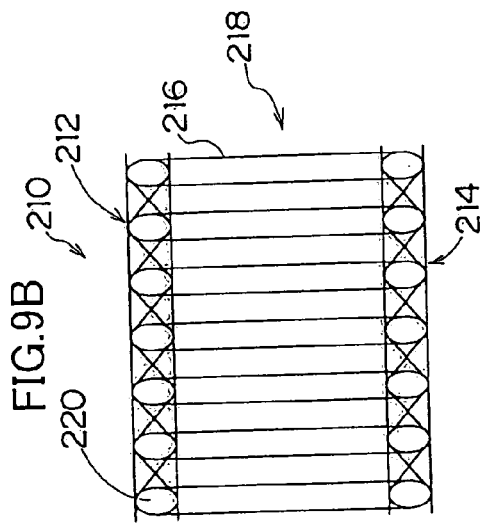
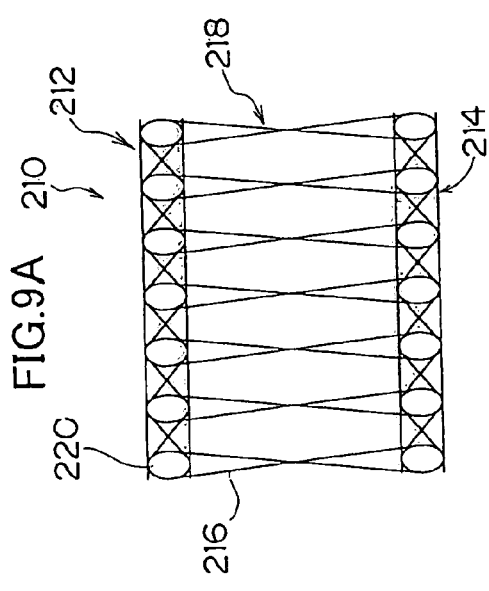
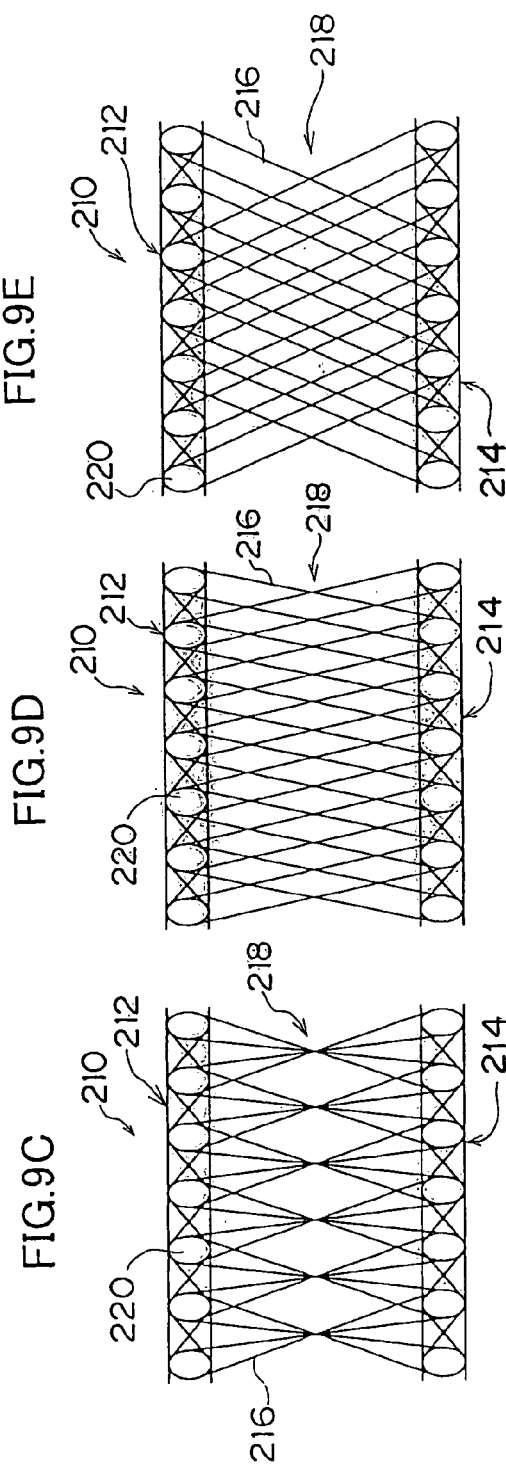

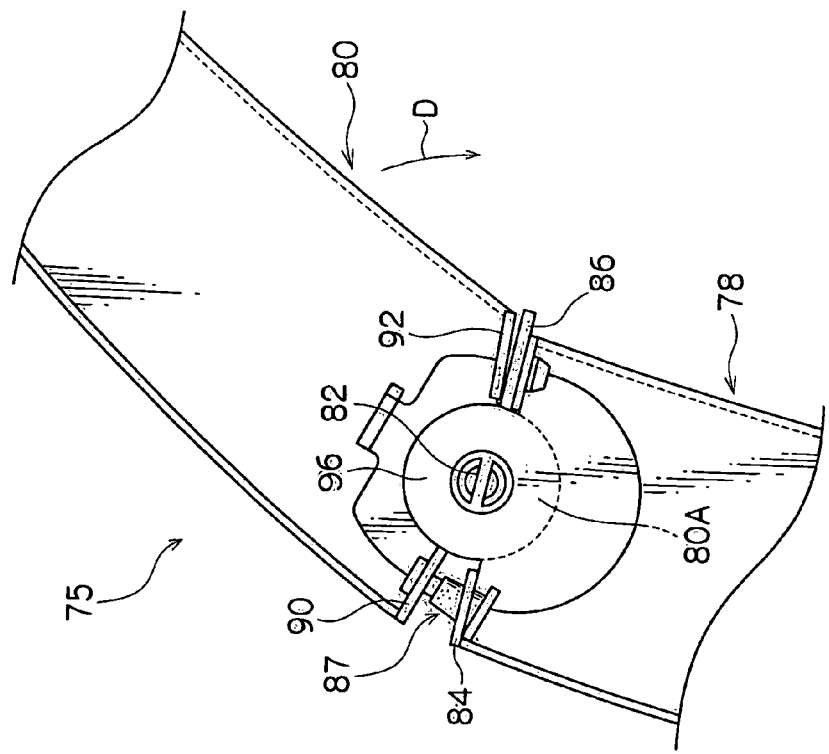
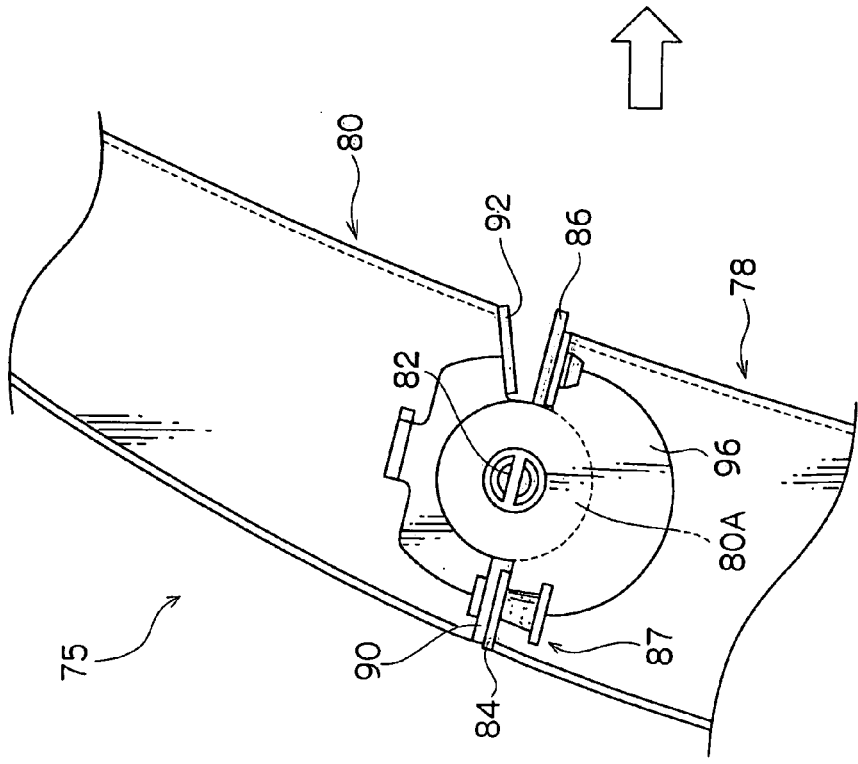

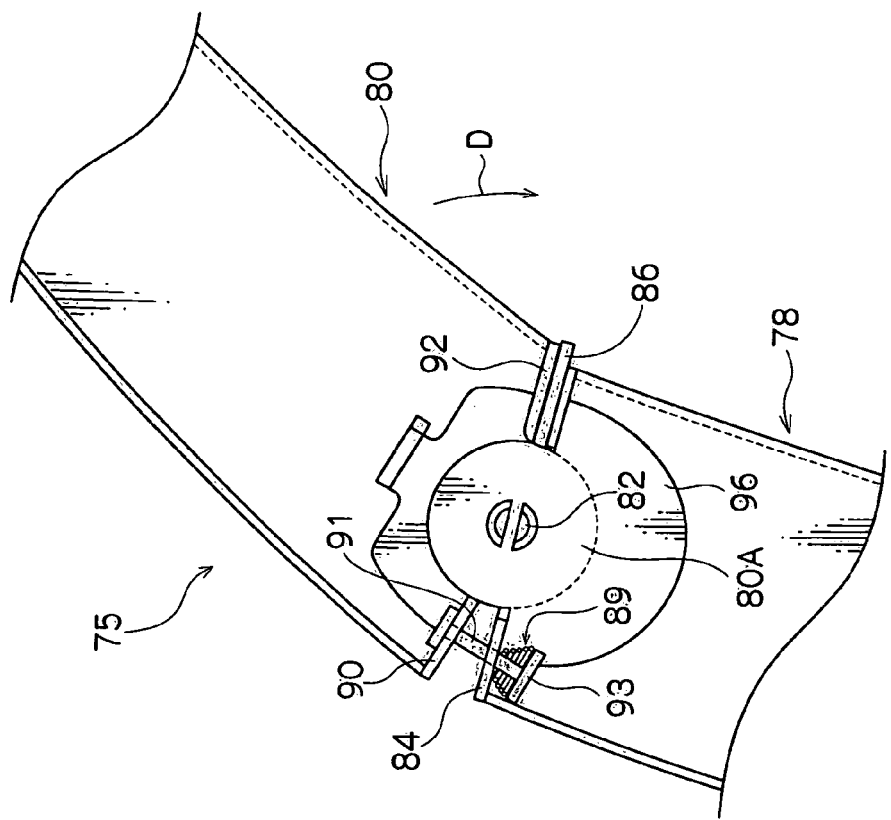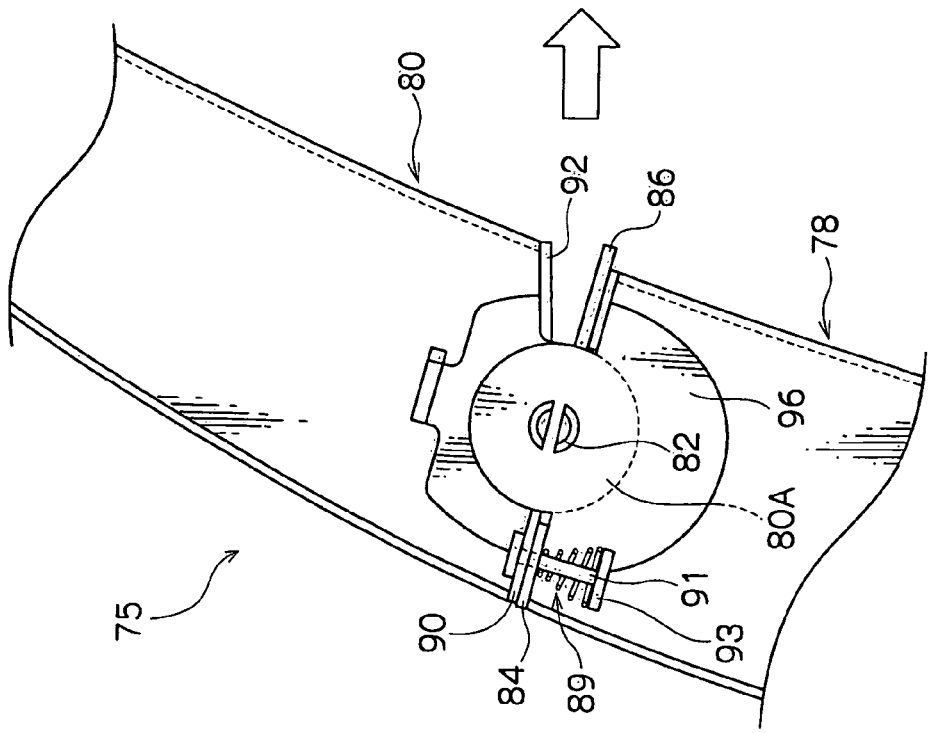

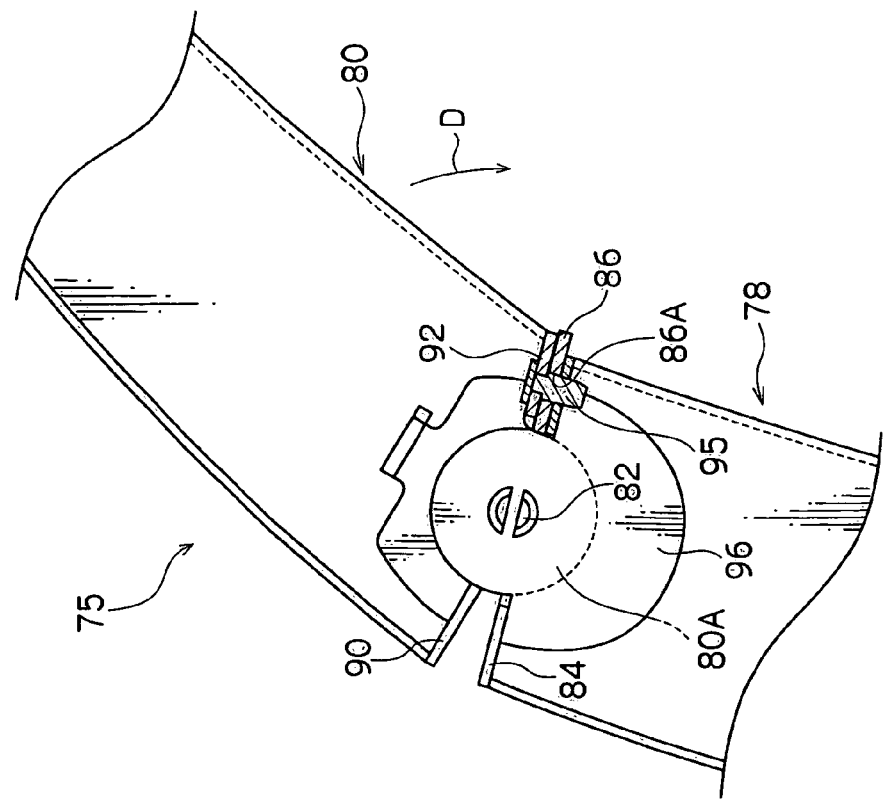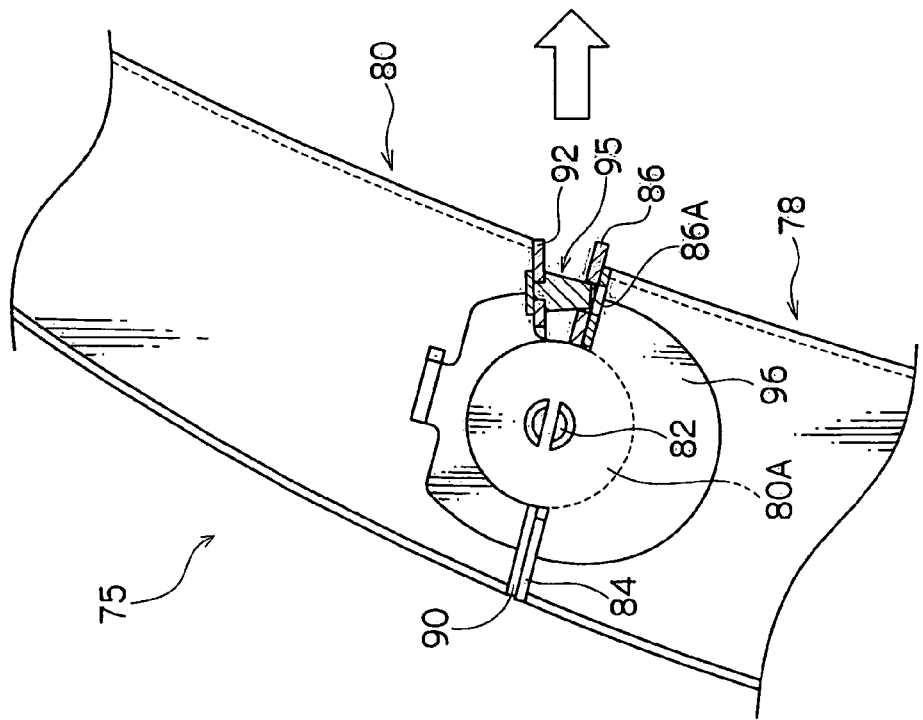

SEAT

CROSS-REFERENCE TO RELATED APPLICATION

This application claims priority under 35 USC 119 from Japanese Patent Applications Nos. 2003-337621, 2004-246177, the disclosures of which are incorporated by reference herein.

BACKGROUND OF THE INVENTION

1. Field of the Invention

The present invention relates to a seat and more specifically to a seat such as a vehicle seat loaded on a vehicle.

2. Description of the Related Art

Conventionally, the vehicle seat loaded on a vehicle such as automobile has been modified in various ways in order to protect passengers when a collision occurs (see, for example, Japanese Patent Application Laid-Open (JP-A) No. H6-1174 and JP-A No. H11-115594).

JP-A No. H6-1174 has described a vehicle safety seat in which reinforcement members are provided in the vehicle widthwise direction at the proximal end on the side of seat cushion in a seat back, in consideration of a collision from sideway of a vehicle. According to this vehicle safety seat, when a collision occurs from sideway of a vehicle, the reinforcement members transmit an impact load received from a side of the vehicle to a side end portion on an opposite side thereof, preventing a seat from being deformed to secure a space for a passenger.

JP-A No. H9-272368 has described a vehicle seat in which the cushion (back rest) of a seat back or the seat back itself can be moved backward substantially in parallel with the seat cushion, that is, a vehicle body. According to this vehicle seat, when a collision occurs from backward of a vehicle, the cushion of a seat back or the seat back itself is moved backward substantially in parallel while its impact absorbing material is being deformed, so as to absorb an impact in conditions in which a passenger is supported securely on the seat back.

JP-A No. H11-278128 has disclosed a vehicle seat in which a cross member in which an inner pipe is inserted slidably is provided in a stretched manner over a pair of right and left outer pairs, cantilevered by each of right and left side frames at a bottom between right and left side frames which constitutes a seat back frame.

In this vehicle seat, if a seat occupant is pressed against the seat back at the time of a collision from backward, the cross member deflects backward significantly while maintaining a state in which each outer pipe is connected to the inner pipe, so as to absorb an impact at a large stroke. For the reason, the stiffness of the side frame does not need to be reduced to guarantee the displacement of the cross member backward and therefore, the stiffness of the seat back frame can be secured.

JP-A No. H11-32865 has disclosed a seat back frame structure in which a connecting member which is formed in a shape of inverted letter U open downward for connecting right and left vertical frames on the seat back frame is provided and a connecting portion in the connecting member to the vertical frame is formed in a flat portion which deforms by a collision load.

With this structure, when a collision load is inputted to the seat back frame at the time of a collision, the flat portion of the connecting member deforms to reduce the impact load acting on a seat occupant and at the same time, preventing generation of a bending destruction in the vertical frame.

JP-A No. H11-115594 has disclosed a vehicle seat in which a brittle portion is provided in the middle portion in the front-rear direction of a lower arm to whose rear end a seat back is connected and when a vehicle collision occurs, the brittle portion of the lower arm deforms to tilt the seat back backward. That is, with this structure, the seat back entirely tilts backward when the vehicle collision occurs.

Further, for example, JP-A No. 2000-185582 and JP-A No. 2003-25891 have disclosed a seat in which upon a collision, the head rest automatically moves relative to the seat back in order to suppress the moving of the head portion of a seat occupant, thereby reducing disasters of whiplash of the passenger.

JP-A No. 2000-185582 has disclosed an automobile seat in which a head rest mounting portion is provided on the top end portion of an impact receiving frame fixed on the top side pipe of a seat back frame. According to this automobile seat, when a seat occupant is pressed against the seat back upon a collision, a portion under the top side pipe of the impact receiving frame moves backward while the top side pipe is twisted and then, the head rest mounting portion is directed forward, so that the head rest automatically moves to the side of the head portion (forward) of the seat occupant.

JP-A No. 2000-325179 has disclosed a vehicle seat structure in which a head rest moving frame disposed within the seat back is supported by the seat back frame through a link mechanism. According to this vehicle seat structure, when the waist portion of a seat occupant presses a strap member stretched on the bottom of the head rest moving frame backward, this pressing direction is converted by the link mechanism so that the head rest moves upward and forward linearly.

Adopting this link mechanism has realized such a structure in which the head rest is moved only by a necessary amount by receiving a load from the waist portion whose timing of applying a load of the seat occupant on the seat back is earlier than the breast portion.

JP-A No. 2003-25891 has described a vehicle seat in which paired right and left side frames, which constitute the seat back frame, comprise: "side frame uppers" (side frame upper portions) whose top ends are each supported movably in the vertical direction relative to a vehicle body while a head rest is fixed thereon; and "side frame lowers" (side frame lower portions) whose bottom ends are supported rotatably relative to the vehicle body, and the side frame upper and the side frame lower are connected rotatably to the vehicle body at the front side of a virtual straight line which connects up and down supporting points.

Further, cloth member having cushion characteristic is provided in a stretched manner over this seat back frame.

According to this vehicle seat, when the seat occupant presses the cloth member backward upon a collision from backward, the side frame upper and side frame lower rotate relative to each other in a direction for increasing an angle formed between the both, moving the head rest upward and forward.

However, in the composition described in the above JP-A No. H6-1174, only securing a space for a passenger at the time of a collision is considered and a collision from backward is not considered. Further, according to the structure described in JP-A No. H9-272368, because the seat back cushion or seat back itself is moved backward substantially in parallel, there is a fear that the moving stroke is likely to be limited and if the stroke is small, the impact energy cannot be absorbed sufficiently (a load acting on the passenger increases in energy absorption process).

Further, according to the structure disclosed in JP-A No. H11-278128, because the stiffness of the seat back frame is high and the impact energy is absorbed by only deformation of the cross member, there is a fear that the load acting on the seat occupant may not be dissipated in the energy absorption process and concentrated on the waist portion of the passenger. The configuration disclosed in JP-A No. H11-32865 can generate the same problem.

Because there is a tendency that the head portion of the passenger tilts backward (moves) with a delay from the upper body, unless a sufficient energy is absorbed from the passenger at the initial period of the collision, the remaining energy tending to move the head portion backward increases, so that protecting the head portion sufficiently becomes difficult. Thus, to protect the head portion sufficiently at the time of a collision from backward, the energy of the upper body needs to be absorbed sufficiently in the seat back and thus, the seat needs to follow up changes in posture (load) of the passenger with a passage of time and dissipate the load acting on the passenger. However, this point has not been considered in JP-A No. 2000-185582 to JP-A No. 2003-25891.

More specifically, in the respective configurations of JP-A No. 2000-185582 and JP-A No. 2000-325179, the seat back frame formed in the shape of inverted letter U, which is open downward and whose bottom end portion is connected with a reinforcement member or a lower frame has a high stiffness and its impact absorbing frame or head rest moving frame which permits only a displacement due to twisting of the top side piep or pulling of the tension spring does not provide a sufficient impact absorption stroke and thus, the impact energy of a seat occupant cannot be absorbed sufficiently prior to restriction of the moving of the head portion by the head rest.

Further, according to the configuration of JP-A No. 2003-25891, because the backward moving of the top end of the side frame upper is restricted although the seat back frame is constituted of the side frame upper and side frame lower, which are connected to each other rotatably, the impact energy trying to move the passenger backward cannot be absorbed sufficiently. Further, because this configuration supports the top end of the side frame upper relative to a vehicle body, this cannot be applied to for example, front seats of the vehicle.

SUMMARY OF THE INVENTION

The present invention aims at providing a seat capable of effectively absorbing an impact applied to a seat occupant, in consideration of the above-described facts.

To achieve the above-described object, according to a first aspect of the invention, there is provided a seat, comprising: a seat cushion; and a seat back frame connected to the seat cushion, the seat back frame being adapted to bend in a range of specific bending angle in a direction of moving a top end thereof backward by a backward load over a predetermined value, by way of a joint provided at an intermediate portion in the vertical direction, such that the seat back frame receives a reaction force corresponding to the bending angle.

According to the seat of this first aspect, when a backward directed load over a predetermined value is inputted from for example, a seat occupant, the seat back frame is bent (folded) at a joint located in the middle portion in the vertical direction so that the top end thereof moves backward (backward in a downward direction) and receives a reaction force corresponding to this bending angle. Thus, when a collision from backward occurs in a vehicle which this seat is applied to, a stroke (range of specified bending angles allowed by the joint) created by the folding of the seat back frame due to a load inputted to the seat back from the seat occupant absorbs an impact force acting on the upper body of the seat occupant.

At this time, the waist portion of the seat occupant is held by a portion lower than the joint of the seat back frame and prevented from tilting backward. Consequently, both the legs are prevented from being raised by tilting of the upper body backward together with a portion above the joint of the seat back frame. Further, because the impact on the seat occupant is absorbed effectively, the performance for protecting the head portion is improved.

A requirement is satisfied if at least one pair (right and left) of the joints of the seat back frame is provided and it is permissible to provide plural joints at different positions in the height direction. Further, a reaction force generated accompanied by folding of the seat back frame is a force based on an elastic force (restoring force), dampening force, friction force or a combination of parts or all of these forces.

According to a second aspect of the invention, the seat back frame comprises: a lower frame connected to the seat cushion; an upper frame whose bottom end portion is connected to a top end portion of said lower frame such that the upper frame is capable of bending in the front-rear direction by way of said joint; and a buffering member which is provided between said lower frame and upper frame and generates a reaction force in said upper frame, corresponding to an angle at which said upper frame is bent backward relative to the lower frame.

In the seat of the second aspect, the upper frame is connected to the top end of the lower frame coupled to the seat cushion through a joint rotatable around an axis line (the front-rear direction) along the vehicle width. If a load over a predetermined value is applied to the upper frame, the upper frame rotates backward (so that the top end moves backward) relative to the lower frame while receiving a reaction force of the buffering member. That is, the seat back frame is folded. Usually the seat back frame secures a sufficient stiffness by a reaction force of the buffering member and when a vehicle collision occurs, the impact energy is absorbed by the folding of the seat back frame.

To achieve the above-described object, according to a third aspect of the invention, there is provided a seat for dampening an external force when the external force is applied to a seat occupant, comprising: a frame of multi-joint structure having multiple joints whose angles can be changed; and a buffering member provided on each joint, for generating a reaction force corresponding to each joint angle, which joint angle changes in accordance with an external force.

In the seat of this aspect, the cushion material is mounted on the frame so as to constitute the seat cushion and seat back. Preferably, the cushion material is constituted to include a tension structure body to be provided in a stretched manner over the frame, particularly a three-dimensional knitted structure. This frame is a multi-joint structure having multiple (two or more) joints whose angles can be changed and each joint is supported at a predetermined angle by the buffering member or the cushion material.

Thus, if distribution of load of the seat occupant changes and exceeds a reaction force of the buffering member (and the cushion material), one or multiple joints are deformed so that the seat follows up the seat occupant. Thus, if an external force is applied so that the seat occupant is pressed against the seat (seat back), the multi-joint structure frame follows up the seat occupant and deforms, absorbing (dampening, relaxing) an impact by a reaction force of each buffering member accompanied by the deformation of each joint so as to support the seat occupant. Consequently, a load applied to the seat occupant is scattered (dispersed) to reduce the peak load. In the meantime, the reaction force generated by the buffering member is a force based on an elastic force, dampening force, friction force or a combination of parts or all of these forces.

In this way, the seat of this aspect can improve the performance of follow-up to the seat occupant (human body).

According to a fourth aspect of the invention, there is provided the seat according to the third aspect wherein, when the joint angle of a specific joint reaches a predetermined joint angle by an external force applied to said seat occupant, the joint angle of other joint connected to that joint changes so as to deform said frame and a reaction force generated in accordance with the deformation acts in the direction of restoring said frame.

In the seat of the fourth aspect, if the joint angle of the specified joint reaches a predetermined joint angle by arrangement of each joint (length of moment arm) or setting of a reaction force of the buffering member, the joint angle of other joint connected directly or indirectly to that joint changes so as to deform the frame. That is, if the joint angles of multiple joints change successively, the frame deforms with a passage of time. As a result, when an external force is applied, the seat frame absorbs the external force while supporting the seat occupant (load applied thereto) at each time corresponding to dynamic changes in load acting on the seat occupant. That is, the relation between the respective joints is determined based on the dynamic behavior (change in posture) of the seat occupant with a passage of time when the external force is applied.

Further, because the reaction force (mainly elastic force) generated by each buffering member acts in the direction of restoring the frame, the frame maintains the function for supporting the seat occupant after the external force is absorbed.

To achieve the above-described object, according to a fifth aspect of the invention, there is provided a seat comprising: a seat back frame coupled to a seat cushion; a pressure receiving portion having: a pressure receiving plate disposed at a height corresponding to a breast portion of a seat occupant; a first link mechanism which, when said pressure receiving plate is pressed backward, is deformed to allow the pressure receiving plate to move backward; a first buffering member for generating a reaction force corresponding to an amount of deformation of said first link mechanism, a displacement transmitting portion which supports said pressure receiving portion at said seat back frame and normally locates said pressure receiving plate at a first position corresponding to the height of said breast portion and when an amount of moving backward of said pressure receiving plate exceeds a predetermined value, moves to a second position above said first position with said pressure receiving portion, along a predetermined locus; and an impact absorbing head rest mechanism having: a head rest supported by said pressure receiving portion or the displacement transmitting portion and located above said seat back frame; a second link mechanism which, when said head rest is pressed backward, is deformed to allow the head rest to move backward; and a second buffering mechanism for generating a reaction force corresponding to an amount of deformation of said second link mechanism.

In the seat of the fifth aspect, the seat back is constituted by mounting the cushion material on the seat back frame. Preferably, the cushion material is constituted to include a tension structure body to be provided in a stretched manner over the seat back frame, particularly, a three-dimensional knitted structure.

In this seat, usually, the displacement transmitting portion is located at a first position and the pressure receiving plate of a pressure receiving portion supported by the seat back frame through the displacement transmitting portion is located at a position corresponding to the height of the breast portion of the seat occupant and the head rest supported by the pressure receiving portion or the displacement transmitting portion is located at a regular position corresponding to the first position.

If an impact is applied when a passenger is seated, the seat occupant is moved relatively backward (to the side of the seat back) so as to press the pressure receiving plate backward. Then, the pressure receiving plate deforms the first link mechanism (deflect an angle around the link joint) resisting a reaction force generated by the first buffering member and moves backward. Consequently, the impact applied to the seat occupant is absorbed. If the first link mechanism is a multi-joint structure having multiple joints, each joint deflects so as to absorb the impact by a reaction force.

If the amount of moving backward of the pressure receiving plate exceeds a predetermined value, the displacement transmitting portion moves to a second position above a first position along a predetermined trajectory together with the pressure receiving portion and then, the head rest supported by the displacement transmitting portion or the pressure receiving portion moves upward. Consequently, the head rest moves to the vicinity of the head portion of the seat occupant prior to moving backward of the head portion.

If the head portion of the seat occupant moves further backward and presses the head rest backward, the head rest deforms the second link mechanism resisting a reaction force generated by the second buffering member and moves backward. Consequently, the impact applied to the head portion of the seat occupant is absorbed. If the second link mechanism is of multi-joint structure having multiple joints, each joint deflects to absorb the impact by the reaction force. In this case, the respective joints are preferred to deform successively with a passage of time.

In this way, this seat has multiple link mechanisms (joints) and after energy of the upper body is absorbed by the pressure receiving portion, remaining energy acting to move the head portion backward is absorbed by the impact absorbing head rest mechanism. As a result, the seat occupant is protected from an impact acting from backward of the seat appropriately. That is, the multi-joint structure containing the seat back and head rest follows up dynamic changes of load of the seat occupant, so that the load of the seat occupant is dispersed (scattered), thereby reducing the peak value.

The seat of the fifth aspect can improve the performance of follow-up to the seat occupant (human body).

According to a sixth aspect of the invention, the head rest is supported at a portion which tilts forward when said pressure receiving plate is pressed backward.

In the seat of the sixth aspect, if the pressure receiving plate is pressed backward by the seat occupant, the head rest moves forward accompanied by the tilting forward of that supporting portion. Consequently, the head rest not only moves upward because the displacement transmitting portion moves from the first position to the second position, but also moves forward also because the first link mechanism which constitutes the pressure receiving portion is deformed (deflected in angle). As a result, the head rest approaches the head portion of the seat occupant quickly at an initial period of a collision. Thus, the seat occupant is protected from whiplash effectively.

According to a seventh aspect of the invention, there is provided the seat according to the fifth aspect or the sixth aspect, wherein said seat back frame includes a third link mechanism, the third link mechanism comprising: a lower frame coupled to said seat cushion; an upper frame whose bottom end portion is connected to the top end portion of said lower frame such that the upper frame can be rotated in the front-rear direction, the upper frame supporting said displacement transmitting portion; and a third buffering member which is provided between said lower frame and the upper frame and, when a backward load over a predetermined value is applied to said head rest or said pressure receiving portion, allows said upper frame to rotate backward relative to the lower frame while generating a reaction force.

In the seat of the seventh aspect, the seat back frame includes a third link mechanism in which the upper frame is coupled to the lower frame rotatably while a buffering member is provided between these. This seat back frame has a sufficient stiffness in the front-rear direction for normal usage condition because if a load applied to the pressure receiving portion or the head rest is less than a predetermined value, the third buffering member does not allow the upper frame to rotate relative to the lower frame.

If after the impact is absorbed, the load pressing the pressure receiving portion or the head rest further backward exceeds a predetermined value, that load acts as a moment around a coupling portion between the upper frame and the lower frame to the upper frame, so that the upper frame rotates backward relative to the lower frame. Accompanied by this rotation, the third buffering member generates a reaction force and then, a remaining impact energy acting on the seat occupant is absorbed.

In the seat of the seventh aspect, the quantity of the link mechanisms, that is, the quantity of the joints increases, preferably following up the seat occupant.

Further, because the upper frame supports the displacement transmitting portion or the head rest, the upper frame rotates backward and the head rest moves (rotates) further backward, so that in the energy absorption process, the load acting on the head portion can be reduced further.

According to an eighth aspect of the invention, there is provided the seat according to any one of the fifth to seventh aspects further comprising: a supporting plate disposed at a position corresponding to the pelvis of a seat occupant; a fourth link mechanism which, when said supporting plate is pressed backward, is deformed and rotates the supporting plate in an upwardly backward direction; and a fourth buffering member which generates a reaction force corresponding to an amount of deformation of said fourth link mechanism.

In the seat of the eighth aspect, the supporting plate is disposed at a position corresponding to the pelvis (hip) of the seat occupant and when the impact acts on, the seat occupant presses the supporting plate backward. Then, the supporting plate deforms the fourth link mechanism resisting a reaction force generated by the fourth buffering member and rotates upward in a backward direction(rotates around a link node which is a joint). Consequently, the impact acting on the lower part of the upper body of the seat occupant is absorbed. If the fourth link mechanism is of multi-joint structure having multiple joints, each joint deflects so as to absorb the impact by a reaction force. At this time, the upper part of the upper body of the seat occupant presses the pressure receiving plate and the impact is absorbed by the pressure receiving portion.

As a result, before the impact absorbing head rest mechanism acts, the impact energy moving the head portion of the seat occupant backward is reduced further, thereby preventing the seat occupant from whiplash further effectively. Further because the supporting plate deflects upward in the backward direction through a circular trajectory, a large impact absorption stroke can be secured in a smaller space as compared to a case where the seat occupant is moved backward just linearly.

According to a ninth aspect of the invention, there is provided the seat according to the eighth aspect further comprising: a tension structure body for a seat cushion, an end portion of the tension structure being fixed to a front portion of a seat cushion frame constituting said seat cushion, while the other end portion thereof being engaged with a portion which follows up a rotation of said supporting plate in said fourth link mechanism so that it is relaxed as the supporting plate rotates in an upwardly backward direction; and a tension structure body for a seat back, an end portion of the tension structure being engaged with the top end of said seat back frame, while the other end portion thereof being engaged with a portion which follows up a rotation of said supporting plate in said fourth link mechanism so that it is relaxed as the supporting plate rotates in an upwardly backward direction.

In the seat of the ninth aspect, when the impact is applied and the supporting plate rotates upward in the backward direction, the tension structure body for the seat cushion and the tension structure body for the seat back loosen because the other end portion of each follows up the rotation of the supporting plate, thereby the tension being reduced. Consequently, the load which the seat occupant receives from the seat cushion and the seat back when the impact is absorbed is reduced, so that the impact is absorbed effectively as well as it is absorbed by each link mechanism (multi-joint structure).

If an end portion of the tension structure body for the seat back is structured to engage the upper side frame constituting the third link mechanism, the tension structure body loosens further by the operation of the third link mechanism (rotation backward of the upper side frame to the lower side frame), thereby reducing the load applied to the seat occupant further.

Each tension structure body may be engaged with a portion which follows up the rotation of the supporting plate (including the supporting plate itself) or directly with the frame or indirectly engaged through an elastic member such as a spring. Each tension structure body of the ninth aspect is preferred to be a two-dimensional (plane-like) tension structure body.

According to a tenth aspect of the invention, there is provided a seat comprising: a pair of lower side frames each bottom end portion of which is attached to each of right and left ends of a seat cushion; a pair of upper left and right side frames, bottom end portions of which are coupled to the top end portions of said paired lower side frames so that the bottom end portions of the upper side frames are displacable in at least one of front-rear direction, right and left direction and rotating direction; an elastic member which is provided between said lower side frame and the upper side frame and generates a reaction force corresponding to displacement of the upper side frame with respect to the lower side frame; and a cushion material composed of a tension structure body provided in a stretched manner over said lower side frame and upper side frame.

In the seat of the tenth aspect, the bottom end portion of each of the upper side frames is coupled to the top end portion of each of the paired right and left lower side frames, through an elastic member, so that it can be displaced in the front-rear direction, right and left direction or rotation direction (or a combination of these directions). Then, a cushion material composed of tension structure body is provided in a stretched manner over the seat back frame constituted of the lower side frame, the upper side frame and the elastic member so as to form a seat back. Because each upper side frame is capable of deflecting in the above-described direction relative to the lower side frame, when a load in the front-rear direction is applied to the cushion material, the upper frame deflects corresponding to a reaction force (urging force) of the elastic member relative to the lower side frame, so that the tension of the cushion material changes.

For example, when the seat back swings in the front-rear direction due to breathing of the seat occupant, the tension of the tension structure body changes based on a displacement (deformation of the seat back frame) of the upper frame, thereby that swing being absorbed. Therefore, the load on the seat occupant in normal seating condition is reduced, improving the feeling of comfort in being seated, so that fatigue due to being seated for long hours is reduced.

In the meantime, as the tension structure body, it is preferable to adopt a three-dimensional tension structure body such as a three-dimensional knitted structure.

According to an eleventh aspect of the invention, there is provided the seat according to the tenth aspect, wherein said cushion material containing said elastic member has, as elasticity characteristic, a Duffing type non-linear characteristic in which spring constant in the vicinity of a point of equilibrium is smaller than spring constants at points other than the vicinity of the point of equilibrium.

In the seat of the eleventh aspect, the elastic characteristic of the tension structure body, which constitutes the cushion material provided in a stretched manner over the lower side frame and the upper side frame coupled to the lower side frame through an elastic member, and of the elastic member, possesses the Duffing type non-linear characteristic. In the vicinity of the point of equilibrium corresponding to a steady seating condition (without any change in load), that cushion material has a spring constant which is smaller than the spring constants except in the vicinity of the point of equilibrium.

Consequently, if a minute swing (body motion) accompanied by the breathing is inputted in the vicinity of the point of equilibrium, each upper side frame is likely to deflect relative to the lower side frame, thereby absorbing the swing securely.

On the other hand, if a relatively large external force is applied due to an impact or the like, the cushion material and the elastic member deflect largely from the point of equilibrium so that the spring constant increases, thereby preventing each upper side frame from deflecting more largely than required relative to the lower side frame.

Meanwhile, the spring constant of the eleventh aspect is given as an inclination of elastic force curve at each displacement point (differentiation by displacement of the elastic force) if the relation between the elastic force and displacement is given in the form of a three-dimensional curve or the like and can be called equivalent spring constant.

According to a twelfth aspect of the invention, there is provided the seat according to the eleventh aspect, wherein the spring constant in the vicinity of the point of equilibrium of said cushion material containing said elastic member is in a range of 0 N/mm to 49 N/mm.

In the seat of the twelfth aspect, because the spring constant of a cushion material (tension structure body) in the vicinity of the point of equilibrium is as small as 0 N/mm to 49 N/mm, in other words, the tension structure body turns to have a substantially zero spring constant in the vicinity of the point of equilibrium, if a minute swing (body motion) accompanied by the breathing is inputted in the vicinity of the point of equilibrium, each upper side frame deflects securely relative to the lower side frame as described above, thereby that swing being absorbed further securely.

Particularly because a change of load due to the body motion accompanied by the breathing is about 1%, it is preferable to set the spring constant in the vicinity of the point of equilibrium to 11.7 N/mm to 19.6 N/mm from viewpoints of stability in the vicinity of the point of equilibrium and the performance of follow-up.

According to a thirteenth aspect of the invention, there is provided a seat comprising: a seat back frame which is mounted on a seat cushion and over which a cushion material constituted of tension structure body is provided in a stretched manner; a supporting plate which is disposed at a position substantially corresponding to the pelvis of a seat occupant between right and left side frames constituting said seat back frame, the supporting plate being connected to the seat back frame such that the supporting plate is rotatable with respect to the side frame in an upwardly backward direction; and a buffering member which is provided between said supporting plate and said side frame and allows the supporting plate to rotate with respect to the side frame while generating a reaction force.

In the seat of the thirteenth aspect, the cushion material composed of the tension structure body is provided in a stretched manner over the seat back frames having a pair of the right and left side frames, so as to form the seat back. Further, there is provided the supporting plate capable of rotating upward in the backward direction relative to the side frame at a position substantially corresponding to the pelvis of a seat occupant between the right and left frames.

Thus, for example, if an impact pressing the seat occupant is pressed against the seat back, the supporting plate moves upward in the backward direction while supporting the lower part of the upper body of the seat occupant by a moving force of the seat occupant about to move upward in the backward direction along the seat back due to the impact, deforming the buffering member to absorb the impact. Because the supporting plate of the seat back deflects corresponding to (following up) the moving direction of the seat occupant so as to absorb the impact, the impact applied to the seat occupant can be absorbed effectively.

Because the supporting plate for supporting the lower part of the upper body of the seat occupant rotates drawing a circular trajectory and absorbs the impact, a larger impact absorption stroke can be secured in a smaller space as compared to a case where the seat occupant is moved backward linearly. Consequently, the peak value of an impact load applied to the seat occupant is reduced.

If the cushion material is constituted of a tension structure body of three-dimensional net structure, that cushion material has a soft characteristic against a weak impact while it has a relatively hard characteristic against a strong impact, because a load in the direction perpendicular to the tension direction is supported by the tension. Thus, the cushion material is capable of protecting the seat occupant preferably corresponding to the strength of an impact when a large impact is applied, while maintaining the function for reducing a load on the seat occupant.

According to a fourteenth aspect of the invention, there is provided a seat comprising: a seat back mounted on a seat cushion; a head rest which is provided on the top of said seat back and is capable of moving between a first position and a second position above the first position; an urging means for urging said head rest toward said second position; a holding means for holding said head rest at said first position resisting an urging force of said urging means; and a releasing means which is provided on a portion which can be pressed by a relative movement backward of the seat occupant and when it is pressed by a load over a predetermined value, moves backward so as to cancel the state in which said head rest is held by said holding means.

In the seat of the fourteenth aspect, usually, the head rest provided on the seat back is held by the holding means and located at the first position. The first position is set up at a position which does not obstructs a normal operation. On the other hand, if the releasing means provided on the seat back is pressed by a load over a predetermined value, the holding condition of the head rest by the holding means is released, so that the head reset moves to the second position by an urging force of the urging means.

For the reason, if an impact in the direction of pressing the seat occupant against the seat back is applied, the releasing means is pressed by that impact and then, the head reset moves to the second position and approaches the head portion of the seat occupant, so that the head rest restricts a moving of the head portion backward. Consequently, the seat occupant is protected from whiplash.

Because the head reset is urged to the side of the second position by the urging means, the head rest can be moved to the second position without depending on a stroke of moving backward of the releasing means. Thus, the releasing means can be disposed at any position as long as it is a portion which can be pressed by a relative moving backward of the seat occupant.

According to a fifteenth aspect of the invention, there is provided the seat according to the fourteenth aspect, wherein said releasing means is provided on the seat back.

According to a sixteenth aspect of the invention, there is provided the seat according to the fourteenth aspect, wherein said releasing means is mounted on the head rest such that the releasing means moves to the second position with said head rest and that, when pressed and moved backward, tilts forward relative to said seat back.

In the seat of the sixteenth aspect, because it tilts forward when the releasing means is pressed backward, the head rest moves forward accompanied by that forward tilting. Consequently, the head rest moves not only upward, but also forward, so that it approaches the head portion of the seat occupant at an initial period of a collision. Thus, the seat occupant is protected from whiplash effectively.

According to a seventeenth aspect of the invention, there is provided the seat according to the fifteenth aspect, wherein said releasing means includes a pressure receiving plate disposed at a height corresponding to a breast portion of the seat occupant and a buffering member provided between the pressure receiving plate and said seat back for generating a reaction force when the pressure receiving plate is pressed backward.

In the seat of the seventeenth aspect, when the pressure receiving plate of the releasing means is pressed and moved backward, the buffering member generates a reaction force. This reaction force generated when the releasing means moves backward absorbs an impact energy which moves the seat occupant backward. Thus, at least part of energy about to move the head portion backward is consumed before the head rest supports the head portion of the seat occupant thereby preventing the seat occupant from whiplash effectively.

BRIEF DESCRIPTION OF THE DRAWINGS

FIG. 5A is a diagram showing, in an enlarged manner, main portions of the vehicle seat according to the first embodiment of the invention, and more specifically, a side view of the vehicle seat in a normal condition.

FIG. 5B is a diagram showing, in an enlarged manner, main portions of the vehicle seat according to the first embodiment of the invention, and more specifically, a side view of the vehicle seat in an impact absorbing state.

FIGS. 9A–9E are schematic sectional views of main portions of the three-dimensional knitted structure as an example of application of a pile portion.

FIG. 11A is a diagram showing the first modification of the reaction force generating structure of the vehicle seat according to the first embodiment of the invention, more specifically a side view of the seat in a normal state.

FIG. 11B is a diagram showing the first modification of the reaction force generating structure of the vehicle seat according to the first embodiment of the invention, and more specifically, a side view of the seat in a state of absorbing an impact.

FIG. 12A is a diagram showing a second modification of the reaction force generating structure of the vehicle seat according to the first embodiment of the invention, and more specifically, a side view of the seat in a normal condition.

FIG. 12B is a diagram showing a second modification of the reaction force generating structure of the vehicle seat according to the first embodiment of the invention, and more specifically, a side view of the seat in a state of absorbing an impact.

FIG. 13A is a diagram showing a third modification of the reaction force generating structure of the vehicle seat according to the first embodiment of the invention, and more specifically, a side view of the seat in a normal condition.

FIG. 13B is a diagram showing a third modification of the reaction force generating structure of the vehicle seat according to the first embodiment of the invention, and more specifically, a side view of the seat in a state of absorbing an impact.

DETAILED DESCRIPTION OF THE PREFERRED EMBODIMENTS

First Embodiment

A vehicle seat 10, which is a seat according to the first embodiment of the present invention, will be described with reference to FIGS. 1 to 9A–9E. Arrows UP, LO, FR, RE, RI and LE indicated in each Figure designate forward direction (advancing direction), backward direction, upward direction, downward direction, rightward direction and leftward direction with respect to the advancing direction of a vehicle loaded with the vehicle seat 10, respectively. Hereinafter, "up", "down", "front", "rear", "left" and "right" directions will represent the aforementioned directions indicated by arrows in figures, respectively.

Figure 1:
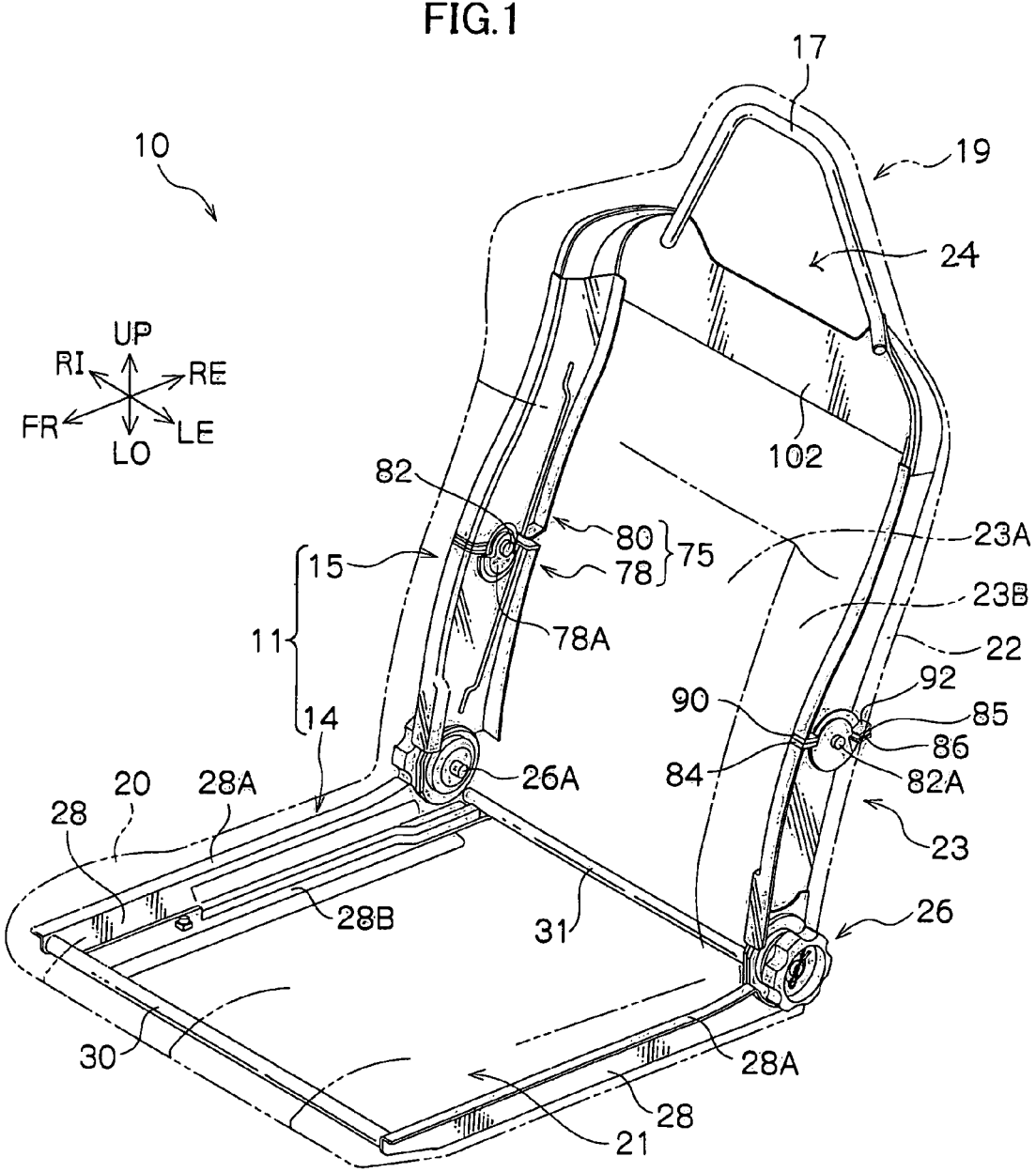
FIG. 1 is a perspective view showing the entire structure of a vehicle seat according to a first embodiment of the present invention.
Figure 2:
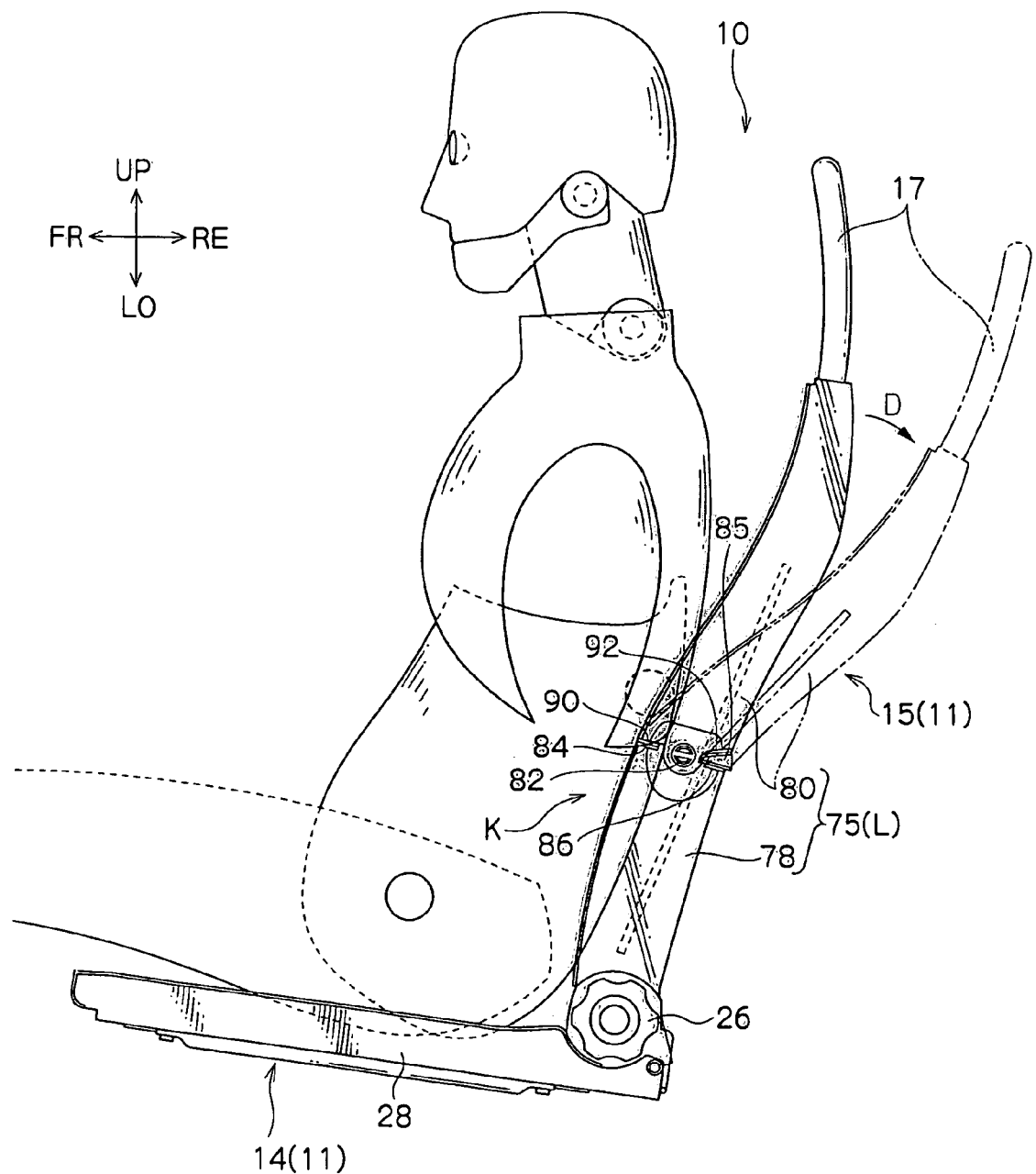
FIG. 2 is a side view of the vehicle seat according to the first embodiment of the invention.

FIG. 1 is a perspective view of the entire structure of the vehicle seat 10 and FIG. 2 is a side view of the vehicle seat 10. As shown in these Figures, the vehicle seat 10 has seat frames 11 and the seat frame 11 comprises a seating portion frame 14 which is a seat cushion frame, a back frame 15, which is a seat back frame and a head rest frame 17.

By providing the seating portion frame 14 with the cushion material 20, the seat cushion 21 is formed. By providing the back frame 15 with a back cushion material 22, the seat back 23 is formed and by providing the head rest frame 17 with a head rest cushion material 24, a head rest 19 is formed.

The seating portion frame 14 which constitutes the seat cushion 21 has a pair of right and left side frames 28, whose length is along the front-rear direction of the vehicle. The seating portion frame 14 has frame pipes 30, 31 along the right and left direction and these frame pipes 30, 31 are provided in a stretched manner between both end portions at the front and rear sides of the right and left side frames 28 in pair so as to connect the right and left side frames. Consequently, the seating portion frame 14 is formed in a rectangular shape as seen in a plan view.

In each side frame 28, flanges 28A, 28B having a predetermined width are formed at top and bottom end portions. The flange 28A located at the top end of each side frame extends outward of the seat and is provided throughout a substantially entire length in the front-rear direction. On the other hand, the flange 28B located at the bottom end of the side frame 28 extends inward of the seat and is provided in the middle portion in the front-rear direction except the front and rear ends of the side frame.

The bottom end of the back frame 15 integrated with the head rest frame 17 is connected to the rear end portion of the seating portion frame 14 described above such that it is rotatable around a supporting shaft 26A through a reclining mechanism 26, so as to construct the seat frame 11. The detailed description of the reclining mechanism 26 is omitted here. Hereinafter, the back frame 16, which is a main portion of this embodiment, will be described in detail.

As shown in FIGS. 1, 2, the back frame 15 comprises a pair of impact absorbing right and left side frames 75. Each impact absorbing side frame 75 includes each "side frame lower" (side frame lower portion) 78. Each side frame lower 78 has its length side substantially along the vertical direction and its bottom end is connected to the rear end of the seating portion frame 14 through the reclining mechanism 26. Consequently, the back frame 15 is capable of rotating around the supporting shaft 26A and can be maintained at any rotating position. These right and left side frame lowers 78 in pair constitute a lower frame of the invention.

A "side frame upper" (side frame upper portion) 80, which is an upper side frame, is connected to the top end of each side frame lower 78 and the side frame upper 80, at right and left in pair, thereby constituting a upper frame of the invention.

More specifically, a connecting portion 78A, whose central portion in the width direction along the front-rear direction protrudes semi-circularly, is formed at the top end portion of each side frame lower 78 and a connecting shaft 82 projects outward in the right and left direction from that connecting portion 78A. The connecting shafts 82 on the right and left sides are disposed substantially coaxially.

Figure 3:
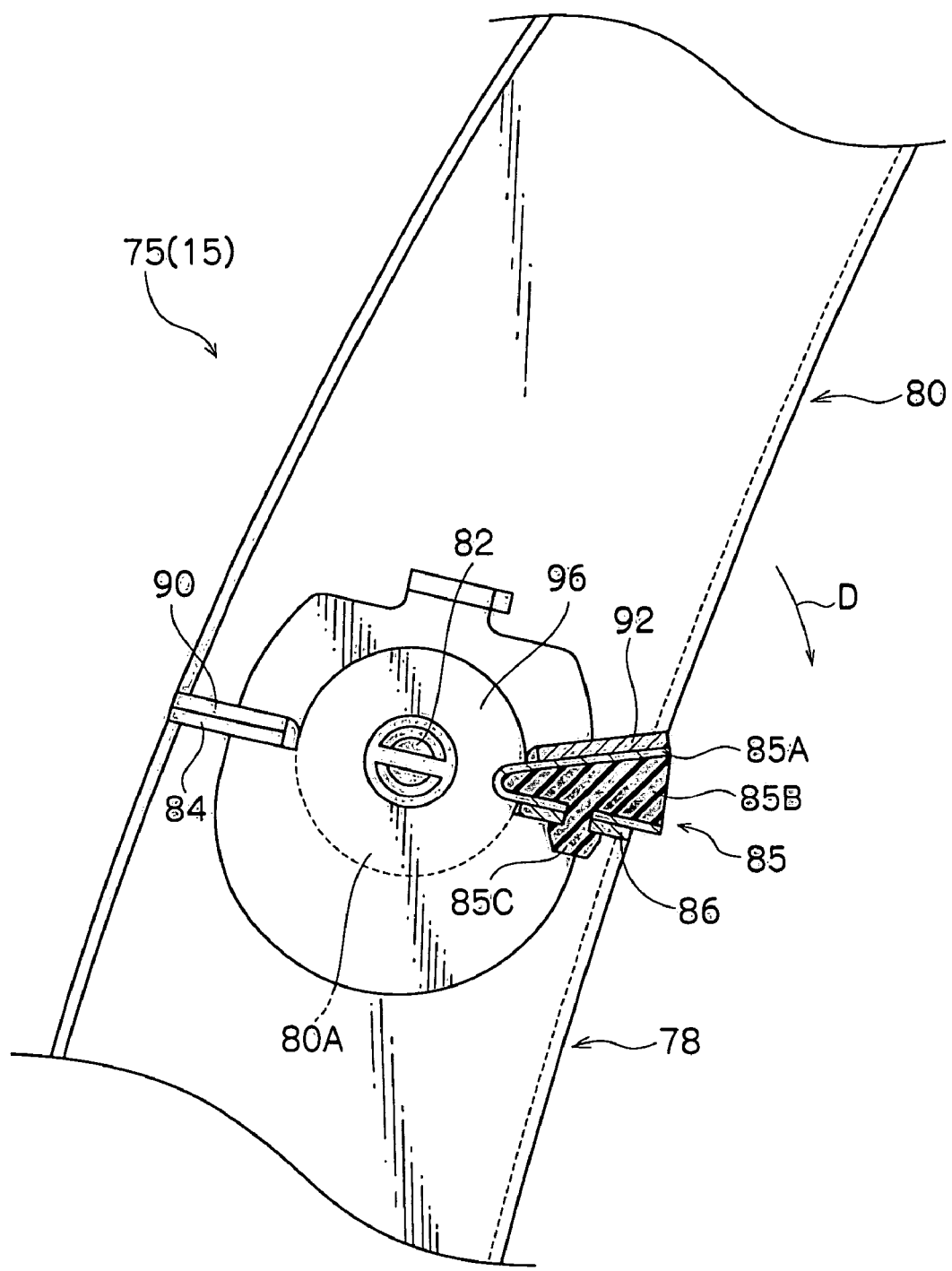
FIG. 3 is a partially broken side view showing, in an enlarged manner, main portions of the vehicle seat according to a fourth embodiment of the invention.

As shown in FIG. 3, a front side stopper portion 84 is provided on the front side to the connecting shaft 82 at the top end of each side frame lower 78 and a rear side stopper portion 86 is provided on the rear side to the connecting shaft 82. Each front side stopper portion 84 and each rear side stopper portion 86 are located on opposite sides by substantially 180° with respect to the connecting shaft 82, so that a stopper face directing substantially upward is formed.

On the other hand, each side frame upper 80 has its length direction substantially along the vertical direction and a connecting portion 80A is formed such that it protrudes semi-circularly from the central portion in the front-rear direction at each bottom end. This connecting portion 80A has a shaft hole 88 (refer to FIG. 16) corresponding to the connecting shaft 82. Further a front side stopper portion 90 is provided on the front side to the shaft hole 88 at the bottom end of each side frame upper 80 and a rear side stopper portion 92 is provided on the rear side to the shaft hole 88. The front side stopper portion 90 and the rear side stopper portion 92 are formed such that their stopper faces direct substantially downward and an angle formed upward by each stopper face shall be sufficiently smaller than 180°.

Then, each side frame upper 80 is supported by the side frame lower 78 whose connecting shaft 82 communicates with each shaft hole 88 such that it is rotatable in the front-rear direction (direction of an arrow D shown in FIG. 2 or an opposite direction to the arrow D) around the connecting shafts 82 in pair.

The bottom end of each side frame upper 80 is fixed to the connecting portion 78A and blocked from dropping from the side frame lower 78A by a holding member 96 whose top portion makes a sliding contact with the outside face of the connecting portion 80A. Further, a cross member upper 102 having its length along the right and left directions is provided in a stretched manner between the top ends of the side frame uppers 80. A head rest frame 17 is welded to this cross member upper 102.

Each impact absorbing side frame 75 (back frame 15) has a spring member 85 as its buffering member. As shown in FIG. 3, the spring member 85 is disposed between the rear side stopper portion 86 of the side frame lower 78 and the rear side stopper portion 92 of the side frame upper 80. The spring member 85 is formed in a substantially V shaped form and disposed between the rear side stopper portions 86, 92 in compressed state and a plate spring portion 85A is provided for urging the side frame upper 80 in a direction opposite to the arrow D with respect to the side frame lower 78.

Consequently, in the impact absorbing side frame 75, usually, the front side stopper portion 90 of the side frame upper 80 makes contact with the front side stopper portion 84 of the side frame lower 78.

Further, the spring member 85 includes a rubber member 85B which is formed substantially in a wedge shape as seen in its side view corresponding to the plate spring 85A and disposed between arms of the plate spring 85A (that is, between the rear side stopper portions 86 and 92). The rubber member 85B is fixed on an arm whose bottom face makes contact with the rear side stopper portion 86 of the plate spring portion 85A.

When no backward load is inputted to an impact absorbing side frame 75 as shown in FIG. 5A, the top face of the rubber member 85B is in contact with substantially entire surface of an arm on the upper side of the plate spring portion 85A. That is, if the side frame upper 80 is rotated in the direction of an arrow D, the rubber member 85B is pressed by the arm on the upper side of the plate spring 85A so that it is sandwiched by the plate spring 85A.

A mounting protrusion 85C formed integrally of rubber projects from the bottom face of the rubber member 85B. The root of the mounting protrusion 85C goes through the plate spring portion 85A and the rear side stopper portion 86 and the front end portion expanded more than the root portion engages the bottom face of the rear side stopper portion 86, so that the spring member 85 is held by the rear side stopper portion 86. In the meantime, the spring member 85, for example, the lower arm of the plate spring portion 85A may be embedded in a dent (stepped) portion provided in the rear side stopper portion 86 so that it is held by the rear side stopper portion 86.

In the back frame 15 described above, as shown in FIG. 5A, usually, the front side stopper portion 90 of each of the right and left side frame uppers 80 is pressed against the corresponding front side stopper portion 84 by an urging force in an opposite direction to the arrow D by each spring member 85, thereby securing a sufficient stiffness in normal usage condition.

On the other hand, if in the back frame 15, a backward load higher than a predetermined value is applied to the side frame upper 80, as shown in FIG. 5B, the side frame upper 80 compresses and deforms the spring member 85 while receiving an accompanying reaction force, rotating in the direction of the arrow D with respect to the side frame lower 78.

In this way, each impact absorbing side frame 75 of the back frame 15 constitutes a link mechanism L with the side frame lower 78 and the side frame upper 80 with each connecting shaft 82 acting as a joint K. The spring member 85 generates a reaction force corresponding to a change in an angle of the joint K. The installation height of the joint K is set at a position slightly higher than the waist height of a seat occupant (at a position higher than the gravity center of a passenger). The waist height of a seat occupant mentioned here is 248.2 mm on average for Japanese male adult and 243.2 mm for Japanese female adult and the average waist height of Japanese male and female adults is 245.7 mm.

A long rod-like engagement member 103, which is elongated substantially in the vertical direction, is fixed on each inner side face of the right and left side frame lowers 78 and side frame uppers 80. The rod-like engagement member 103 engages one end of a strap-like member 206 whose other end is connected to the surface skin 202 of the cushion material 22 (see FIG. 4A). Each rod-like engagement member 103 functions as a buffering member which, when the side frame upper 80 rotates in the direction of the arrow D with respect to the side frame lower 78, is bent and deformed elastically or plastically.

In the seat frame 11, as described above, the cushion material 20 is provided in a stretched manner on the seating portion frame 14 so as to constitute the seat cushion 21, the cushion material 22 is provided in a stretched manner on the back frame 15 so as to constitute the seat back 23 and then, the cushion material 24 is provided on the head rest frame 18 so as to constitute the head rest 19.

As each of the cushion materials 20, 22, 24, plane-like tensional structure is employed and according to the first embodiment, a structure in which the three-dimensional knitted structure 210 is overlaid by leather skin 202 is employed. FIGS. 1, 2, 4A, 4B show the external shape of each of the cushion materials 20, 22, 24 (external shape of the vehicle seat 10) with each skin 202.

Figure 4A:
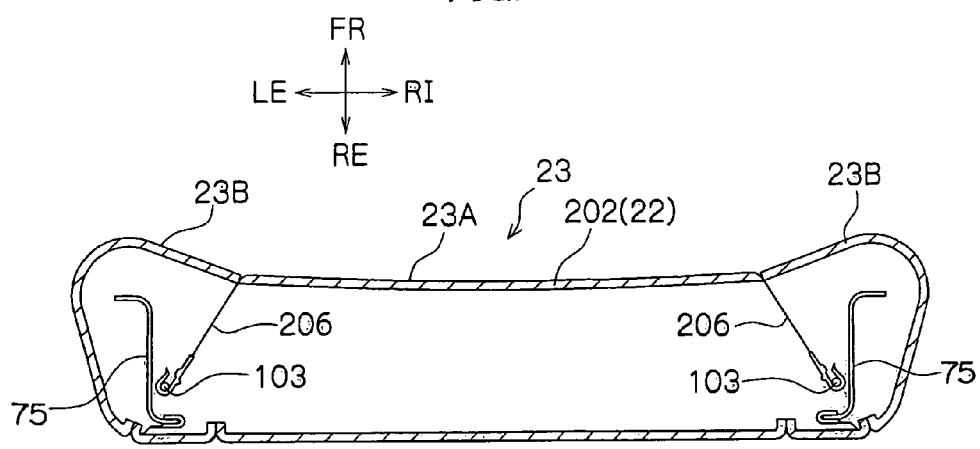
FIG. 4A is a diagram showing a state in which a cushion material constituting the vehicle seat according to the first embodiment of the invention is provided in a stretched manner, and more specifically a sectional view of the seat back.
Figure 4B:
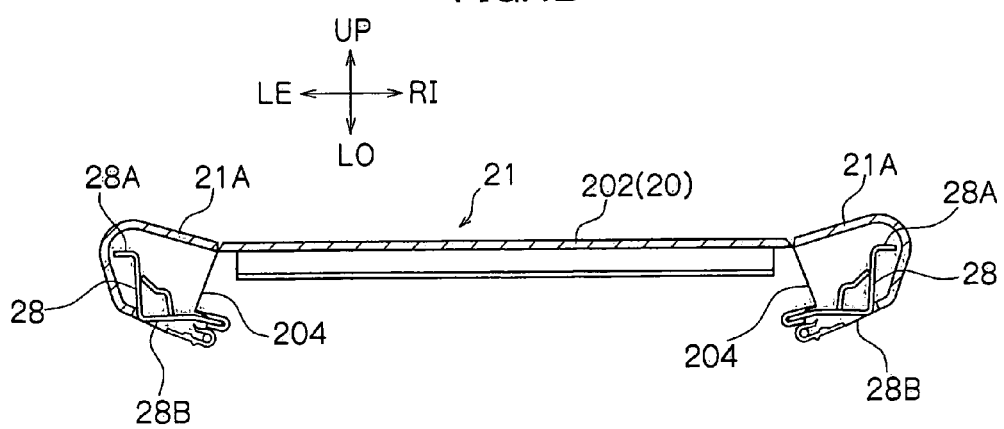
FIG. 4B is a diagram showing a state in which a cushion material constituting the vehicle seat according to the first embodiment of the invention is provided in a stretched manner, and more specifically a sectional view of the seat cushion.

As shown in FIG. 4B, in the seat cushion 21, an end portion of the strap-like member 204, whose other end portion is engaged with the side frame 28, is engaged with the vicinity of both ends in the right and left directions of the skin 202 of the cushion material 20, and the central portion in the right and left direction of the seat is dented relatively to the both ends by tension of the strap-like member 204 while bank-like side supports 21A are formed on both side ends.

Likewise, in the seat back 23 shown in FIG. 4A, an end portion of the strap-like member 206, whose other end portion is engaged with the rod-like engagement member 103, is engaged with the vicinity of both ends in the right and left direction of the skin 202 of the cushion material 22. Consequently, the central portion in the right and left direction is dented relatively to both end portions by the tension of the strap-like member 206 so as to form the back rest 23A. A bank-like side support 23B is formed on both sides of the back rest 23A.

Figure 6:
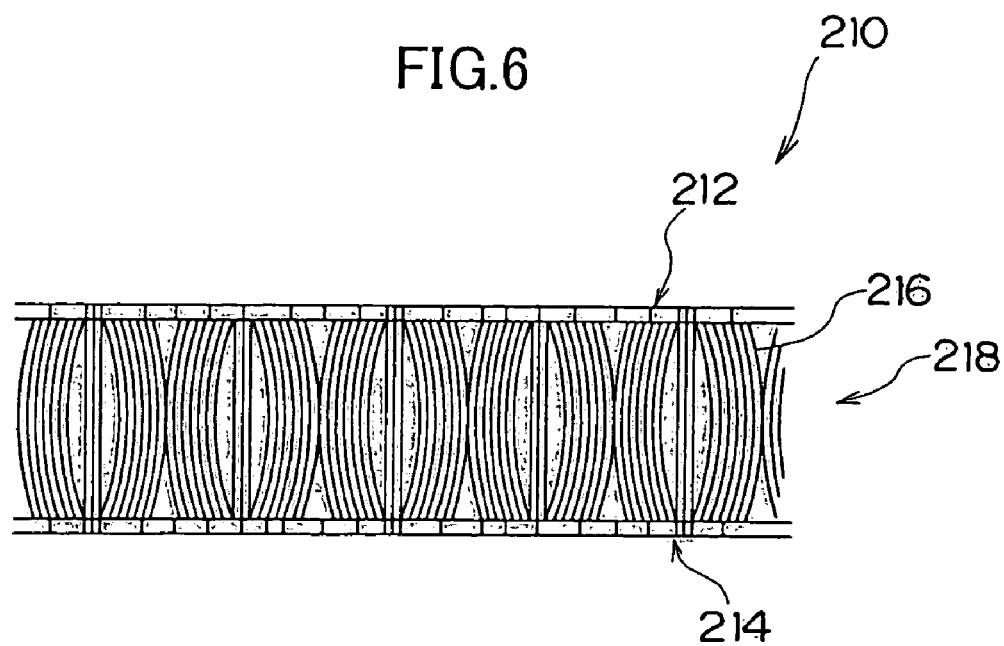
FIG. 6 is a schematic sectional view of three-dimensional knitted structure used as a cushion member.

Next, the three-dimensional knitted structure 210 which constitutes the cushion materials 20, 22, 24 will be described with a specific example. As shown in FIG. 6, the three-dimensional knitted structure 210 is composed of a pair of ground knit bases 212, 214 disposed with a space and a pile portion 218 formed of plural connecting yarns 216 which reciprocate between the ground knit bases 212 and 214 in pair so as to connect both.

Figure 7:
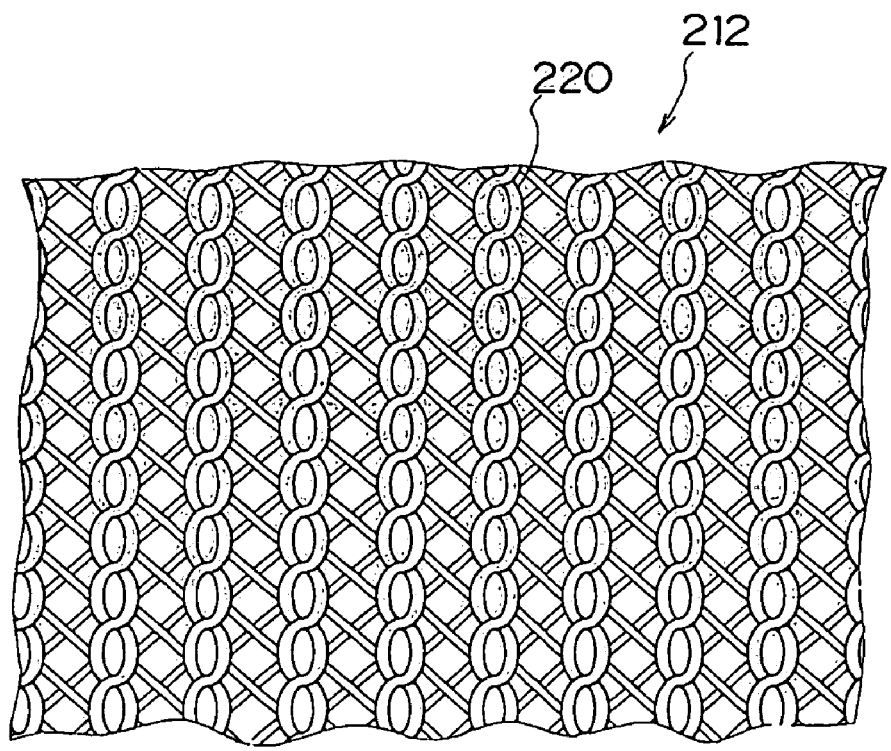
FIG. 7 is a schematic view showing an example of a ground knit fabric used in three-dimensional knitted structure.

For one ground knit fabric 212, as shown in FIG. 7, meshes are formed of thread 220 composed of twisted short fibers in the form of a flat knit organization continuous in both wale direction and course direction.

Figure 8:
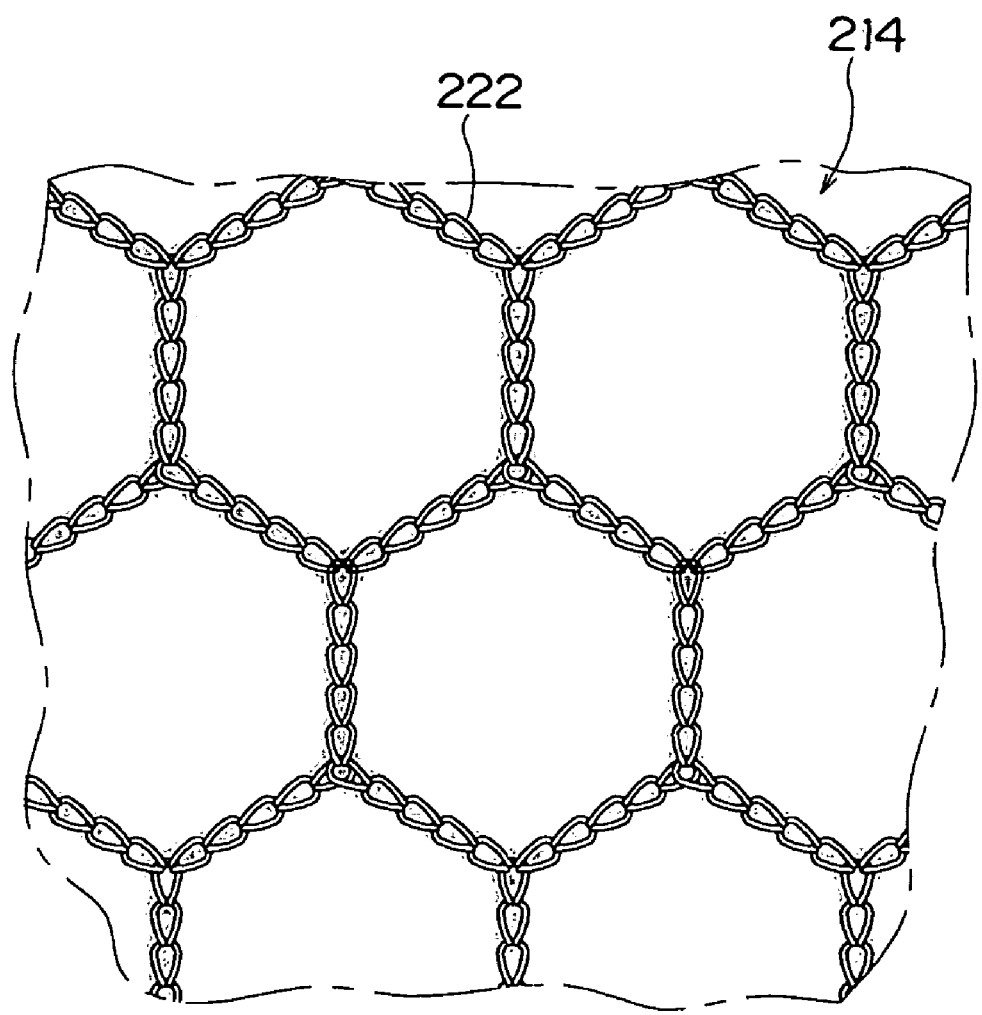
FIG. 8 is a schematic view showing an example of the other ground knit fabric used in the three-dimensional knitted structure.

For the other ground knit fabric 214, as shown in FIG. 8, honeycomb-like meshes are formed of thread composed of twisted short fibers 222. The ground knit base 214 has a larger stitch than the ground knit base 212. In the meantime, the ground knit bases 212, 214 may be formed of other mesh-like knit organization as well as of fine organization or honeycomb-like organization.

As shown in FIG. 6, the connecting yarns 216 are knit into between the ground knit bases 212 and 214 to maintain a predetermined interval of the ground knit base 212 and the other ground knit base 214 so as to form the pile portion 218. Consequently, the three-dimensional knitted structure 210 which is a mesh knit is provided with a predetermined stiffness.

The three-dimensional knitted structure 210 can be provided with a necessary strength by the size and the like of the ground yarns (yarns 220, 122) which constitute the ground knit bases 212, 214. As the ground yarns 220, 222, it is preferable to select the ones which do not make the knitting operation difficult. Although as the ground yarns 220, 222, mono-filament yarns can be used, it is permissible to use multi-filament yarns or span yarns considering taste, softness of surface tactile feeling and the like.

As the connecting yarn 216, it is preferable to use a mono-filament yarn and its size is preferred to be 167 dtex–1110 dtex. The multi-filament yarn cannot obtain a cushion performance ensuring an excellent restoring force and if its size is lower than 167 dtex, the strength of the three-dimensional knitted structure drops and if it exceeds 1110 dtex, it becomes too hard, so that no appropriate cushion performance can be obtained.

That is, by using the mono-filament yarns of 167 dtex–1110 dtex as the connecting yarns, the load of a passenger seated on a seat can be supported by not only deformation of the stitches which constitute the ground knit bases 212, 214 but also a deformation due to fall or buckling of the connecting yarns 216 which constitute the pile portion 218 and a restoring force of the adjacent connecting yarns supplying the deformed connecting yarns 216 with spring characteristic, thereby achieving a flexible structure which possesses a soft spring characteristic, not generating a concentration of stress.

It is permissible to form unevenness in the three-dimensional knitted structure 210. That is, the ground knit bases 212, 214 may be knit so as to generate unevenness in the surfaces. If such unevenness is formed, a spring element substantially arch-like in its cross section can be formed in the ground knit bases 212, 214 and therefore, a soft spring characteristic can be supplied. Consequently, a structure having an elastic compliance substantially equivalent or larger than the elastic compliance of muscle can be formed. In the meantime, the elastic compliance is computed according to (amount of distortion)/(average pressure value of a contact surface).

The materials of the ground yarns 220, 222 and the connecting yarn 216 are not particularly restricted and examples thereof include synthetic fibers, regenerated fibers such as polypropylene, polyester, polyamide, polyacrylonitrile, rayon and natural fibers such as wool, silk, cotton. These materials may be used independently or combined arbitrarily. Preferably, thermoplastic polyester base fibers represented by polyethylene terephthalate (PET), polybutylene terephthalate (PBT) or polyolefine base fibers represented by nylon 6, nylon 66 or a combination of two or more of these fibers may be used.

Further, the shapes of the ground yarns 220, 222 and the connecting yarn 216 are not limited to those described above, but it is permissible to use yarns having a circular section or irregular shape.

The pile organization of the pile portion 218, which is determined by a way for disposing the connecting yarns 216 which constitute the pile portion 218 can be classified to the kinds shown in FIGS. 9A–9E, which express the states of the connecting yarns 216 for connecting the ground knit bases 212, 214 when they are seen from the side.

FIGS. 9A, 9B indicate a straight type in which the connecting yarns 216 are knit substantially in the vertical direction between the ground knit bases 212 and 214 and FIG. 9A shows an example in which the connecting yarns are knit straight in the form of a number 8 and FIG. 9B shows an example in which they are knit simply straight.

FIGS. 9C, 9D, 9E show cross types in which the connecting yarns 216 cross halfway between the ground knit bases 212 and 214. Of these, FIG. 9C shows an example in which the connecting yarns 216 are crossed in the form of a number 8. FIG. 9D shows an example in which the connecting yarns 216 are crossed simply. FIG. 9E shows an example in which every two connecting yarns 216 are crossed (double crossed).

When the connecting yarns 216 are disposed obliquely such that they intersect each other as shown in FIGS. 9C–9E, as compared to the examples (see FIGS. 9A, 9B) in which the connecting yarns 216 are disposed substantially vertically between the ground knit bases 212 and 214, a soft spring characteristic having a high compression rate can be obtained while holding a sufficient restoring force due to the buckling strength of each connecting yarn 216.

The respective cushion materials 20, 22, 24 composed of such three-dimensional knitted structure 210 of mesh structure has a small spring characteristic, so that its damping ratio is high and a deformation following the body shape of a passenger is likely to occur and thus, its fitting performance is increased. The respective cushion materials 20, 22, 24 employing the three-dimensional knitted structure 210 includes three-dimensional tensional structure and can be supplied with a spring constant characteristic of Duffing type, which turns to substantially zero spring characteristic in the vicinity of the above-described position of equilibrium.

That is, the respective cushion materials 20, 22, 24 have the above-mentioned soft characteristic to a weak impact while a relatively hard characteristic to a strong impact. At normal time, these cushion materials keep a function for reducing a load to a seat occupant and when a strong impact is applied, supports the seat occupant preferably by limiting the move of the passenger corresponding to the magnitude of the impact.

The above-described structures of the three-dimensional knitted structure 210 are just examples and it is permissible to use such a three dimensional knitted structure of for example, mesh structure having concaves portions, grooves or the like or other knitting structure. Further, it is permissible to use a three dimensional knitted structure having a different knitting structure depending on application purpose and function. Thus, the respective cushion materials 20, 22, 24 may adopt three dimensional knitted structure 210 each having a different mesh structure.

Although the respective cushion materials 20, 22, 24 are desired to be of tension structure, it is permissible to employ a cushion composed of urethane foam instead.

Next, the operation of the first embodiment will be described.

In the vehicle seat 10 having the above-described structure, usually, the front side stopper portion 90 of the side frame upper 80 of each impact absorbing side frame 75 makes contact with the front side stopper portion 84 of a corresponding side frame lower 78 by an urging force of the spring member 85.

If a collision occurs in a vehicle loaded with this vehicle seat 10 from backward, a passenger seated in the vehicle seat 10 is moved backward of the vehicle, namely, the vehicle seat due to an impact accompanied by that collision. Then, the upper body of this passenger presses the seat back 23 backward, so that an impact load (a load over a predetermined value) acts on the right and left side frame uppers 80 through the cushion material 22. Consequently, these side frame uppers 80 rotate in the direction of the arrow D, receiving a reaction force of the spring member 85. That is, each impact absorbing side frame 75 is folded at the joint K. It has been recognized that in the first embodiment, the folding of the impact absorbing side frame 75 starts when substantially 60 msec pass after the collision occurs.

Accompanied by the folding of the impact absorbing side frame 75, a resistance force for compressing and deforming the spring member 85 acts on the side frame upper 80 (upper body of the seat occupant) as a reaction force, so as to absorb an impact energy of the passenger. Particularly, because the resistance force accompanied by the compression of the spring member 85 includes an elastic force (restoring force) resisting the compression and deformation of the plate spring portion 85A and the rubber member 85B and the damping force based on internal damping of the rubber member 85B, the impact energy is absorbed effectively in the rotation range of the side frame upper 80. Because in this impact absorbing process, the waist portion (impact load acting thereon) of the passenger is supported by the side frame lower 78, the inclination of the waist portion backward is limited.

As described above, in the vehicle seat 10, a sufficient impact absorbing stroke is created by the folding of the impact absorbing side frame 75 and the impact load acting on the seat occupant at the time of the collision is absorbed while dispersed by the reaction force generated depending on this stroke (displacement in angle). Consequently, the impact energy is dispersed at the time of the collision, so that the peak value of an impact (acceleration) acting on the breast portion and waist portion of the passenger drops remarkably, thereby reducing a damage applied to the passenger to a maximum extent.

This has been made evident through a backward collision experiment under the same condition of a conventional high stiffness seat having no joint structure at its frame. More specifically, an impact corresponding to the backward collision was entered into a vehicle model loaded with the vehicle seat 10 or the conventional seat and a synthetic acceleration (sum of accelerations in respective directions) acting on the breast portion and waist portion of a dummy figure was measured.

As a result, it has been recognized that in the vehicle seat 10, the peak value of an acceleration (that is, load) acting on the breast portion and the waist portion is reduced largely although the floor accelerations, namely, accelerations inputted to the seat upon experiment for each seat are substantially the same. As for this operation and effect, at a timing in which the acceleration on the breast portion maximizes at the time of a collision from backward (about 60 msec after the collision occurs), the side frame upper 80 begins to rotate in the direction of the arrow D, dispersing the impact energy with a large stroke.

A comparative result with a comparative seat was carried out instead of the conventional seat. In the comparative seat, the bottom end portion of the seat back is jointed to the rear end of the seat cushion rotatably and when a vehicle collides, the seat back rotates as if it falls down backward receiving a reaction force. When comparing with such a comparative seat also, it has been recognized that in the vehicle seat 10, the peak value of the impact load acting on the breast portion and waist portion is reduced.

Further, in the above-described comparative seat, a phenomenon that the waist portion of a dummy figure falls back accompanied by the rotation of the seat back backward and both its legs are raised a little after this fall of the waist portion has been recognized. Contrary to this, in case of the vehicle seat 10, the waist portion of the passenger is protected from falling down backward by the right and left side frame lowers 78 (cushion material 22 supporting the tension).

Through the above-described experiment, it has been recognized that at a time when 240 msec pass after the collision, in which the knees of the dummy figure rises most, the waist portion of the dummy figure in the vehicle seat 10 is supported by the side frame lower 78 so that the dummy is kept leaning backward and thus, the height of the leg is suppressed to a low position. Consequently, the velocity for raising the legs of the passenger accompanied by the impact absorption at the time of a collision is loosened and thus, the load acting on the legs of the passenger accompanied by the collision is suppressed to a low. That is, the lower body of the passenger is protected securely at the time of a collision.

As described above, the vehicle seat 10 of the first embodiment is capable of absorbing an impact acting on the passenger effectively. Further, because the impact energy on the upper body of the passenger is absorbed effectively, in other words, the impact energy of the head portion is consumed largely before it makes contact with the head rest 19, protection of the head portion of the passenger is improved.

(Modification of a Buffering Member)

Next, some modifications of the buffering members which are reaction force generating structures which constitute the impact absorbing side frame 75 will be exemplified.

Figure 10:
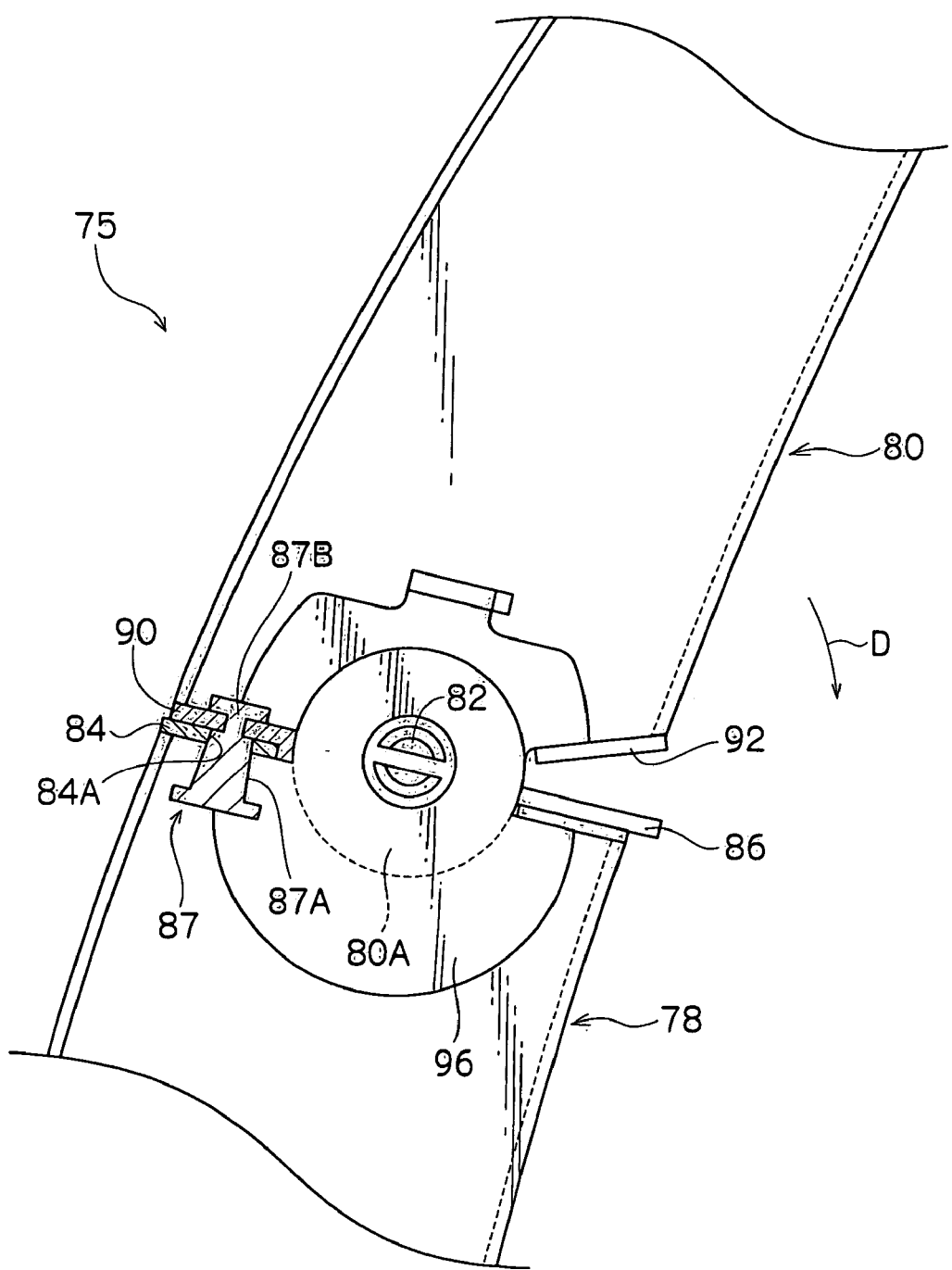
FIG. 10 is a partially broken side view, showing a first modification of the reaction force generating structure of the vehicle seat according to the first embodiment of the invention.

As shown in FIG. 10, the reaction force generating structure of the first modification includes a connecting shaft 87 instead of the spring member 85. The connecting shaft 87 has an action shaft portion 87A which is formed into a conical shape whose top end is of the smallest diameter and the top end of the thrust shaft portion 87A is fit to a fitting hole 84A provided in the front side stopper portion 84. A fixing portion 87B projecting from the top face of the front side stopper portion 84 of the connecting shaft 87 is fixed to the front side stopper portion 90 which contacts the top face of the front side stopper portion 84 by welding or the like.

Consequently, the side frame upper 80 (joint K) is so constructed not to deflect in angle in the direction of the arrow D with respect to the side frame lower 78. According to the first modification, the front side stopper portion 84 provided with the fitting hole 84A is constructed of material having a high ductility.

According to the structure of the first modification, if the side frame upper 80 rotates in the direction of the arrow D as shown in FIGS. 11A, 11B when a vehicle collides, the thrust shaft portion 87A of the connecting shaft 87 acts upon the hole wall of the fitting hole 84A in the front side stopper portion 84 so as to expand the fitting hole 84A. In this way, a load generated when the thrust shaft portion 87A of the connecting shaft 87 expands the fitting hole 84A acts as a reaction force, thereby absorbing the impact energy. According to the first modification, the reaction force of the reaction force generating portion constituted by the connecting shaft and the front side stopper portion 84 contains little restoring force and absorbs the impact energy by consumption.

As shown in FIG. 12A, the reaction force generating structure of the second modification includes a coil spring 89 instead of the spring member 85. More specifically, the top end of a supporting shaft 91 is fixed to the front side stopper portion 90 of the side frame upper 80 and the intermediate portion of the supporting shaft 91 goes through the front side stopper portion 84 of the side frame lower 78 in non-contact condition (when the side frame upper 80 deflects in angle in the direction of the arrow D or the arrow E, not to interfere with the front side stopper portion 84). A coil spring 89 is disposed between a spring seat 93 provided on the bottom of this supporting shaft 91 and the bottom face of the front side stopper portion 84 in a compression state.

With this condition, the coil spring 89 urges the side frame upper 80 in an opposite direction to the arrow D, maintaining a state in which the front side stopper portions 84, 90 keeps in contact by this urging force. Then, in the impact absorbing side frame 75, when the supporting shaft 91 and the spring seat 93 rotate in the direction of the arrow D following up the side frame upper 80, the coil spring 89 is compressed further.

Figure 37:
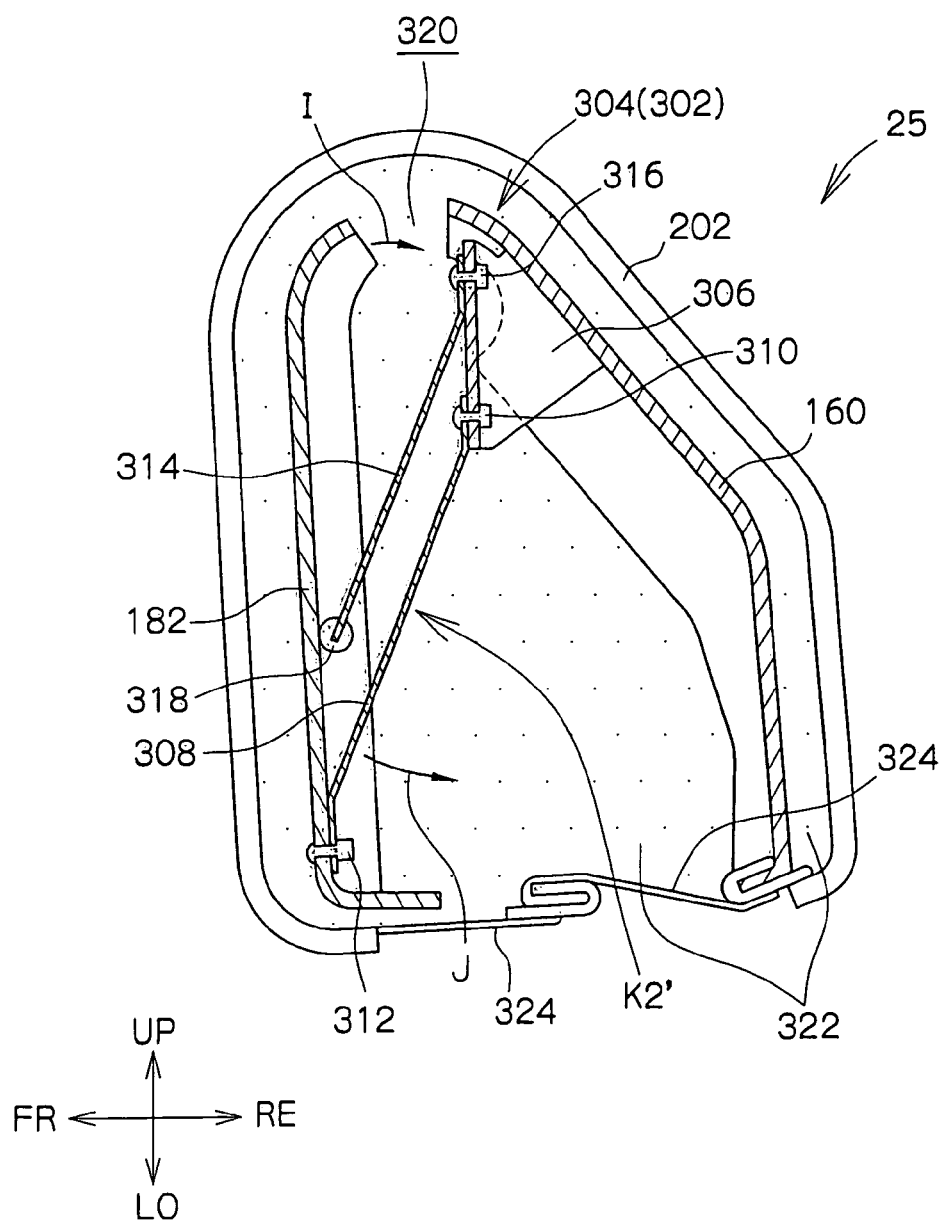
FIG. 37 is a side sectional view of the head rest which constitutes the vehicle seat according to the fourth embodiment of the invention.

Although FIG. 37 expresses the coil spring 89 as a conical coil, needless to say, the coil spring 89 may be a cylindrical coil spring.

According to the structure of the second modification, if the side frame upper 80 rotates in the direction of the arrow D as shown in FIG. 12B when a vehicle collides, a load compressing the coil spring 89 acts as a reaction force, thereby absorbing the impact energy. According to the second modification, the reaction force at this time acts as a restoring force.

As shown in FIG. 13A, the reaction force generating structure of the third modification includes a thrust protrusion 95 instead of the spring member 85. More specifically, the top end of the thrust protrusion 95 is fixed to the rear side stopper portion 92 of the side frame upper 80 and projects downward substantially in a direction perpendicular to the bottom face of the rear side stopper portion 92. The projecting portion of this thrust protrusion 95 is formed in a substantially conical shape whose bottom end has the smallest diameter.

On the other hand, a thrust hole 86A is formed in the rear side stopper portion 86 of the side frame lower 79. The thrust hole 86A has an inside diameter corresponding to the outside diameter of the bottom end of the thrust protrusion 95 and the thrust protrusion 95 has a hardness lower than the rear side stopper portion 86. When the front side stopper portions 84, 90 keep contact with each other, the front end of the thrust protrusion 95 makes contact with an edge of the thrust hole 86A, thereby restricting the rotation thereof in the direction of the arrow D. Consequently, even if the upper body of a passenger leans over the top portion of the back rest 23A when a vehicle accelerates, the side frame upper 80 does not rotate in the direction of the arrow D.

Then, when a load over a predetermined value is applied backward to the side frame upper 80 and the side frame upper 80 rotates in the direction of the arrow D, the thrust protrusion 95 is pressed into the thrust hole 86A while it rubs against the edge of the thrust hole 86A and a reaction force based on this thrust load acts on the side frame upper 80.

According to the structure of the third modification, if the side frame upper 80 rotates in the direction of the arrow D as shown in FIG. 13B when a vehicle collides, the thrust load when the edge of the thrust hole 86A rubs against the thrust protrusion 95 acts as a reaction force, thereby absorbing an impact energy.

The thrust protrusion 95 having a relatively low hardness is crushed (deformed plastically) along the thrust hole 86A, thereby consuming the impact energy for absorption. Like the first modification, it is permissible to form the rear side stopper portion 86 with a material having a high ductility and allow a reaction force to be generated when a fitting hole provided instead of the thrust hole 86A is expanded and deformed.

The above-described modifications are exemplifications and instead of the spring member 85, the connecting shaft 87 (thrust shaft portion 87A), coil spring 89 and the thrust protrusion 95, it is permissible to adopt other buffering member or reaction force generating mechanism or it is permissible to combine part of the above-mentioned buffering member with other buffering member or reaction force generating mechanism. Particularly, a structure in which the reaction force of the joint K includes a restoring force and a damping force (non-stored force) enables the impact energy to be absorbed effectively.

Second Embodiment

A vehicle seat 100 will be described as a seat according to the second embodiment of the invention with reference to FIGS. 14–27. Like reference numerals are attached to basically the same components as the vehicle seat 10 of the first embodiment and description thereof is omitted.

Figure 14:
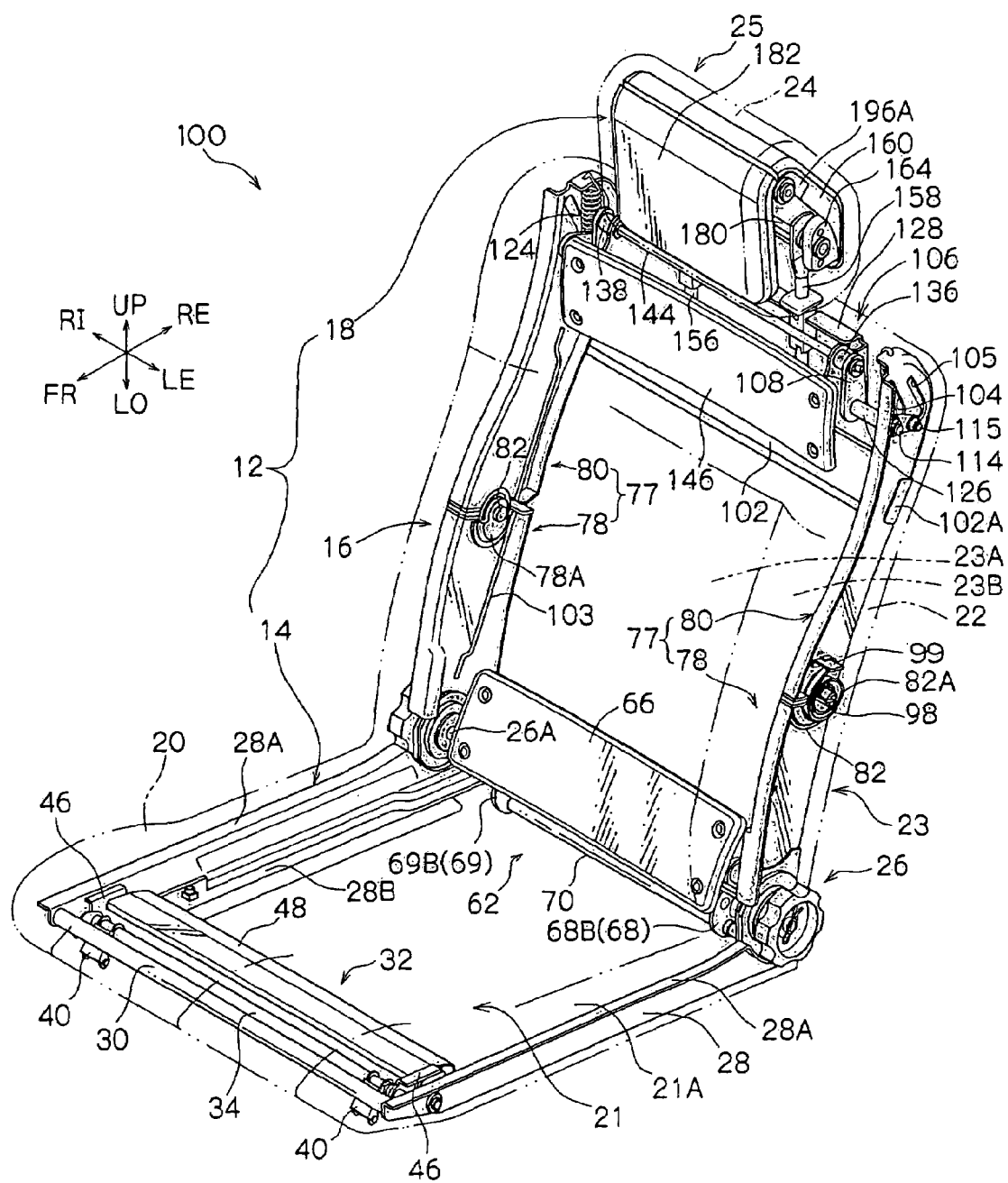
FIG. 14 is a perspective view showing the entire structure of a vehicle seat according to a second embodiment of the invention.
Figure 15:
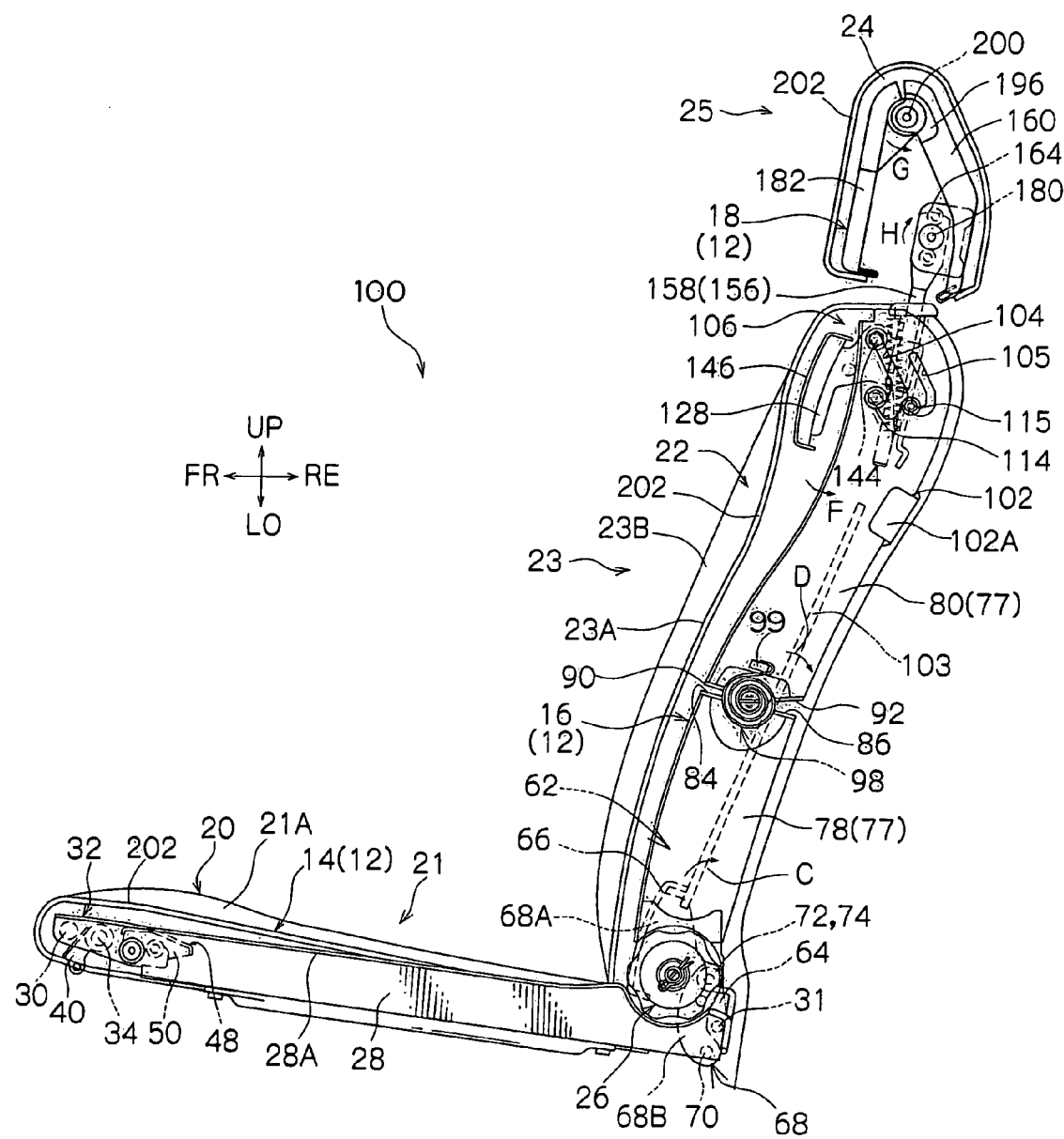
FIG. 15 is a side view of the vehicle seat according to the second embodiment of the invention.

FIG. 14 shows a perspective view of the entire structure of the vehicle seat 100 and FIG. 15 shows a side view of the vehicle seat 100. As shown in these Figures, the vehicle seat 100 is different from the vehicle seat 10 of the first embodiment in that it includes a seat frame 12 instead of the seat frame 11.

This seat frame 12 has a multi-joint mechanism having multiple joints. More specifically, this seat frame 12 comprises a leg portion supporting mechanism 32 provided in the vicinity of the front end of the seating portion frame 14, a pelvis plate mechanism 62 provided in the vicinity of the rear end of the seating portion frame 14, impact absorbing side frames 77 which constitute the back frame 16, a head rest moving mechanism 106 provided in the vicinity of the top end of the back frame 16 and a head rest frame 18 which is an impact absorbing head rest mechanism. Hereinafter, the respective major components of the seat frame 12 will be described and next, the cushion materials 20, 22, 24, which are provided in a stretched manner on the seat frame 12, will be described.

(Structure of Leg Portion Supporting Mechanism)

Figure 17:
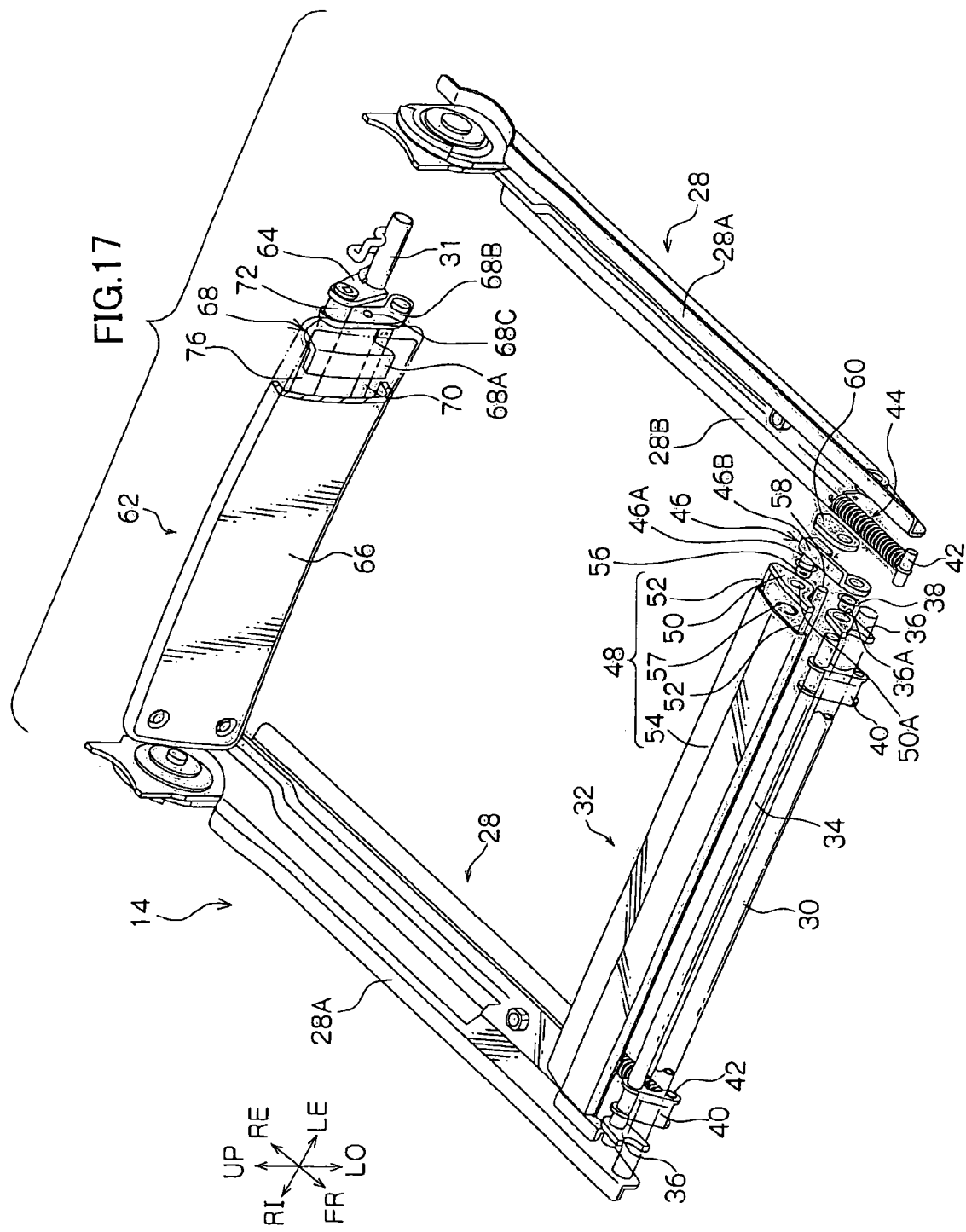
FIG. 17 is an exploded perspective view of a seating portion frame constituting the vehicle seat according to the second embodiment of the invention.
Figure 20:
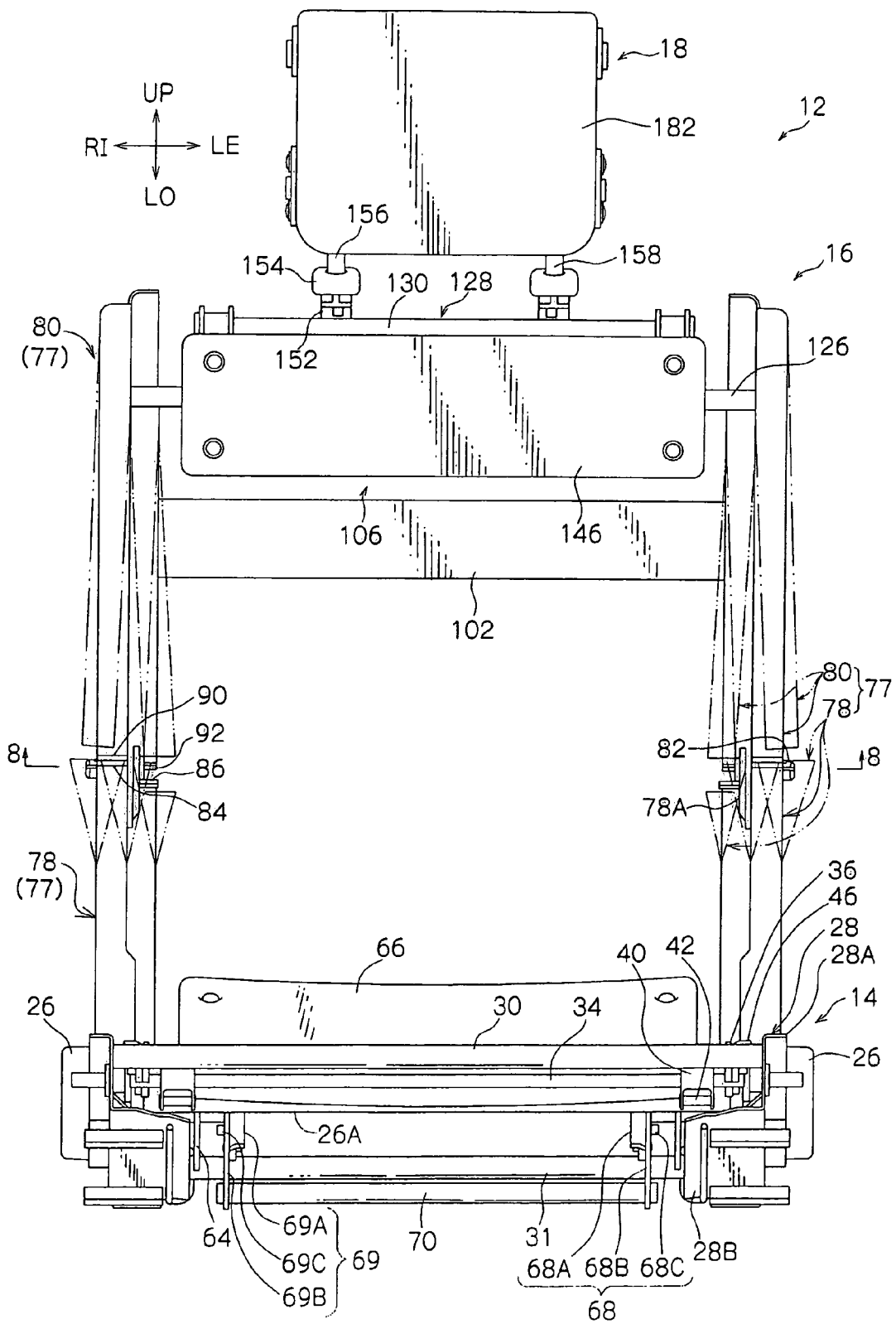
FIG. 20 is a front view of the seat frame which constitutes the vehicle seat according to the second embodiment of the invention.

The leg portion supporting mechanism 32 is provided in the vicinity of the front end between the pairing side frames 28 which constitute the seating portion frame 14. The leg portion supporting mechanism 32 is entirely located substantially forward of the flange portion 28B and includes a rotation shaft 34 located at the front portion. As shown in FIGS. 17, 20, the rotation shaft 34 is provided in a stretched manner in the right and left direction and supported freely rotatably by a supporting hole 36A in a supporting plate 36 fixed in the vicinity of both ends of the frame pipes 30 through each bushing 38.

An arm portion 40 is provided in the vicinity of each supporting plate 36 in this rotation shaft 34 inward in the right and left direction (direction of seat width) thereof. Each arm portion 40 is fixed to the rotation shaft 34 so that the top end thereof always rotates integrally with the rotation shaft 34, while the bottom end is attached to an engaging shaft 42.

Figure 18A:
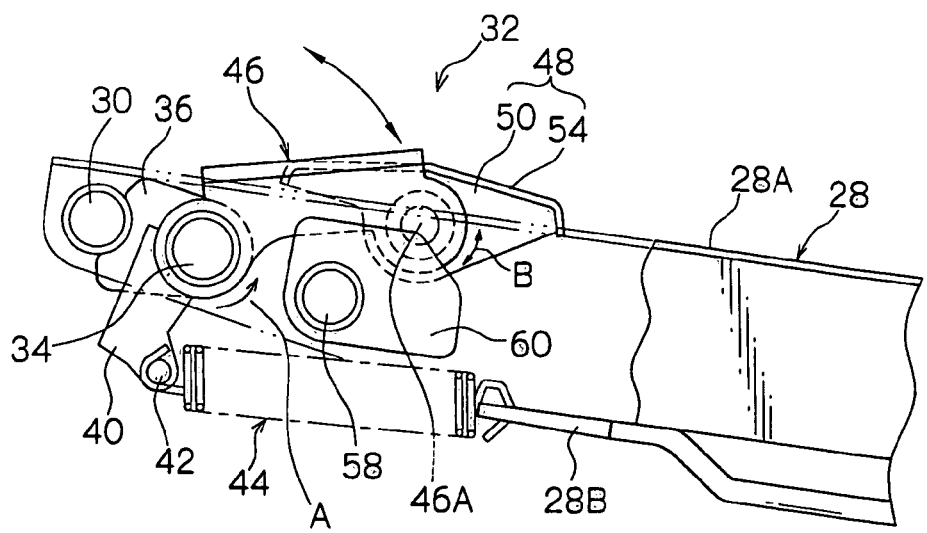
FIG. 18A is a diagram showing the leg portion support mechanism which constitutes the vehicle seat according to the second embodiment of the invention, and more specifically a partially broken side view of the mechanism in a state in which the seat is not occupied by an occupant.
Figure 18B:
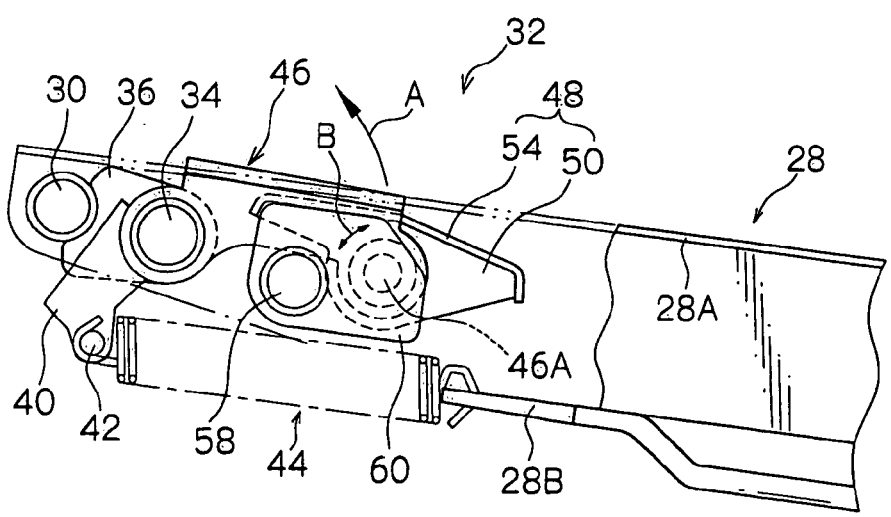
FIG. 18B is a diagram showing the leg portion support mechanism which constitutes the vehicle seat according to the second embodiment of the invention, and more specifically a partially broken side view of the mechanism in a state in which the seat is occupied by an occupant.

An end of a tension coil spring 44, whose other end engages the front end of the flange portion 28B, engages each engaging shaft 42. Consequently, as shown in FIGS. 18A, 18B, the rotation shaft 34 is urged in the direction of an arrow A around itself by an urging force of the tension coil spring 44.

The front end portion of a connecting arm 46 is fixed to each of both ends in the length direction of the rotation shaft 34 (outward in the right and left direction of the supporting plate 36) in a fitting condition. Each connecting arm 46 is provided in a stretched manner in the front-rear direction and a supporting shaft portion 46A projects inward in the right and left direction from the rear end portion thereof.

Further, an engaging portion 46B of a predetermined width is extended outward in the right and left direction from the top end of each connecting arm 46.

Further, the leg portion support mechanism 32 has a pressing plate 48 supported by the connecting arm 46. The pressing plate 48 is provided in a stretched manner in the right and left direction and comprises a pair of side plates 50 which are provided on both ends in the length direction and constricted at both the front and rear ends, a pair of connecting rods 52 which are provided in a stretched manner between the front and rear ends of each side plate 50 and a plate main body 54 fixed on the side plates 50 and the connecting rods 52. The plate main body 54 is formed in a substantially mountain-like shape as seen in side view, in which the center in the front-rear direction serves as a crest and the top edge shape of each side plate 50 corresponds to this shape.

A supporting hole 50A is formed in the center of each side plate 50 and the supporting shaft portion 46A of the connecting arm 46 is inserted into each supporting hole 50A via a bushing 56. Consequently, the pressing plate 48 can rotate around the rotation shaft 34 and around the supporting shaft portion 46A. An E-ring 57 is attached to the front end of each supporting shaft portion 46A so as to inhibit itself from escaping from a corresponding side plate 50.

The leg portion supporting mechanism 32 is provided with a stopper portion for restricting the rotation of the pressing plate 48. More specifically, a stopper pipe 58 is provided in a stretched manner downward of the front portion of the side plate 50 between the pairing side frames 28 such that it is capable of engaging with the front portion of the side plate 50.

Further a stopper plate 60 is provided fixedly on the inside face of each side frame 28 located on each of both ends in the length direction of the stopper pipe 58, the stopper plate being capable of engaging with the bottom end of the engaging portion 46B of the connecting arm 46.

Consequently, the pressing plate 48 is restricted by the stopper plate 60 from rotating in an opposite direction to the arrow A around the rotation shaft 34 and with the rotation in an opposite direction to the arrow A restricted, a rotation in the direction of the arrow B around the supporting shaft portion 46A (see FIGS. 18A, 18B) is restricted by the stopper pipe 58.

When the connecting arm 46 is protruded from the top end of the side frame 28 such that it is sufficiently apart from the stopper pipe 58 and the stopper plate 60, the rotation in an opposite direction to the arrow A and the rotation in the direction of the arrow B of the pressing plate 48 are restricted by the cushion materials 20 (a balance therewith) provided in a stretched manner over the seating portion frame 14.

In the leg portion supporting mechanism 32 described above, as shown in FIG. 18A, the pressing plates 48 are projected upward from the top edge of the side frame 28 by an urging force of the tension coil spring 44 when no passenger is seated. On the other hand, as shown in FIG. 18B, the pressing plate 48 rotates in an opposite direction to the arrow A corresponding to a load received from the leg portion of a seat occupant and the leg portion is urged to the front upward at a position where it rotates appropriately in the direction of the arrow B corresponding to the shape of the leg portion.

Consequently, if the vehicle seat 100 is applied to a driver's seat, driver's action for pressing an accelerator pedal, a brake pedal or the like is assisted, so that the operability of each pedal is improved. In the meantime, dimension of each part, spring constant, tension characteristic and the like are set up so that in normal seating condition, the stopper pipe 58 and the stopper plate 60 do not engage the side plates 50 and the connecting arm 46.

(Structure of Pelvis Plate Mechanism)

A pelvis plate mechanism 62 is provided in the vicinity of the rear end between the paired side frames 28. As shown in FIGS. 15, 17, the pelvis plate mechanism 62 is attached to the top end of paired arms 64 whose bottom ends are fixed to the vicinity of both ends in the right and left direction of the frame pipe 31 provided in a stretched manner at a final end between the paired side frames 28.

Figure 19A:
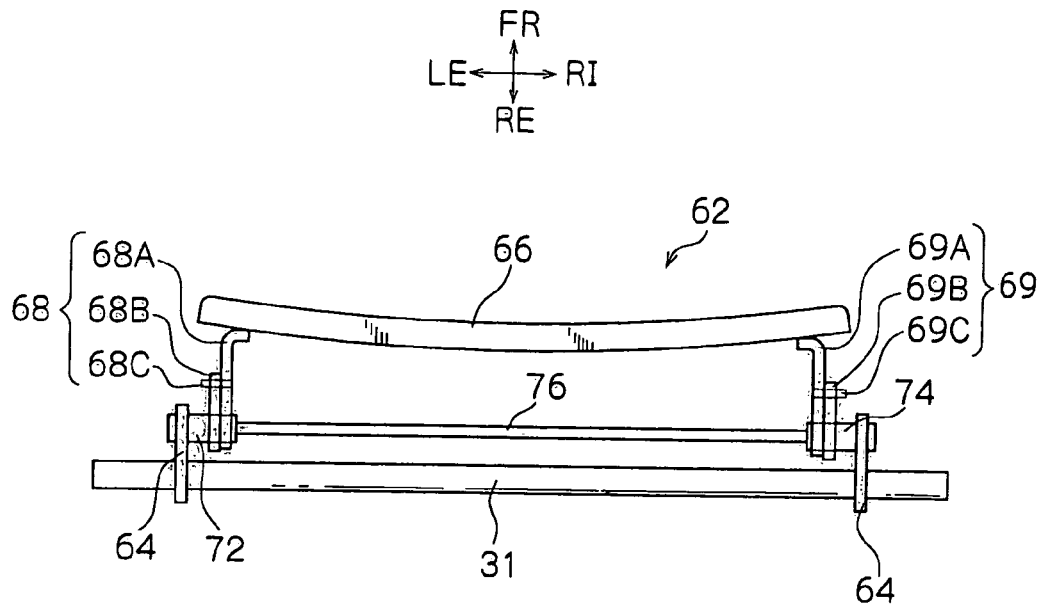
FIG. 19A is a plan view showing the pelvis plate structure which constitutes the vehicle seat according to the second embodiment of the invention.

The pelvis plate mechanism 62 has a pelvis plate 66 and the pelvis plate 66 is formed into a smoothly curved rectangular plate which is provided in a stretched manner in the right and left direction and whose central portion is slightly dented corresponding to the human shape. As shown in FIG. 19A, supporting brackets 68, 69 are fixed to the rear face in the vicinity of both ends in the length direction of this pelvis plate 66 with such tightening means as bolts. The respective supporting brackets 68, 69 extend from the back portion of the pelvis plate 66 disposed substantially along the bottom front end of the back frame 16 to the vicinity of the frame pipe 31 and are connected with a reinforcement pipe 70 provided in a stretched manner between their bottom ends.

Figure 19B:
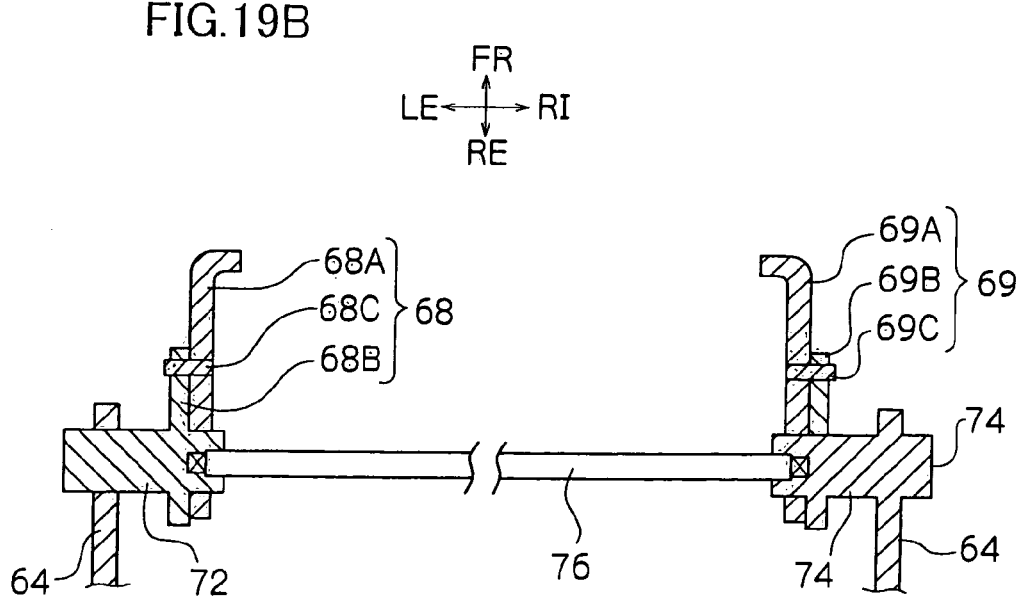
FIG. 19B is a sectional view showing the pelvis plate structure which constitutes the vehicle seat according to the second embodiment of the invention.

As shown in FIG. 19B, a short shaft portion 72, which is supported rotatably by the top ends of one supporting arm 64, is fixed on or formed integrally with one supporting bracket 68 and the other supporting bracket 69 is supported rotatably by a short shaft portion 74, which is fixed on or formed integrally with the top end portion of the other supporting arm 64. The short shaft portions 72, 74 are disposed coaxially. Consequently, the pelvis plate 66 can be rotated around the respective short shaft portions 72, 74 with respect to the frame pipe 31 and the seat frame 12.

End portions of a torsion bar 76 as a buffering member (fourth buffering member) are engaged with the respective short shaft portions 72, 74 coaxially such that they are inhibited from rotating. The torsion bar 76 is a member which generates a twisting load corresponding to the amount of twisting (elastic deformation) and generates a reaction force (resistant force) to the rotations of the pelvis plate 76 around the short shaft portions 72, 74 to the supporting arm 64 (that is, seat frame 12).

Figure 23A:
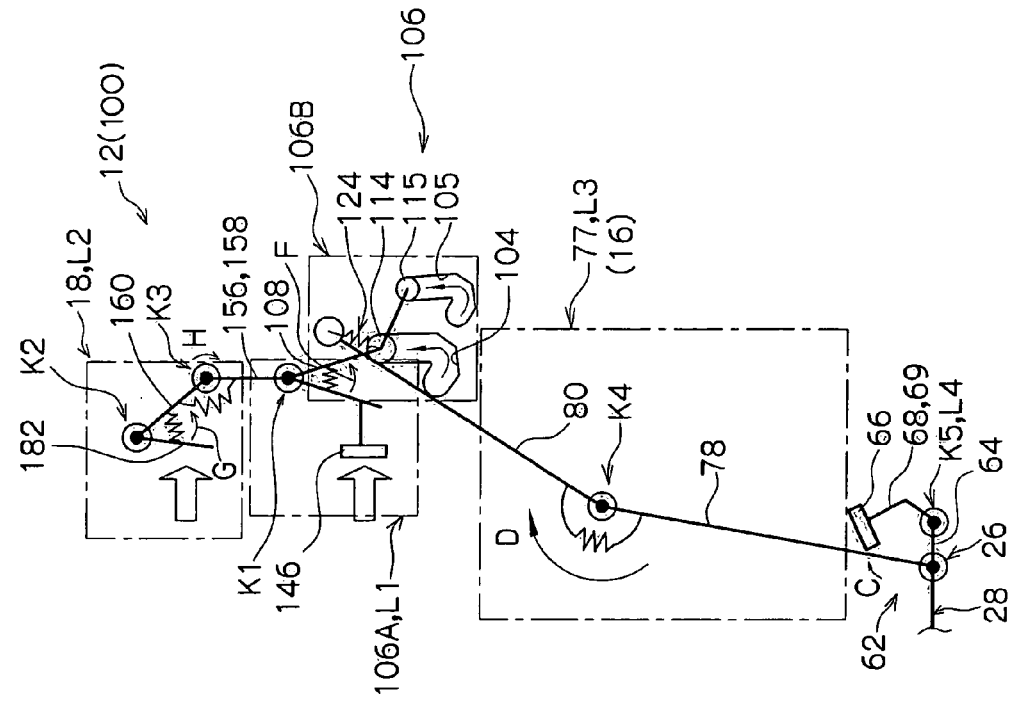
FIG. 23A is a diagram showing the multi-joint structure of the seat frame which constitutes the vehicle seat according to the second embodiment of the invention, and more specifically a schematic diagram showing a state before a collision.
Figure 23B:
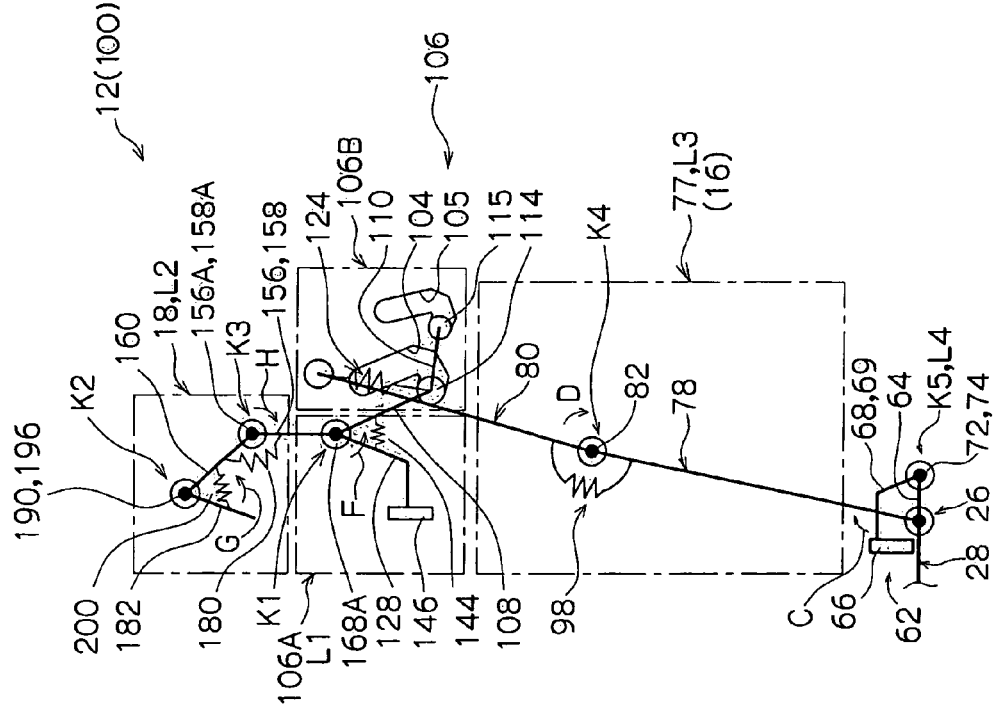
FIG. 23B is a diagram showing the multi-joint structure of the seat frame which constitutes the vehicle seat according to the second embodiment of the invention, and more specifically a schematic diagram showing a state after a collision.

That is, as shown in FIGS. 23A, 23B, the pelvis plate 66 (supporting brackets 68, 69) and the supporting arm 64 constitute a link mechanism L4 with the short shaft portions 72, 74 acting as a joint K5 and corresponds to the fourth link mechanism of the invention. Then, the torsion bar 76 generates a reaction force corresponding to changes in the joint angle of the joint K5.

As shown in FIGS. 6, 7, the supporting bracket 68 is fixed on the rear face of the pelvis plate 66 and comprises a first bracket portion 68A which is supported rotatably by the short shaft portion 72, a second bracket portion 68B which is fixed on or formed integrally with the short shaft portion 72 and connected to the reinforcement pipe 70 and a rivet 68C which joints the first bracket 68A and the second bracket 68B such that they rotate integrally around the short shaft portion 72.

Further, the supporting bracket 69 is fixed on the rear face of the pelvis plate 66 and comprises a first bracket portion 69A which is supported rotatably by the short shaft portion 74, a second bracket portion 69B which is supported rotatably by the short shaft portion 74 and connected to the reinforcement pipe 70 and a rivet 69C which joints the first bracket portion 69A and the second bracket portion 69B such that they rotate integrally around the short shaft portion 74. The rivets 68C, 69C rupture if a specified shearing force is applied thereto.

The pelvis plate 66 of the above-described pelvis plate mechanism 62 is usually disposed such that it directs substantially forward at the bottom front end of the back frame 16 on the rear face side (within the seat back 23) of the cushion material 22 provided in a stretched manner on the back frame 16.

In the pelvis plate mechanism 62, when an external force is applied to the pelvis plate 66, it rotates in the direction of the arrow C around the respective short shaft portions 72, 74 while twisting the torsion bar 76 and if a force acting on the pelvis plate 66 exceeds a predetermined value, the rivets 68C, 69C rupture, so that the first bracket portions 68A, 69A and the second bracket portions 68B, 69B separate.

Thus, the reaction force of the torsion bar 76 accompanied by the rotation of the pelvis plate 66 in the direction of the arrow C disappears, so that the pelvis plate 66 rotate around the short shaft portions 72, 74 with this condition (rotation to the first bracket portions 68A, 69A and the second bracket portions 68B, 69B) and can move substantially upward in the backward direction indicated with the arrow C (see FIGS. 24–27).

That is, the pelvis plate 66 is disposed at a position corresponding to the pelvis of a passenger and guides the seat occupant substantially upward in the backward direction to the seat frame 12 by a moving force in the backward direction.

(Structure of Back Frame)

Figure 16:
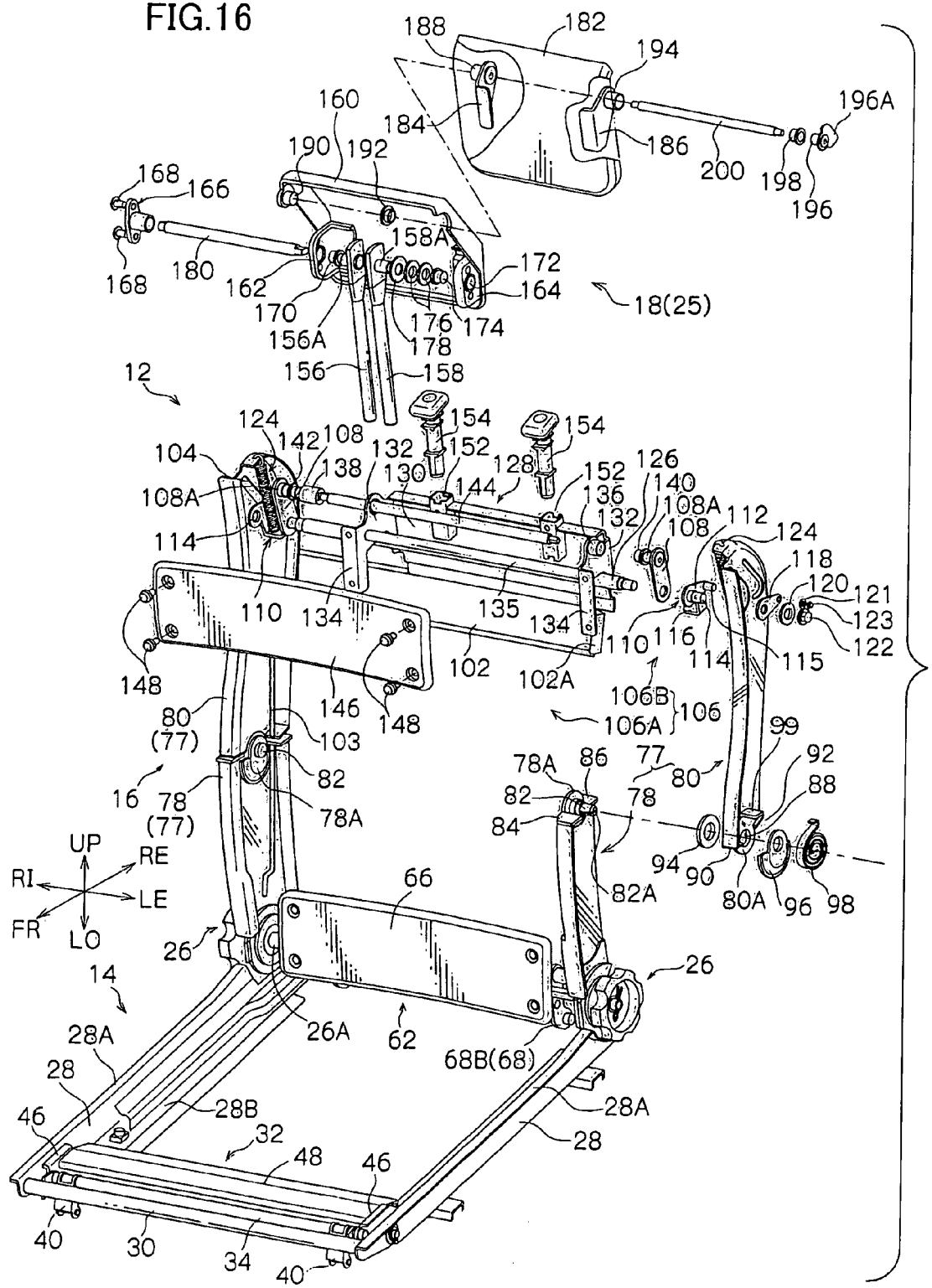
FIG. 16 is an exploded perspective view of a seat frame constituting the vehicle seat according to the second embodiment of the invention.

As shown in FIGS. 14–16, the back frame 16 comprises a pair of the impact absorbing right and left side frames 77, which is a third link mechanism of the invention. Each impact absorbing side frame 77 includes a side frame lower 78 as its lower side frame.

Each side frame 78 is provided in a stretched manner substantially in the vertical direction and the bottom end portion thereof is connected to the rear end portion of the seating portion frame 14 through the reclining mechanism 26. Consequently, the back frame 16 can be rotated around the supporting shaft 26A and held at an arbitrary rotation position. Therefore, the pair of the right and left side frame lowers 78, constituting the lower frame of the invention.

The side frame upper 80 is connected to the top end of each side frame lower 78 as an upper side frame and the pair of the side frame uppers 80 constitute the upper frame of the invention.

More specifically, the connecting portion 78A, whose central portion in a width direction along the front-rear direction projects in a semi-circular shape is formed at the top end portion of each side frame lower 78 and the connecting shaft 82 is provided such that it projects outward in the right and left direction. The right and left connecting shafts 82 are disposed substantially coaxially.

The front side stopper portion 84 is provided at the top end of each side frame lower 78 forward of the connecting shaft 82 and further, the rear side stopper portion 86 is provided rearward of the connecting shaft 82. Each front side stopper portion 84 and each rear side stopper portion 86 are disposed substantially 180° to opposite sides with respect to each connecting shaft 82 and a stopper face directed substantially upward is formed.

On the other hand, each side frame upper 80 is provided in a stretched manner substantially in the vertical direction and the connecting portion 80A projects in a substantially semi-circular shape from the central portion in the front-rear direction of the bottom end portion. A shaft hole 88 is provided in this connecting portion 80A corresponding to the connecting shaft 82. The front side stopper portion 90 is provided at the top end of each side frame upper 80 forward of each shaft hole 88 and the rear side stopper portion 92 is provided rearward of each shaft hole 88.

The front side stopper portion 90 and the rear side stopper portion 92 are formed such that they face downward and an angle formed by each stopper face upward is sufficiently smaller than 180°.

Each side frame uppers 80 are supported rotatably in the front-rear direction around the paired connecting shafts 82 by the side frame lowers 78 inserted into each shaft hole 88.

Figure 22:
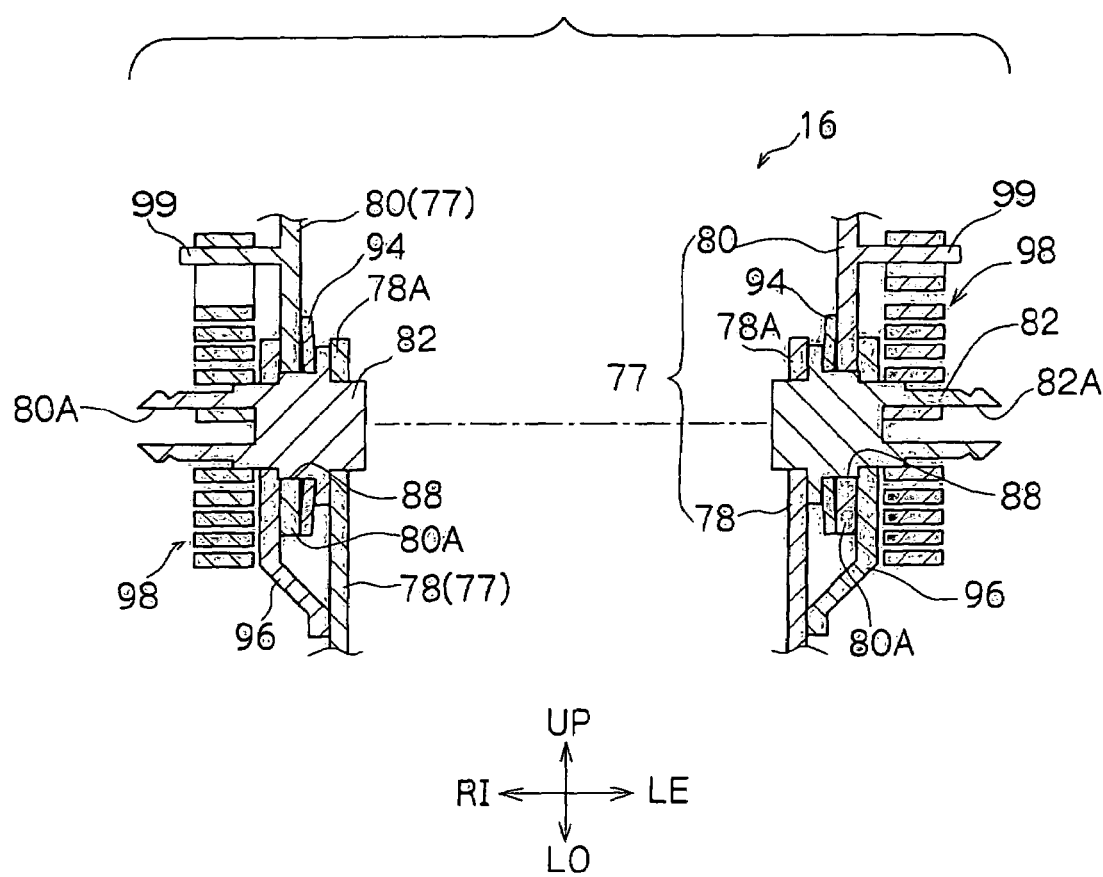
FIG. 22 is a sectional view showing the joint condition between the side lower frame and the side upper frame which constitute the vehicle seat according to the second embodiment of the invention.

As shown in FIG. 22, a ring-like coned disc spring 94 is disposed between the connecting portion 80A of each side frame upper 80 and the connecting portion 78A of the corresponding side frame lower 78 such that the connecting shaft 82 goes through the coned disk spring. With this condition, each side frame upper 80 is fixed on the side frame lower 78 and prevented from dropping out of the side frame lower 78 by the holding member 96 which is in a sliding contact with the outer side face of the connecting portion 80A while the connecting shaft 82 goes through the holding member.

A slot 82A is formed in the connecting shaft 82 of each side frame lower 78 and the inner end portion of a spiral spring 98, which is an elastic member and a buffering member (third buffering member), is engaged with each slot 82A.

Each spiral spring 98 is engaged with an engaging protrusion 99 provided on the upper portion of the connecting portion 80A in the side frame upper 80 which outside ends thereof meet. Each spiral spring 98 urges the side frame upper 80 forward around the connecting shaft 82, thereby generating a reaction force when the side frame upper 80 is rotated backward as indicated with the arrow D in FIG. 15 with respect to the side frame lower 78.

A cross member upper 102 is provided in a stretched manner in the right and left direction in the vicinity of the top end between the respective side frame uppers 80. The cross member upper 102 is formed in the form of a sheet and has ear portions 102A, which are bent forward from both end portions and fixed to different side frame uppers 80 by welding or the like.

In the back frame 16 described above, because the front side stopper portion 90 makes contact with the front side stopper portion 84, each side frame upper 80 is restricted from rotating forward to the side frame lower 78 and because the rear side stopper portion 92 makes contact with the rear side stopper portion 86, each side frame 80 is restricted from rotating backward to the side frame lower 78.

In other words, each side frame upper 80 can be rotate in the front-rear direction within a range limited by the front side stopper portions 90, 84 and the rear side stopper portions 92, 86.

In the back frame 16, the front side stopper portion 90 of the side frame upper 80 is kept in contact with the front side stopper portion 84 of the side frame lower 78 by an urging force of the spiral spring 98 and a tension of the cushion material 22. The urging force of the spiral spring 98 is set up so that on normal operating condition, the side frame upper 80 is not rotated to the side frame lower 78.

As described above, in the back frame 16, the pair of the impact absorbing right and left side frames 77, are connected with the cross member uppers 102 and each impact absorbing side frame 77 constructs the link mechanism L3 with the side frame lower 78 and the side frame upper 80 with each connecting shaft 82 as the joint K4.

The spiral spring 98 generates a reaction force corresponding to changes in the joint angle of the joint K4. In the meantime, the joint K4 is set at a position higher than the waist position of a seat occupant (higher than the gravity center of man).

The waist height of a seat occupant mentioned here is 248.2 mm on average for Japanese male adult and 243.2 mm for Japanese female adult and the average waist height of Japanese male and female adults is 245.7 mm. The above-mentioned pelvis plate 66 is disposed between a pair of the side frame lowers 78 and can be rotated around the short shaft portions 72, 74 relative to the side frame lower 78 (back frame 16).

Figure 21A:
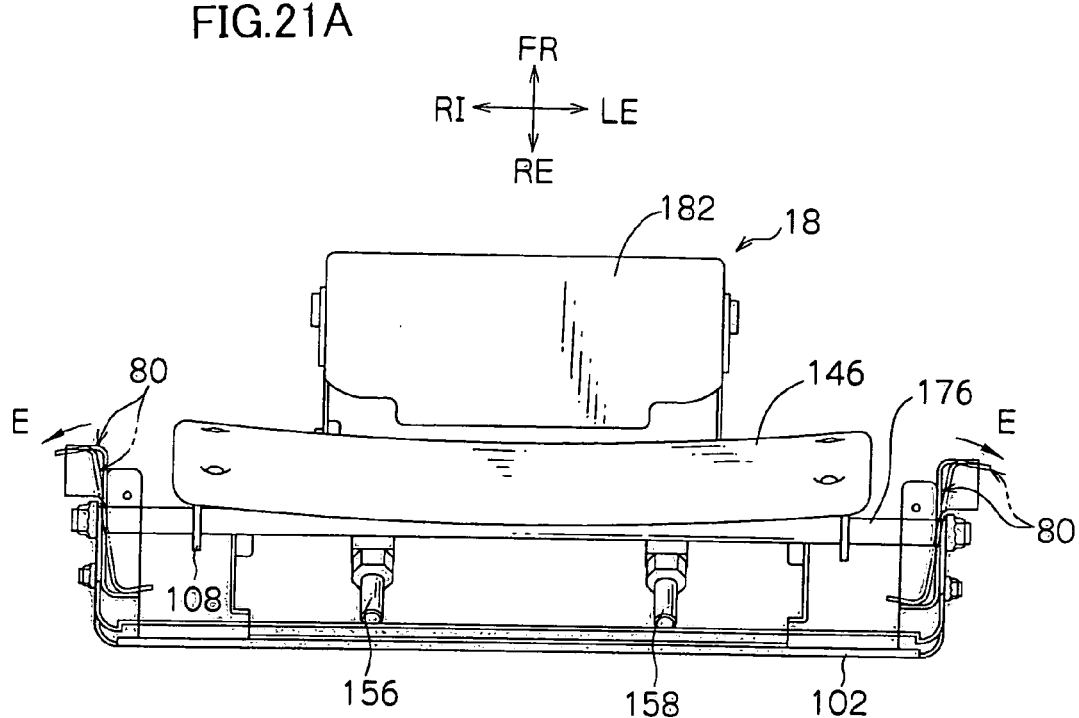
FIG. 21A is a diagram taken along the line 8—8 of FIG. 20, indicating a displacement condition of the side upper frame, more specifically a diagram of the bottom face when a relatively small load is inputted.

In the impact absorbing side frame 77, the inside diameter of the shaft hole 88 in each side frame upper 80 is slightly larger than the outside diameter of the connecting shaft 82, so that as shown in FIG. 21A, the bottom end portion thereof can deflect to the side frame lower 78 (rotation in the direction of an arrow E and restoration) due to compression and restoration along the axial direction of the coned disc spring 94. Consequently, the back frame 16 (joint K4) rotates in such a manner that it expands in its width due to a body motion (minute input) accompanied by breathing of a seat occupant and at the time of expiration, it restores to its normal condition.

Figure 21B:
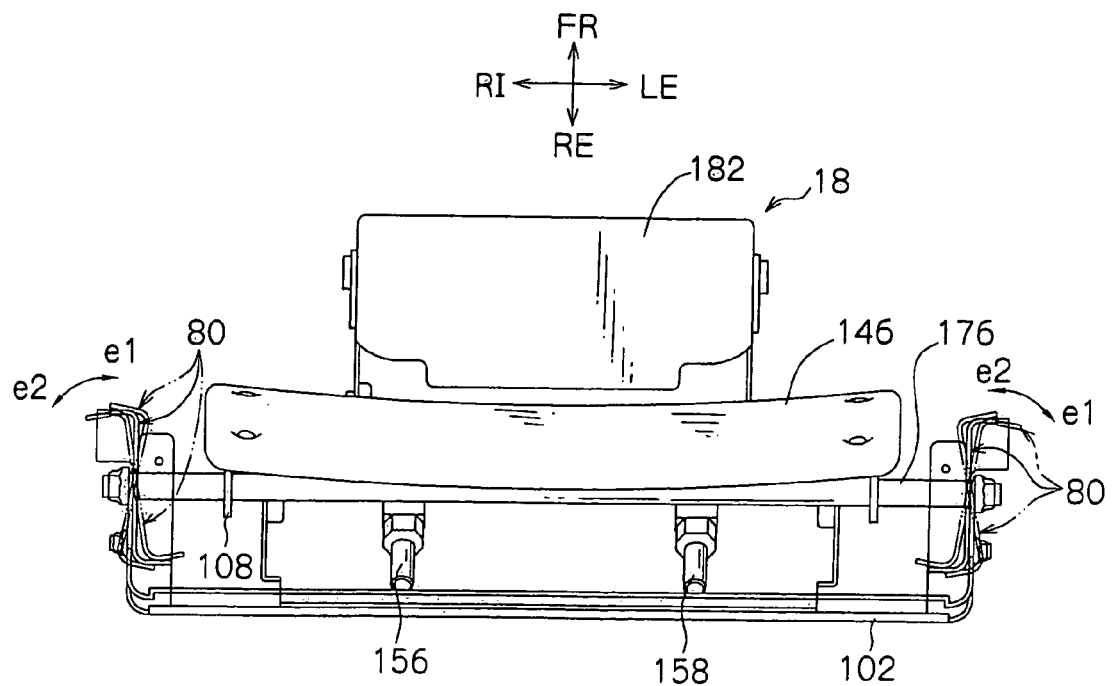
FIG. 21B is a diagram taken along the line 8—8 of FIG. 20, indicating the displacement condition of the side upper frame, more specifically a diagram of the bottom face seen from diagonally forward when an impact load is inputted.

If an impact force acts obliquely to the back and forth axis (front-rear direction) from any of the right or left side, in the back frame 16, the bottom portion of each side frame upper 80 rotates (is twisted) interlocking with the upper portion of the side frame lower 78, corresponding to the direction of an input of an impact force from a condition in which as shown with solid lines in FIGS. 20, 21B, the paired right and left side frame uppers 80 and corresponding side frame lowers 78 are disposed on a substantially straight line in a front view.

Thus, when an impact acts from forward right, the back frame 16 rotates in the direction of an arrow e1 indicated in FIG. 21B, and if an impact acts from forward left, it rotates in the direction of an arrow e2, so that the right and left impact absorbing side frames 77 rotate in the same direction. That is, against an impact acting obliquely to the back and forth axis, in the impact absorbing side frame 77, the side frame lower 78 and the side frame upper 80 make a twisting rotation elastically like an integral member without the joint K4.

Then, according to the second embodiment, for the cushion material 22 provided in a stretched manner over the back frame 16, a substantially zero spring characteristic is set up so that each side frame upper 80 expands in the right and left direction to the side frame lower 78 corresponding to changes in tension due to a minute body motion accompanied by the breathing of the seat occupant.

The cushion material 22 is set to have a large spring characteristic (spring constant) if an impact force acts obliquely from the right or left direction relative to the back and forth axis so that the side frame upper 80 and side frame lower 78 of the back frame 16 rotate interlockingly.

That is, the cushion material 22 is provided in a stretched manner on the back frame 16, and dimensions and locations of respective components of the back frame 16, the size and spring constant of the coned disc spring 94 and the characteristic of the cushion material 22 are set up so as to possess the spring constant characteristic of Duffing type, which has a substantially zero spring characteristic in the vicinity of the point of equilibrium corresponding to normal settling condition without any change in load.

According to the second embodiment, the substantially zero spring characteristic mentioned here refers to a characteristic that the equivalent spring constant in the vicinity of the point of equilibrium is substantially zero, more specifically the equivalent spring constant in the vicinity of the equilibrium is 0 N/mm or more to less than 49 N/mm (more preferably 11.7 N/mm or more to less than 19.6 N/mm from viewpoints of stability in the point of equilibrium and follow-up characteristic to a minute input). The spring constant characteristic of the Duffing type is such a characteristic that the equivalent spring constant except in the vicinity of the point of equilibrium is sufficiently large to the equivalent spring constant in the vicinity of the point of equilibrium.

The equivalent spring constant is a constant expressed as an equivalent to linear type spring constant at a specific displacement point or a constant obtained by dividing elastic force at the specific displacement point by a displacement at the specific displacement point.

Therefore, if the relation between elastic force and displacement is given as a three-dimensional curve or the like, the equivalent spring constant at each displacement point is given as an inclination (differentiation by the displacement of elastic force) of elastic force curve at that displacement point.

The range of the above-described preferable equivalent spring constant in the vicinity of the point of equilibrium (11.7 N/mm or more to less than 19.6 N/mm) is set up considering the follow-up characteristic to the change in load based on the fact that the change in load due to the body motion accompanied by the breathing of the seat occupant is about 1% the weight of the passenger.

Further, according to the second embodiment, dimensions and locations of respective components of the back frame 16, the size and constant of the coined disc spring 94 and the characteristic of the cushion material 22 are set up so as to generate a viscosity dampening force of 4.9 N or more to less than 343 N (preferably, 98 N or more to less than 147 N) corresponding to absorption of the body motion accompanied by the breathing and a deflected velocity due to the absorption of the impact. That is, the coined disc spring 94 corresponds to an elastic member of the invention.

The rod-like engagement member 103, which is formed in a rod elongated substantially in the vertical direction, is fixed on each inside face of the side frame lowers 78 and the side frame uppers 80, on right and left hand sides. One end of the strap member 206, whose other end is connected to the skin 202 of the cushion material 22, is engaged with the rod-like engagement member 103 (see FIG. 4A). Each rod-like engagement member 103 functions as a buffering member also which when the side frame upper 80 rotates backward to the side frame lower 78, is deformed elastically or plastically so as to generate a reaction force.

Slit-like slide guides 104, 105, which constitute the holding means of the invention, are formed at the top end portions of each side frame upper 80, which act as a free end (portion above the cross member upper 102). These slide guides 104, 105 will be described together with the composition of the head rest moving mechanism 106.

(Structure of Head Rest Moving Mechanism)

A head rest moving mechanism 106 is disposed between the paired right and left side frame uppers 80, the head rest moving mechanism automatically moving the head rest 25 at the time of a collision. The head rest moving mechanism 106 comprises a pressure receiving portion 106A which an impact load is to be inputted to from a seat occupant at the time of a collision and a displacement transmitting portion 106B, which holds the pressure receiving portion 106A on the back frame 16 and deflects corresponding to a backward moving of the pressure receiving portion 106A so as to change the holding position of the pressure receiving portion 106A upward (see FIGS. 16, 23A, 23B).

As shown in FIG. 3, the displacement transmitting portion 106B has a pair of right and left link arms 108, which are provided in a stretched manner substantially in the vertical direction. A guide member 110 is attached to each link arm 108. Each guide member 110 comprises a sliding portion 112 which opposes the link arm 108, which is provided in a stretched manner in the front-rear direction, such that it directs outward in the right and left direction, a pair of guide pins, back and front, provided protrudedly from the sliding portion 112 in parallel such that they direct outward in the right and left direction, and a connecting portion 116 in which an inside end portion extended inward in the right and left direction from under the sliding portion 112 is fixed to the bottom end portion of the link arm 108.

In each guide member 110, a pair of guide pins 114, 115 are passed through different corresponding slide guides 104, 105 in the side frame upper 80. More specifically, the guide pin 114 is passed through the substantially J shaped slide guide 104 in its side view and the guide pin 115 is passed through the slide guide 105, formed in substantially J shaped form in its side view, which is located backward of the slide guide 104 and substantially in parallel thereto.

In each of the slide guides 104, 105, its straight portion is inclined forward while a substantially circular portion is formed forward of the bottom end of the straight portion. The closed end (top front end) of the straight portion is substantially coincident with the closed end of the substantially circular portion in terms of their positions in the front-rear direction.

Under the above-described structure, each guide member 110 is capable of moving along a predetermined trajectory of substantially J shape while guided by the slide guides 104, 105 through the respective guide pins 114, 115 and substantially maintaining a posture with the link arm 108 which each guide member 110 is attached to (hardly rotating).

Therefore, in each guide member 110 and the link arm 108, the respective guide pins 114, 115 can adopt a first position which is located at the closed end of the circular portion of the slide guides 104, 105 and a second position which is located at the closed end of the straight portion in the slide guides 104, 105 and above the first position. The closed ends of the circular portions in the slide guides 104, 105 are closed on the front upward side and when the guide pin moves from the first position to the second position, it moves substantially obliquely downward in a backward direction.

The guide pins 114, 115 projecting to the outside face side of the side frame upper 80 fasten with nuts 122, 123 through male screw portions formed at each front end such that they pass through receiving member 118 and coined disc spring 120 each having a shape corresponding to the sliding portion 112. Consequently, the head rest moving mechanism 106 is capable of moving between the first position and the second position and prevented from falling out from the back frame 16.

When the sliding portion 112 of each guide member 110 and the receiving member 118 intend to slide to the side frame upper 80, the urging forces of the coined disc springs 120, 121 generate a friction force (reaction force) based on a design value resisting an impact resistant load.

An end portion of a stretch coil spring 124 which is an urging means, whose other end portion is engaged with the top end of the side frame upper 80, is engaged with the connecting portion 116 of each guide member 110. Under this condition, the stretch coil spring 124 is pulled out so as to generate a urging force.

Usually when the respective guide pins 114, 115 engage the closed ends of the circular portions in the slide guides 104, 105, the respective guide member 110 and the link arm 108 are held at the first position by the urging force of the stretch coil spring (see FIG. 15).

Further, according to the second embodiment, a pair of the right and left link arms 108 are connected to each other through a connecting shaft 126, which is provided in a stretched manner in the right and left direction. The connecting shaft 126 is connected to the bottom end portion of each link arm 108. On the other hand, a supporting shaft portion 108A is provided protrudedly at the top end portion of each link arm 108 such that it directs inward in the right and left direction.

The pressure receiving portion 106A is connected to the above-described displacement transmitting portion 106B. More specifically, the pressure receiving portion 106A has a bracket 128 which is connected rotatably to the top end of each link arm 108.

The bracket 128 includes a rear plate portion 130 which constitutes its rear end, an arm portion 132 extended forward from each of right and left end portions and a mounting portion 134 formed such that it extends outward in the right and left direction from the front end of each arm portion 132. Each arm portion 132 is formed in the shape of fallen letter U, which is open downward in its side view. The bracket 128 is reinforced by stretching a connecting shaft 135 between the vicinities of the front ends of the arm portions 132.

A short cylindrical portion 136 is fixed on or formed integrally with an intermediate portion (top end portion) in the front-rear direction of one arm portion 132 in the bracket 128 and the other arm portion 132 is supported rotatably by the short cylindrical portion 138. The short cylindrical portions 136, 138 are disposed coaxially and supported freely rotatably around the supporting shaft portion 108A of each of different link arms 108 which each short cylindrical portion is inserted via bushing 140, 142. In the meanwhile, the arm portions 132 are formed in the shape of the above-described fallen letter U so that the connecting shaft 126 which connects the right and left link arms 108 does not interfere with the bracket 128 rotating around the supporting shaft portion 108A (as if it strides over the connecting shaft 126).

An end portion of the torsion bar 144, which is a buffering member (first buffering member) is engaged with the short cylindrical portion 136 under conditions in which it is inhibited from rotating and the other end portion of the torsion bar 144 passes through the short cylindrical portion 138 and is engaged with the supporting shaft portion 108A of the link arm 108 under conditions in which it is inhibited from rotating. The torsion bar 144 is made of material which generates a twisting load corresponding to the quantity of twisting. When the bracket 128 rotates substantially backward as indicated by an arrow F in FIG. 15 around the supporting shaft portion 108A relative to the guide member 110 (that is, displacement transmitting portion 106B) fixed on the link arm 108, it generates a reaction force.

The above-described link arm 108 and bracket 128 constitute the link mechanism L1 with each supporting shaft portion 108A (short cylindrical portions 136, 138) acting as the joint K1. Then, the torsion bar 144 generates a reaction force corresponding to changes in the joint angle of the joint K1. Thus, the link arm 108 can be regarded as a component of the pressure receiving portion 106A or a common component to the pressure receiving portion 106A and the displacement transmitting portion 106B.

The respective mounting portions 134 of the bracket 128 are fixed to the rear face of the pressure receiving plate 146 with bolts 148, which are tightening means. The pressure receiving plate 146 is formed in the shape of a substantially rectangular plate which is provided in a stretched manner in the right and left direction and curved smoothly such that the central portion is slightly dented corresponding to the human body. The pressure receiving plate 146 is located at a position corresponding to the height of the breast portion (shoulder blade) of a seat occupant when the guide member 110 of the displacement transmitting portion 106B is located at the first position. With this condition, the pressure receiving plate 146 projects forward relative to the side frame uppers 80 as shown in FIG. 15 and is covered with the cushion material 22.

Guide mounting portions 152 are provided at two positions apart in the right and left direction on the rear plate portion 130 of the bracket 128. Each guide mounting portion 152 is formed into a rectangular pipe which is provided in a stretched manner substantially in a vertical direction and holds each pole guide 154. The head rest frame 18 is mounted on each pole guide 154. Consequently, the head rest 25 is supported by the bracket 128 or the pressure receiving portion 106A of the head rest moving mechanism 106.

In the head rest moving mechanism 106 described above, when the pressure receiving plate 146 is pressed from forward, the bracket 128 rotates in the direction of an arrow F around each supporting shaft portion 108A relative to the guide member 110 while twisting the torsion bar 144. Then, in the head rest moving mechanism 106, when the pressure receiving plate 146 is pressed further backward so that the guide pins 114, 115 move downward in the backward direction along the slide guides 104, 105 (when deflects in a predetermined quantity), the guide member 110 moves to the second position with the link arm 108 due to the urging force of the stretch coil spring 124.

That is, in the head rest moving mechanism 106, when a seat occupant presses the pressure receiving plate 146 backward due to an impact load at the time of a collision, impact energy is absorbed by a reaction force generated based on an elastic twisting load of the torsion bar 144 and next, when an angle displacement (angle displacement of the joint K1) to the link arm 108 of the pressure receiving plate 146 becomes over a predetermined value, the load is transmitted to the displacement transmitting portion 106B (link arm 108), so that the guide member 110 slides along the slide guides 104, 105 and the head rest 25 moves entirely to the second position.

Due to the angle displacement in the direction of the arrow F to the link arm 108 of the pressure receiving plate 146, the pole guides 154 tilt forward and the head rest 25 also moves forward. The reaction force generated based on mainly the elastic twisting load of the torsion bar 144 (the relation between the reaction force and a predetermined value of the angle displacement) when the pressure receiving plate 146 is pressed backward (the joint K1 deflects in angle) is so set up that a move from the first position to the second position after the above-described energy absorption does not delay from a backward move of the head portion of the seat occupant.

Although as described above, in the head rest moving mechanism 106, the pressure receiving plate 146 which a pressing force is inputted in corresponds to a releasing means in a direct meaning, from a wider meaning, it can be regarded that the portion moving from the first position to the second position as well as the guide member 110 entirely corresponds to the releasing means.

(Structure of Head Rest Frame)

As shown in FIG. 16, the head rest frame 18 has a first pole 156 and a second pole 158 and the first pole 156 and the second pole 158 are inserted into the different pole guides 154, so that they are supported by the head rest moving mechanism 106.

The insertion amount of the first pole 156 and the second pole 158 into the pole guides 154 can be changed and the poles 156, 158 can be held at an arbitrary insertion position and the installation height of the head rest 25 to the head rest moving mechanism 106 and the back frame 16 can be changed. Further, supporting shaft portions 156A, 158A are provided such that they project outward of the seat from the top ends of the first pole 156 and the second pole 158.

These first pole 156 and second pole 158 support a rear half 160 which constitutes the rear skeletal members of the head rest 25. The rear half 160 has a peripheral wall which extends forward from a peripheral edge of a bent plate tilting forward relative to the bottom portion and respective corner portion is rounded. Holding members 162, 164 are fixed on the bottom on both ends in the right and left direction of this rear half 160.

A bearing member 166 is mounted on the holding member 162 with screws 168 such that it is inhibited from rotating and the bearing member 166 supports the supporting shaft portion 156A inserted through a bushing 170 rotatably.

On the other hand, the bearing portion 172 is formed integrally with the holding member 164 and the bearing portion 172 is disposed coaxially with the bearing member 166. This bearing portion 172 supports the supporting shaft portion 158A inserted through a bushing 174 rotatably.

Consequently, the rear half 160 is supported rotatably around the supporting shaft portions 156A, 158A relative to the first pole 156 and the second pole 158 (relative to the head rest moving mechanism 106 through the first pole 156 and the second pole 158). Two washers 176 and coined disc spring 178 are placed around the supporting shaft portion 158A.

An end portion of the torsion bar 180 is engaged with the bearing member 166 as a buffering member (second buffering member) such that it is inhibited from rotating and the other end portion of the torsion bar 180 is engaged with the supporting shaft portion 158A such that it is inhibited from rotating. The torsion bar 180 passes through the supporting shaft portion 156A rotatably relative to each other. This torsion bar 180 is a member which generates a twisting load corresponding to the quantity of twisting and generates a reaction force when the rear half 160 rotates substantially backward as indicated with an arrow H (see FIG. 15) around the supporting shaft portions 156A, 158A relative to the first pole 156 and the second pole 158.

A front half 182, which constitutes the front skeletal member of the head rest 25, is joined to the rear half 160. The front half 182 is so constructed that a peripheral wall is erected backward from the peripheral edge of a flat plate and its top end portion is formed so as to draw an arc continuous from the front top end tilting forward of the rear half 160. The head rest 25 constitutes a skeletal structure which is open downward and to both right and left sides with the front half 182 and the rear half 160.

Holding members 184, 186 are fixed to both the ends in the right and left direction of the front half 182. The holding member 184 has a bearing portion 188 and a supporting shaft 190 provided integrally in the vicinity of the top end on the right end of the rear half 160 is inserted into the bearing portion 188 via a bushing 192 rotatably.

On the other hand, the holding member 186 has a bearing portion 194 disposed coaxially with the bearing portion 188 and the supporting shaft 196 is inserted into the bearing portion 194 via a bushing 198 rotatably.

By fixing a flange portion 196A extended outward in the diameter direction from an end along an axial direction of the supporting shaft 196 to the vicinity of the top end on the left side portion of the rear half 160, the supporting shaft 196 is inhibited from rotating to the rear half 160. Consequently, the front half is supported such that it is capable of rotating around the supporting shafts 190, 196 relative to the rear half 160.

An end portion of the torsion bar 200 as a buffering member (second buffering member) is engaged with the bearing portion 188 such that it is inhibited from rotating and the other end portion of the torsion bar 200 is engaged with the supporting shaft 196 such that it is inhibited from rotating. The torsion bar 200 is a member which generates a twisting load corresponding to the quantity of twisting and generates a reaction force when the front half 182 rotates substantially backward as indicated with an arrow G (see FIG. 15) around the supporting shafts 190, 196 relative to the rear half 160.

In this way, the head rest frame 18 constitutes a multi-joint link mechanism L2 having two joints with the supporting shaft portions 156A, 158A as a joint K3 and the supporting shafts 190, 196 as a joint K2 with the first pole 156, the second pole 158 and the rear half 160 and the front half 182 and corresponds to the second link mechanism and impact absorbing head rest mechanism of the invention.

The torsion bars 180, 200 generate a reaction force corresponding to changes in the joint angle of the joints K3, K2. The reaction force generated by the torsion bars 180, 200 is set to be as strong as a displacement (velocity) of the head portion is restricted so that a seat occupant is protected from whiplash at the time of a collision from backward and as weak as a load acting on the head portion in impact absorbing process does not become excessive (lowering load peak).

(Summary of Seat Frame)

As described above, the seat frame 12 is entirely constructed in multi-joint mechanism, containing the link mechanisms L1, L2, L3, L4 and having the joints K1, K2, K3, K4, K5. FIG. 23A shows schematically this seat frame 12 and the respective joints K1, K2, K3, K4, K5 are capable of deflecting in angle mainly in the front-rear direction. According to the second embodiment, the joint K4 is capable of deflecting in the right and left direction also (rotating in the direction indicated by an arrow E).

In this seat frame 12, as described above, the cushion material 20 is provided in a stretched manner over the seating portion frame 14 so as to form the seat cushion 21, and the cushion material 22 is provided in a stretched manner over the back frame 16 so as to form the seat back 23 and then, the cushion material 24 is provided in a stretched manner over the head rest frame 18 so as to form the head rest 25. The stretching structures of the respective cushion materials 20, 22 are the same as the first embodiment (see FIGS. 4A, 4B).

Next, the operation of the second embodiment will be described. First, the operation under a normal traveling condition of a vehicle (including a condition in which the vehicle is stopped) will be described and next, the operation at the time of a collision will be described. The operation at the time of vehicle collision will be explained about a case where impact energy (inertia of the seat occupant) to be absorbed by the vehicle seat 100 is relatively small (for example, when the seat occupant weighs light or a collision velocity is small) and a case where the impact energy is large. The operation of the latter will be described about mainly points different from the former.

(Operation Under Normal Condition)

Figure 24:
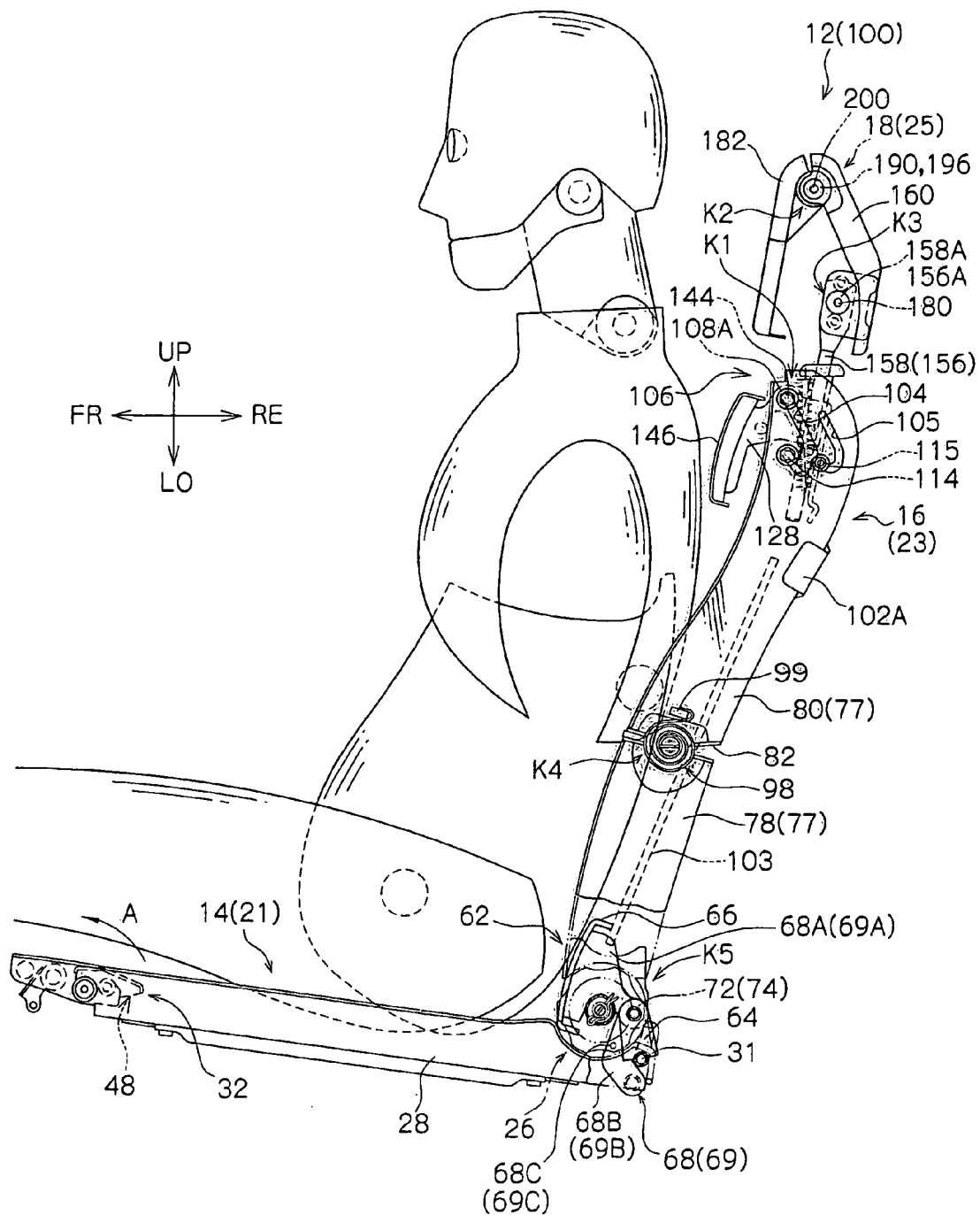
FIG. 24 is a side view showing a state in which a passenger is seated, before a collision, of the vehicle seat according to the second embodiment of the invention.

In the vehicle seat 100 having the above-described structure, as shown in FIG. 24, when a passenger (vehicle's driver) seats himself, the pressing plate 48 of the leg portion supporting mechanism 32 moves to between the side frames 28, urging the leg portions of the seat occupant in the direction of the arrow A. In this state or in normal traveling condition, the pelvis plate 66 and the pressure receiving plate 146 hardly deflect relative to its non-settling condition. The cushion material 22 under this condition is located at the point of equilibrium and has a substantially zero spring characteristic. In FIGS. 24–27, graphic representation of the cushion materials 20, 22, 24 is omitted.

When the vehicle seat 100 is applied to a driver's seat, a seat occupant operates a brake pedal, an accelerator pedal and the like by depressing. At this time, the pressing plate 48 of the leg portion supporting mechanism 32 supports the operation of the leg portion of the seat occupant by the urging force in the direction of the arrow A of the stretch coil spring 44, thereby improving the operability.

The side frame upper 80 of the impact absorbing side frame 77 rotates in the direction of the arrow E and is restored repeatedly with respect to the side frame lower 78 accompanied by the breathing of the seat occupant (minute body motion within a range maintaining the substantially zero spring characteristic without largely deflecting from the point of equilibrium).

Consequently, even if the seat occupant swings in the front-rear direction due to his breathing, that swing is absorbed by changes in the tension of the cushion material 22 based on the displacement (deformation of the back frame 16) of the side frame upper 80. Thus, under a normal seating condition, a load to the seat occupant is reduced improving comfort in being seated and further a fatigue after seated for a long time is reduced.

Here, the impact absorbing side frame 77 is so constructed to be capable of deflecting in the right and left direction (angle displacement in the direction of the arrow E) to the side frame lower 78 of the side frame upper 80 and the cushion material 22 having a tensional structure indicating soft characteristic to a weak load is provided in a stretched manner over the back frame 16 having the impact absorbing side frame 77. Thus, the seat back 23 absorbs the body motion of the seat occupant following changes in load accompanied by the breathing of the seat occupant, thereby improving the comfort in being seated. Further, a fatigue due to be seated for long hours is reduced. Particularly because the cushion material 22 provided in a stretched manner over the back frame 16 has a Duffing type spring constant characteristic, which turns to substantially zero spring characteristic at the point of equilibrium, the seat back 23 absorbs the body motion of a seat occupant effectively following changes in load accompanied by the breathing securely, so that the comfort in being seat is further improved and a fatigue due to be seated for long hours is reduced.

Further, because the Duffing type spring constant characteristic turns to a large equivalent spring constant to a large load due to an impact or the like, a sufficient stiffness resistant to that large load is secured.

Further because the vehicle seat 100 in which the seat cushion 21 and the seat back 23 are constituted by stretching the cushion materials 20, 22 over the seat frame 12 of multi-joint structure absorbs (shuts out) a vibration propagated from a vehicle body in normal traveling conditions, the vibration is hardly transmitted to the seat occupant, thereby improving the comfort in being seated, that is, comfort of riding on a vehicle.

(Operation when Impact Energy at the Time of a Collision is Relatively Small)

Figure 25:
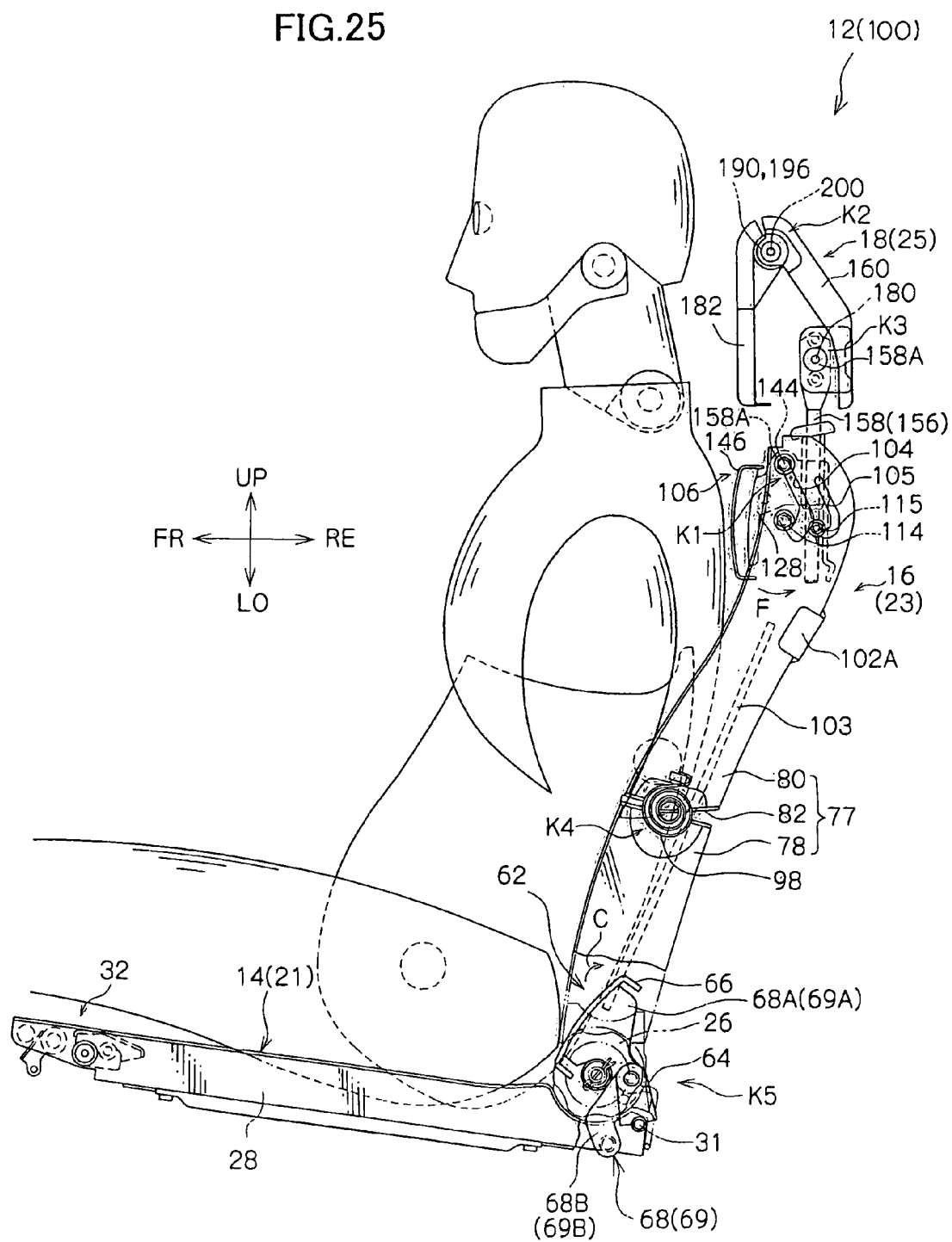
FIG. 25 is a side view showing an initial state after collision of the vehicle seat according to the second embodiment of the invention.

When a collision occurs in a vehicle from backward, a seat occupant is moved backward relative to the vehicle seat 100 by an impact accompanied by that collision. As shown in FIG. 25, the seat occupant moved backward presses the pelvis plate 66 backward through the cushion material 22 through a body portion in the vicinity of the hip (waist portion) while pressing the pressure receiving plate 146 backward through the cushion material 22 through a body portion near the shoulder blade (breast portion).

Then, in the pelvis plate mechanism 62, a reaction force is generated based on an elastic twisting load of the torsion bar 76 so as to rotate the pelvis plate 66 in the direction of an arrow C, supporting the vicinity of the hip of the seat occupant and moving the seat occupant backward, so as to absorb the impact energy. That is, the impact energy at the lower portion of the body of the seat occupant is absorbed by a reaction force accompanied by an angle displacement of the joint K5 of the link mechanism L4.

On the other hand, in the pressure receiving portion 106A of the head rest moving mechanism 106, a reaction force is generated based on the elastic twisting load of the torsion bar 144 and the pressure receiving plate 146 is rotated in the direction of the arrow F so as to absorb the impact energy. That is, the impact energy on the upper part of the upper body of the seat occupant is absorbed by the reaction fore accompanied by the angle change of the joint K1 of the link mechanism L1.

Further, in the head rest moving mechanism 106, if the angle displacement of the pressure receiving plate 146 increases over a predetermined value, the impact force applied from the seat occupant is transmitted to the link arm 108 and the guide member 110 as a backward moving force and the guide member 110 moves from the first position downward in the backward direction while being guided by the slide guides 104, 105 and further moves to the second position due to the urging force of the stretch coil spring 124.

That is, if the head rest moving mechanism 106 moves backward due to a difference between the impact load applied to the pressure receiving plate 146 and the reaction force generated by the torsion bar 144, the holding condition of the guide member 110 to the first position is released so that it is moved to the second position by the urging force of the stretch coil spring 124.

Consequently, the head rest 25 moves instantaneously to a position corresponding to the head portion of the seat occupant which moves upward, that is, backward in the upward direction. Because at this time, the pressure receiving plate 146 and the bracket 128 are rotated in the direction of the arrow F and kept in that condition, the pole guide 54 tilts forward and the head rest also tilts forward, approaching the head portion. That is, the head rest 25 moves forward because the pressure receiving plate 146 rotates in the direction of the arrow F before the head rest moving mechanism 106 moves upward accompanied by the moving to the second position.

Figure 26:
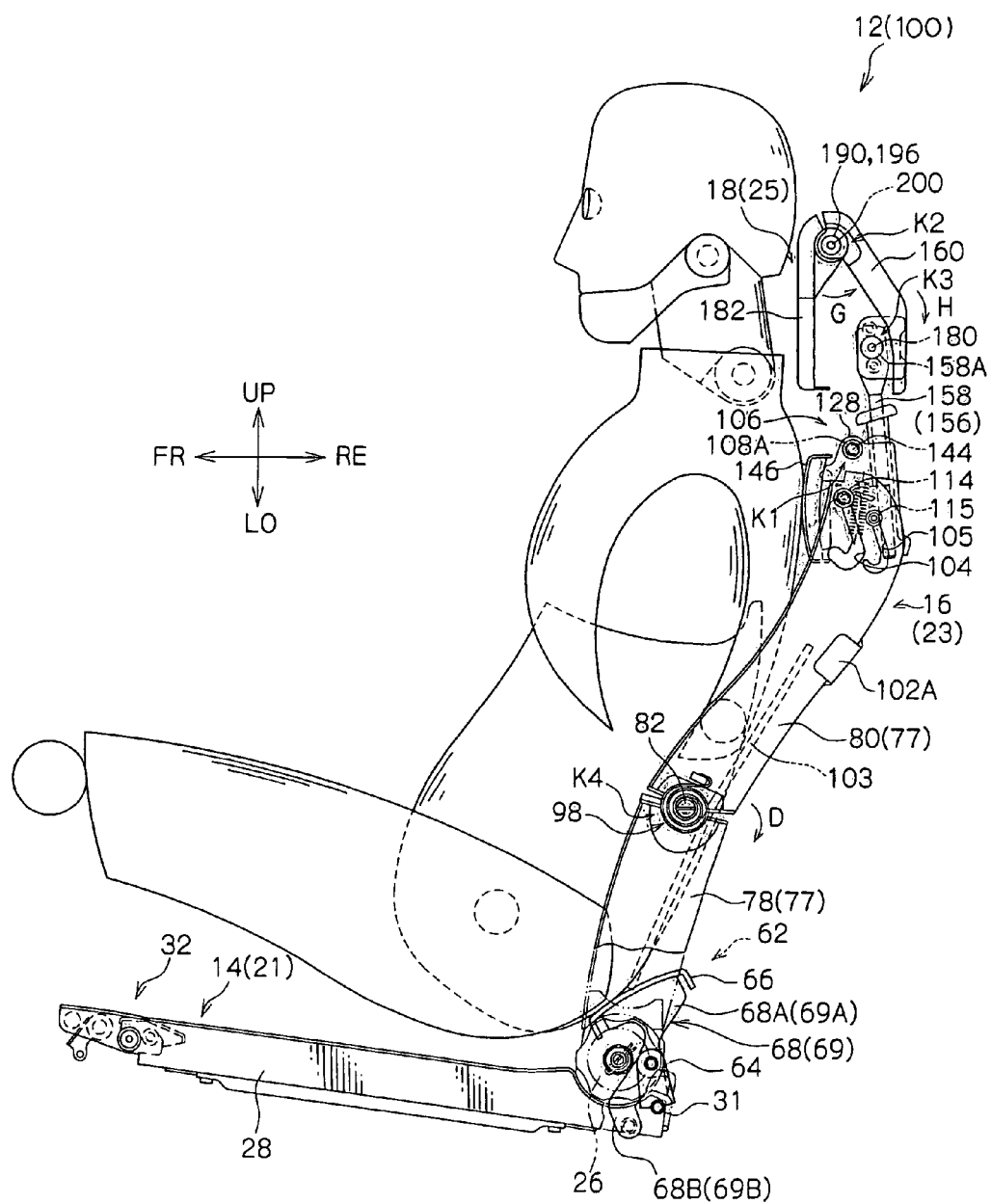
FIG. 26 is a side view showing an intermediate state after collision of the vehicle seat according to the second embodiment of the invention.

Then, when the head portion of the seat occupant presses the head rest 25 backward as shown in FIG. 26, the head rest frame 18 or the link mechanism L2 generates a reaction force based on the elastic twisting load of the torsion bar 200 while the front half 182 rotates in the direction of the arrow G, absorbing the impact energy.

Further, when the angle displacement of the front half 182 becomes over a predetermined value, a reaction force is generated based on the elastic twisting load of the torsion bar 180 while the rear half 160 rotates in the direction of the arrow H, absorbing the impact energy. That is, the link mechanism L2 (head rest frame 18) changes the angles of the respective joints K2, K3 with a passage of time due to a difference between the reaction force generated at each time and the backward moving load of the seat occupant, thereby absorbing the impact energy on the head portion of the seat occupant.

Figure 27:
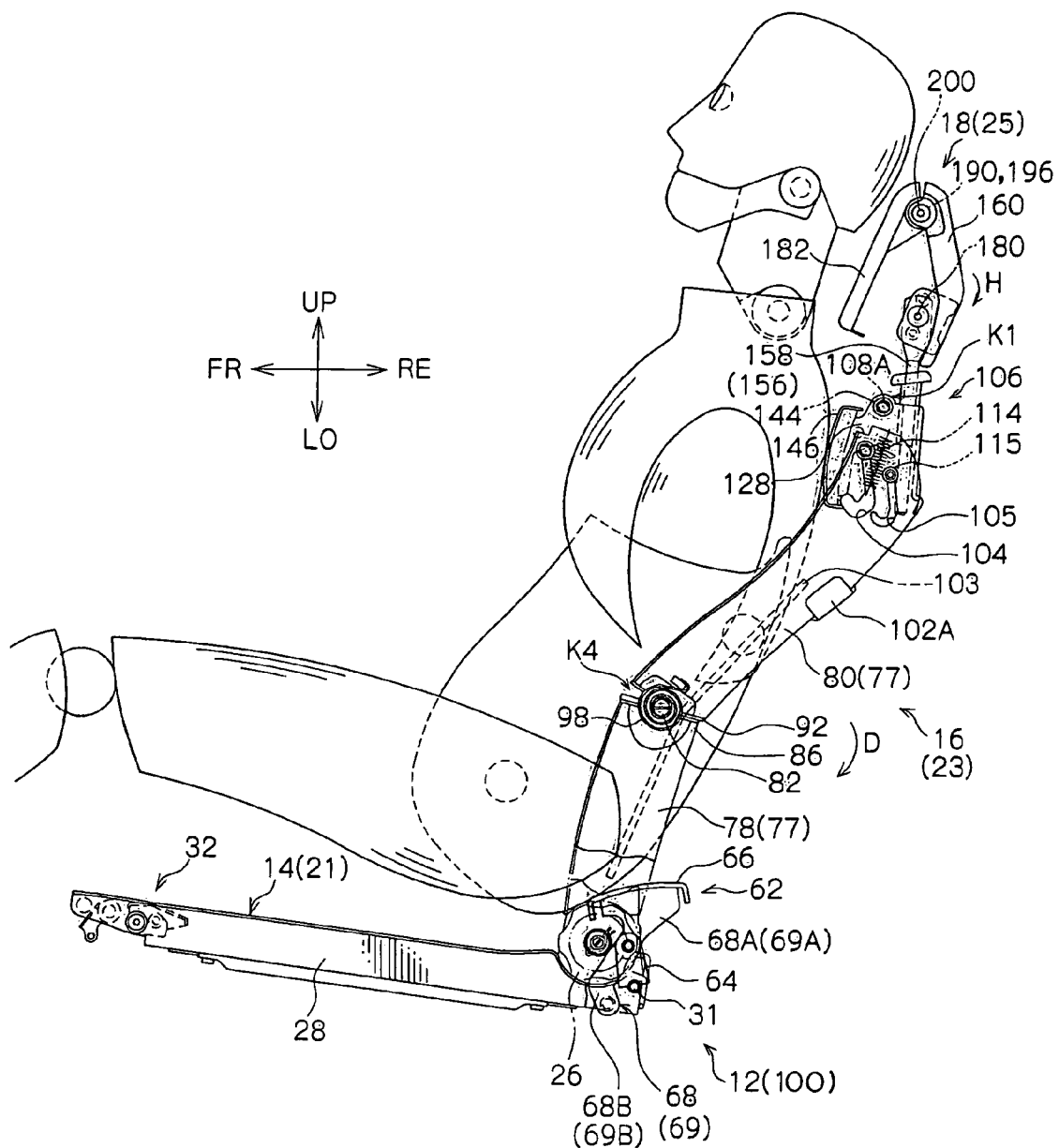
FIG. 27 is a side view showing a final state after collision of the vehicle seat according to the second embodiment of the invention.

As shown in FIGS. 26, 27, if the angle displacement of each joint K2, K3 becomes over a predetermined value, a reaction force based on the elastic deformation of the spiral spring 98 is generated by a backward moving load acting on the pressure receiving plate 146 and the head rest 25 based on a remaining impact energy absorbed by the pressure receiving portion 106A and the head rest 25 and the side frame upper 80 rotates in the direction of the arrow D, absorbing the impact energy.

That is, the impact absorbing side frame 77 absorbs the remaining impact energy which applies the backward moving load over a predetermined value to the seat occupant by a reaction force accompanied by the angle displacement of the joint K4 of the link mechanism L3. At this time, because the paired right and left side frame uppers 80 support the head rest 25, the head rest 25 moves further backward so as to reduce a peak value of a load applied to the head portion of the seat occupant in the remaining energy absorption process.

If this remaining energy is large, the rivets 68C, 69C of the supporting brackets 68, 69 in the pelvis plate mechanism 62 rupture so as to deflect the pelvis plate 66 largely in the direction of the arrow C without receiving any reaction force of the torsion bar 76, reducing a load applied to the waist portion of the seat occupant and supporting for an effective impact absorption with the above-described impact absorbing side frame 77.

Consequently, the impact load applied to the seat occupant at the time of a collision from backward is dispersed and absorbed by the angle displacement accompanying the reaction force of each joint thereby preventing a large load from being applied locally to the seat occupant. That is, the peak value of the impact force applied to the seat occupant is reduced. Consequently, the probability that the passenger may be injured by the vehicle collision drops. The collision from backward has been stated for the second embodiment above, and the same effect can be obtained for the case of a collision from forward.

In this way, because in the vehicle seat 100, its seat frame has the multi-joint structure, when a seat occupant is pressed against the seat back 23 and the head rest 25 at the time of a collision, the seat frame 12 is deformed following the body of the seat occupant, thereby absorbing the impact by a reaction force generated accompanied by the deformation of the respective joints K1–K5 so as to support the seat occupant. Thus, the load applied to the seat occupant is dispersed to reduce the peak load. Because the seat frame 12 is of multi-joint structure, the load applied to the seat occupant can be dispersed by securing a substantial (sufficient) impact absorbing stroke within a small space.

Because the joints K1, K2, K3, K4 deflect in time series following changes in posture of the seat occupant with the timing deviated successively in this order (with the operation timing overlapping), the vehicle seat 100 (seat frame 12) follows up dynamic changes of load applied to the seat occupant securely, thereby supporting the load of the seat occupant (absorbing the impact).

Further, because the head rest 25 is situated not to obstruct a driving operation and moves to a position appropriate for protection of the head portion instantaneously at the time of a collision, both usability at normal time and protection at the time of a collision are achieved. Further, because the head rest moving mechanism 106 for moving the head rest 25 is constructed to include the pressure receiving portion 106A for absorbing the impact load from the seat occupant, part of the impact energy is absorbed in the vicinity of the head portion of the seat occupant before the moving of the head portion is restricted, so as to reduce an energy for moving the head portion and consequently, an occurrence of whiplash can be suppressed effectively.

Further, because the head rest 25 itself has the head rest frame 18, which is an impact absorbing head rest mechanism of multi-joint structure and absorbs the impact by its own deformation, the head portion is protected further effectively.

Because the back frame 16 is constructed with the impact absorbing side frames 77 (link mechanism L3) and the impact absorbing side frame 77 is set up to operate by a load based on the remaining impact energy inputted through the pressure receiving plate 146 and the head rest 25, the impact load applied to the seat occupant while changing dynamically can be dissipated effectively.

Further, although the seat occupant tends to slide upward while pressing the seat back 23 backward by an impact force applied backward at the time of a collision, because the pelvis plate mechanism 62 which rotates upward in the backward direction while supporting the seat occupant so as to absorb the energy is provided, the energy tending to move the seat occupant upward is absorbed effectively. That is, the impact energy to be absorbed by the pressure receiving portion 106A, the head rest 25 and the impact absorbing side frame 77 is reduced.

Further, because the impact is absorbed while moving the seat occupant upward in the backward direction along a circular trajectory, a larger impact absorption stroke can be secured in a smaller space as compared to the case where the seat occupant is moved backward linearly.

Therefore, the vehicle seat 100 can be applied to a small vehicle so as to absorb the impact preferably.

(Operation in Case where the Impact Energy at the Time of a Collision is Relatively Large)

Due to the impact accompanied by a collision, a seat occupant moves relative to the vehicle seat 100 and presses the pelvis plate 66 through the cushion material 22 backward with the portion in the vicinity of the hip (waist portion) while pressing the pressure receiving plate 146 through the cushion material 22 with a portion in the vicinity of the shoulder blade (breast portion). Then, in the pelvis plate mechanism 62, the pelvis plate 66 receives a reaction force and rotates in the direction of the arrow C, absorbing the impact energy while receiving the reaction force from the torsion bar 76 until the rivets 68C, 69C rupture, and after the rupture, the seat occupant is permitted to move largely upward in the backward direction.

At this time, in the head rest moving mechanism 106, the pressure receiving plate 146 rotates in the direction of the arrow F while receiving a reaction force of the torsion bar 144, absorbing the impact energy. Because the impact energy or an impact force inputted to the seat back 23 from the seat occupant is large, the side frame uppers 80 receive the reaction force of the spiral springs 98 and rotate in the direction of the arrow D before or substantially at the same time when the head rest 25 moves to the second position.

According to the second embodiment, it has been recognized that about 60 msec after the collision, the rotation of the side frame upper 80 begins. The impact energy of the seat occupant is absorbed by the operation of this impact absorbing side frame 77. In this impact absorption process, the side frame lowers 78 (lower portions of the seat back 23) support the waist portion of the seat occupant released from the supporting by the pelvis plate 66 and block the waist portion from tilting backward.

In the impact absorption process by the impact absorbing side frame 77 (with the upper portion of the upper body kept substantially horizontal), the head portion of the seat occupant makes contact with the head rest 25 and presses and the joints K2, K3 deflect successively to absorb the impact energy at the head portion of the passenger. At this time, most of the impact energy is absorbed and the impact load applied to the head portion of the seat occupant is small.

In the above process, the impact load applied to the seat occupant at the time of a collision is dissipated by the angle displacement accompanying the reaction force of the impact absorbing side frame 77 (joint K4) and absorbed and even if the impact energy is large, the seat occupant is protected from an application of a local large load.

More specifically, by absorbing the impact energy in dissipated condition, the peak value of the impact load applied to the breast portion and waist portion of the seat occupant is reduced thereby dropping a damage given to the seat occupant considerably.

This fact has been made evident through a backward collision experiment under the same condition about a conventional high stiffness seat having no joint structure at its frame. More specifically, an impact equivalent to the backward collision was inputted to a vehicle model loaded with the vehicle seat 100 or the conventional seat and a synthetic acceleration (synthesis of accelerations in respective directions) acting on the breast portion and waist portion was measured.

As a result, although the floor acceleration on an experiment for each seat or an acceleration inputted to the seat was substantially identical, it was recognized that in the vehicle seat 100, the peak value of an acceleration (that is, load) applied to the breast portion and the waist portion was reduced largely.

The operation and effect are achieved by side frame upper 80's rotating in the direction of the arrow D to dissipate the impact energy at a timing in which the acceleration at the breast portion maximizes at the time of a collision from backward (about 60 msec after the collision from backward occurs). That is, in the vehicle seat 100, if the inputted impact energy is large, mainly the joint K4 in the seat frame 12 of multi-joint structure contributes to absorption of the impact.

Additionally, a comparative experiment was carried out with a comparative example seat instead of the conventional seat. In this comparative example seat, the bottom end portion of the seat back is connected to the rear end of the seat cushion rotatably and at the time of collision from backward, the seat back rotates to fall down backward while receiving a reaction force. Even if comparing with such a comparative example seat, in the vehicle seat 100, it was recognized that the peak value of the impact load applied to the breast portion and waist portion dropped.

Further, in the above-described comparative example seat, it was recognized that the waist portion of a dummy figure tilted due to a rotation (fall) of the seat back backward, so that both legs are raised in delay from the fall of the waist portion.

Contrary to this, in the vehicle seat 100, the waist portion of the seat occupant is raised upward in the backward direction by the pelvis plate mechanisms 62 and after that, the impact load is supported by the right and left side frame lowers 78 (cushion material 22 supporting the tension). Thus, although the upper body of the seat occupant tilts backward accompanied by the rotation of the side frame upper 80 in the direction of the arrow D, the waist portion of the seat occupant is prevented from tilting backward.

According to the above-described experiment, it was confirmed that at 240 msec when the legs of the dummy figure were raised to a highest position, the waist portion of the dummy figure on the vehicle seat 100 is supported by the side frame lowers 78 such that it leaned backward thereby suppressing the leg height low.

Consequently, the velocity of raising the legs of the seat occupant accompanied by the absorption of an impact upon a collision from backward is relaxed thereby suppressing a load applied to the legs of the seat occupant to a small level. That is, the legs of the seat occupant are protected securely at the time of the collision from backward.

As described above, in the vehicle seat 100, if the impact energy is relatively small, for example, when a seat occupant weighs light or a collision velocity is low, the seat back 23 (pressure receiving plate 146) and the head rest 25 are pressed against the seat occupant. Consequently, the side frame uppers 80 rotate in the direction of the arrow D, thereby absorbing the impact energy gradually.

On the other hand, if the impact energy is relatively large, the side frame upper 80 rotates in the direction of the arrow D despite an input from only the seat back 23 (pressure receiving plate 146), thereby absorbing the impact energy early. Thus, the remaining impact energy when the head portion of the seat occupant comes into contact with the head rest 25 is small and thus, even when the impact energy is large, the seat occupant is protected.

In the vehicle seat 100 of the second embodiment, the follow-up performance to a seat occupant (human body) can be improved. Particularly because the vehicle seat 100 is constructed by stretching the cushion materials 20, 22, 24 which are sheet-like tension structure bodies over the seat frame 12 (mainly the back frame 16 and head rest frame 18), it is not necessary to provide with any actuator, sensor or the like to make respective components follow up the seat occupant.

(Modification of the Buffering Member)

Figure 28:
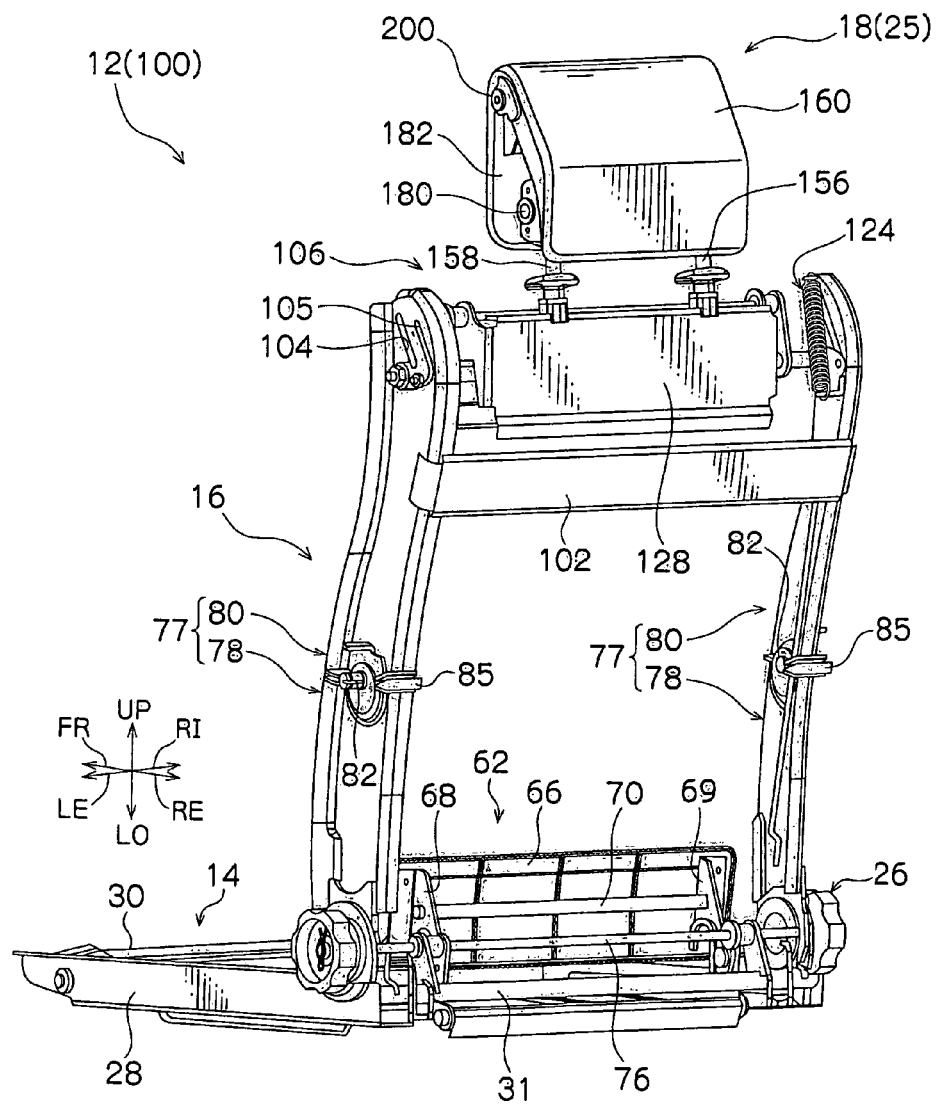
FIG. 28 is a perspective view showing a modification of a buffering member which constitutes the vehicle seat according to the second embodiment of the invention.

FIG. 28 shows a perspective of the seat frame 12 according to a modification. According to this modification, as shown in this Figure, the spring member 85 described in the first embodiment is adopted instead of the spiral spring 98 as a buffering member which constitutes the impact absorbing side frame 77 (joint K4). Because in the spring member 85, the top face of the plate spring portion 85A which is its top face is not fixed to the rear side stopper 92 of the side frame upper 80, the rotation of the side frame upper 80 is never obstructed from rotating in the direction of the arrow E (e1, e2) to the side frame lower 78.

The structure of this modification exerts completely the same operation as the second embodiment except that the reaction force acting when the side frame upper 80 deflects in the direction of the arrow D to absorb the impact energy on the upper body of the seat occupant includes restoring force and dampening force.

For the reason, the impact energy of the seat occupant is absorbed further effectively. That is, by dissipating the impact energy for absorbing, the peak value of the impact load applied to the breast portion and waist portion of the seat occupant is reduced largely, thereby reducing a damage upon the seat occupant considerably.

Figure 29A:
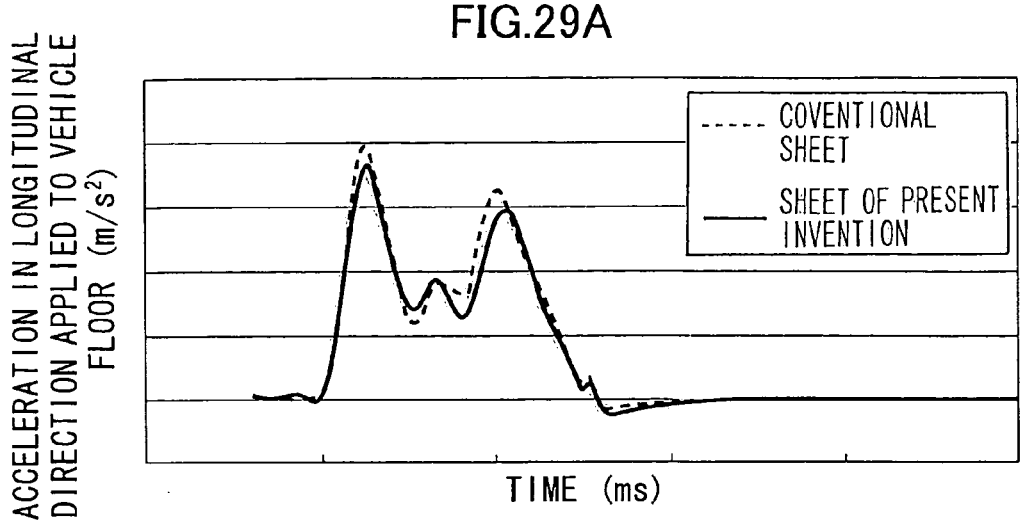
FIG. 29A is a diagram showing the result of a comparative experiment on the vehicle seat according to the modified example of the second embodiment of the invention and a conventional seat, and more specifically a diagram showing a floor input acceleration.
Figure 29B:
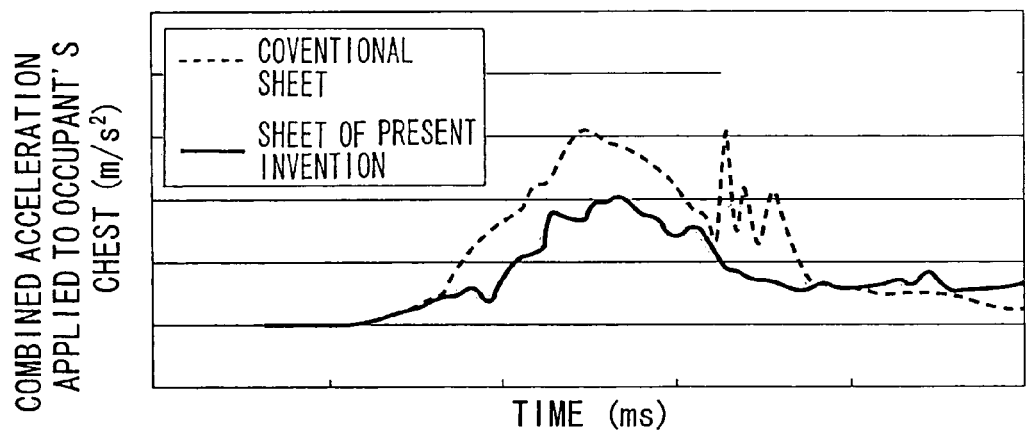
FIG. 29B is a diagram showing the result of a comparative experiment on the vehicle seat according to the modified example of the second embodiment of the invention and a conventional seat, and more specifically a diagram showing synthesized acceleration at the breast portion.
Figure 29C:
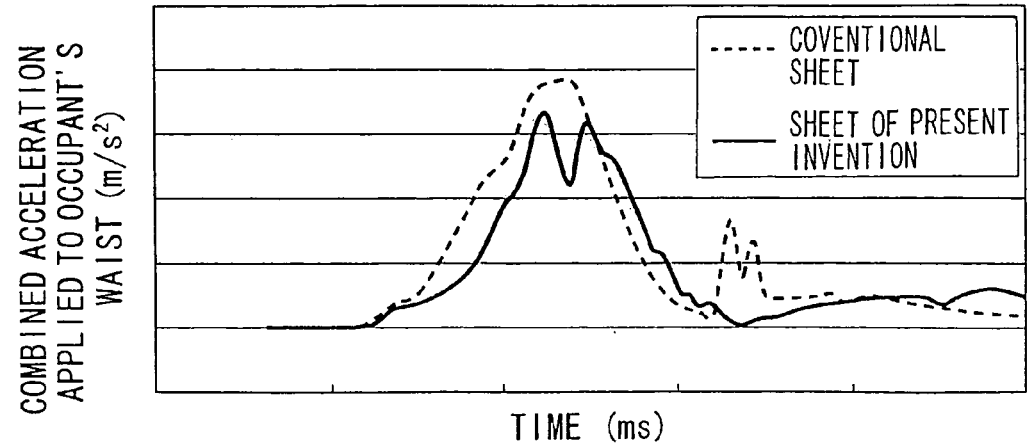
FIG. 29C is a diagram showing the result of a comparative experiment on the vehicle seat according to the modified example of the second embodiment of the invention and a conventional seat, and more specifically a diagram showing synthesized acceleration at the waist portion.

FIGS. 29A–29C show an experiment result corresponding to a case where the impact energy at the time of a collision from backward is relatively large in the vehicle seat 100 adopting the structure of this modification, that is, diagrams indicating changes of acceleration with a passage of time of each part (indicated with a solid line) in the impact absorption process at the time of collision from backward and changes of acceleration with a passage of time of a conventional high stiffness seat having no joint structure at its frame under the same condition (indicated with a dotted line).

More specifically, FIG. 29A shows an acceleration in the front-rear direction acting on the floor of a vehicle loaded with the vehicle seat 10 or the conventional seat, FIG. 29B shows a synthetic acceleration (synthesis of accelerations in respective directions) acting on the breast portion of the dummy figure (seat occupant) and FIG. 29C shows the synthetic acceleration acting on the waist portion of the dummy figure.

From these Figures, it is made evident that although the floor acceleration or the accelerations inputted to the seat are substantially identical, the peak value of the acceleration (that is, load) acting on the breast portion and waist portion is reduced largely in the vehicle seat 100.

This reason is that as described about the operation of the second embodiment, the side frame upper 80 begins to rotate in the direction of the arrow D at a timing (about 60 msec after the collision occurs) when the acceleration at the breast portion at the time of a collision maximizes as compared to the conventional seat having a high stiffness without any joint structure, thereby dissipating the impact energy.

That is, if the inputted impact energy is large even in the vehicle seat 100 adopting the structure of this modification, the joint K4 in the seat frame 12 of multi-joint structure contributes to absorption of the impact.

Figure 30A:
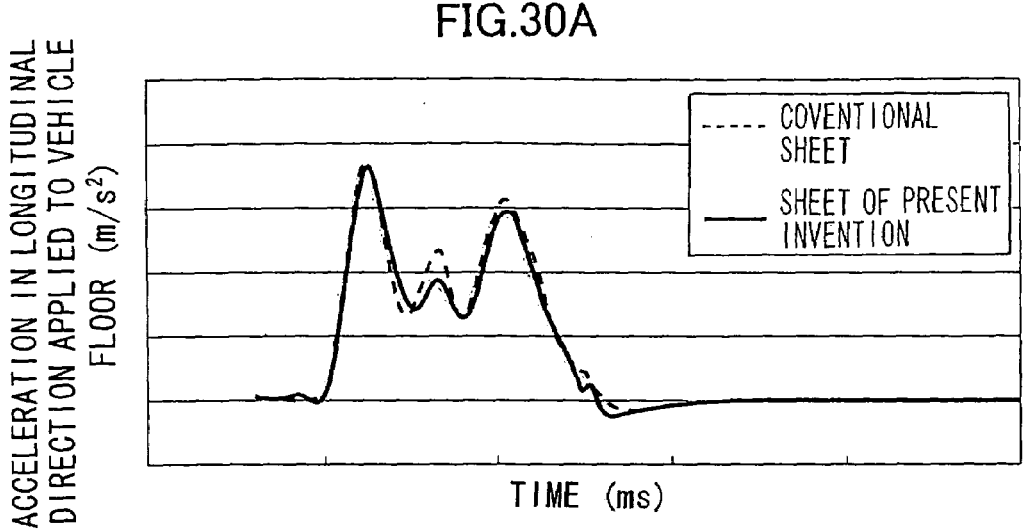
FIG. 30A is a diagram showing the result of a comparative experiment on the vehicle seat according to the modified example of the second embodiment of the invention and a comparative example seat, and more specifically a diagram showing floor input acceleration.
Figure 30B:
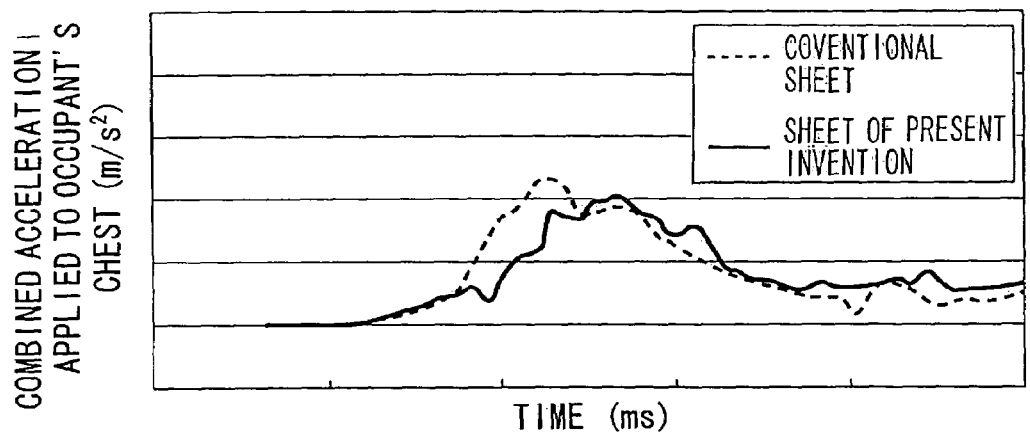
FIG. 30B is a diagram showing the result of a comparative experiment on the vehicle seat according to the modified example of the second embodiment of the invention and a comparative example seat, and more specifically a diagram showing synthesized acceleration at the breast portion.
Figure 30C:
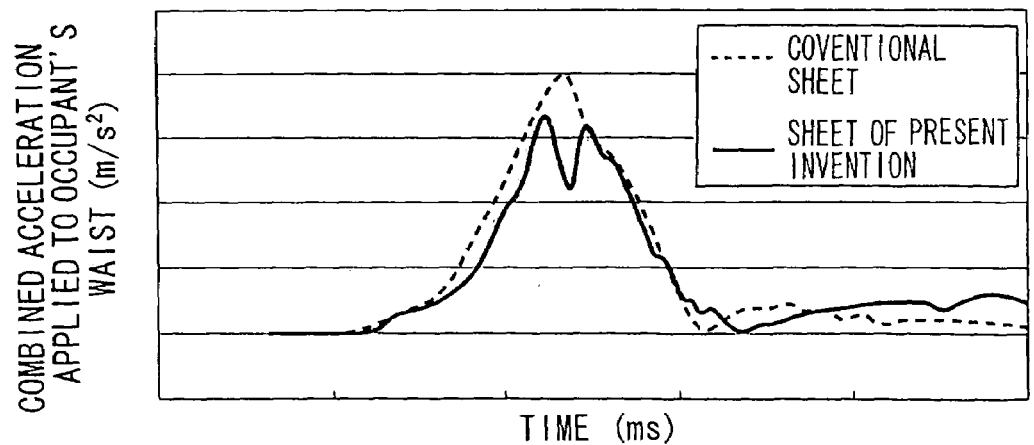
FIG. 30C is a diagram showing the result of a comparative experiment on the vehicle seat according to the modified example of the second embodiment of the invention and a comparative example seat, and more specifically a diagram showing synthesized acceleration at the waist portion.

FIGS. 30A–30C show a comparison of the experimental result of the vehicle seat 10 in FIGS. 29A–29C with the conventional comparative example seat. It is found that although the synthetic acceleration of the breast portion shown in FIG. 30B is reduced in the comparative example seat, the peak value of the acceleration on the waist portion shown in FIG. 30C is not reduced.

In the vehicle seat 100 adopting the structure of this modification also, the velocity of raising the legs of the seat occupant accompanied by the absorption of an impact upon a collision is relaxed like the first and second embodiments, so that even if the upward raised legs strike the steering wheel, a load acting on the legs of the seat occupant accompanied by this strike can be suppressed to a small level. That is, the legs of the seat occupant are protected securely at the time of a collision.

The impact absorbing side frame 77 is not restricted to a structure in which the spiral spring 98 or the spring member 85 is adopted independently, but can adopt a buffering member (reaction force generating structure) indicated by the first embodiment or its modification together with the spiral spring 98 instead of the spiral spring 98.

To secure a rotation of the side frame upper 80 in the direction of the arrow E (e1, e2) to the side frame lower 78, it is preferable to use members corresponding to the spiral spring 98, the spring member 85 or the rubber member 85B independently or in combination.

Third Embodiment

A vehicle seat 250 will be described as a seat according to the third embodiment of the invention with reference to FIGS. 31–33. Like reference numerals are attached to basically the same components as the vehicle seat 100 of the second embodiment and description thereof is omitted.

Figure 31:
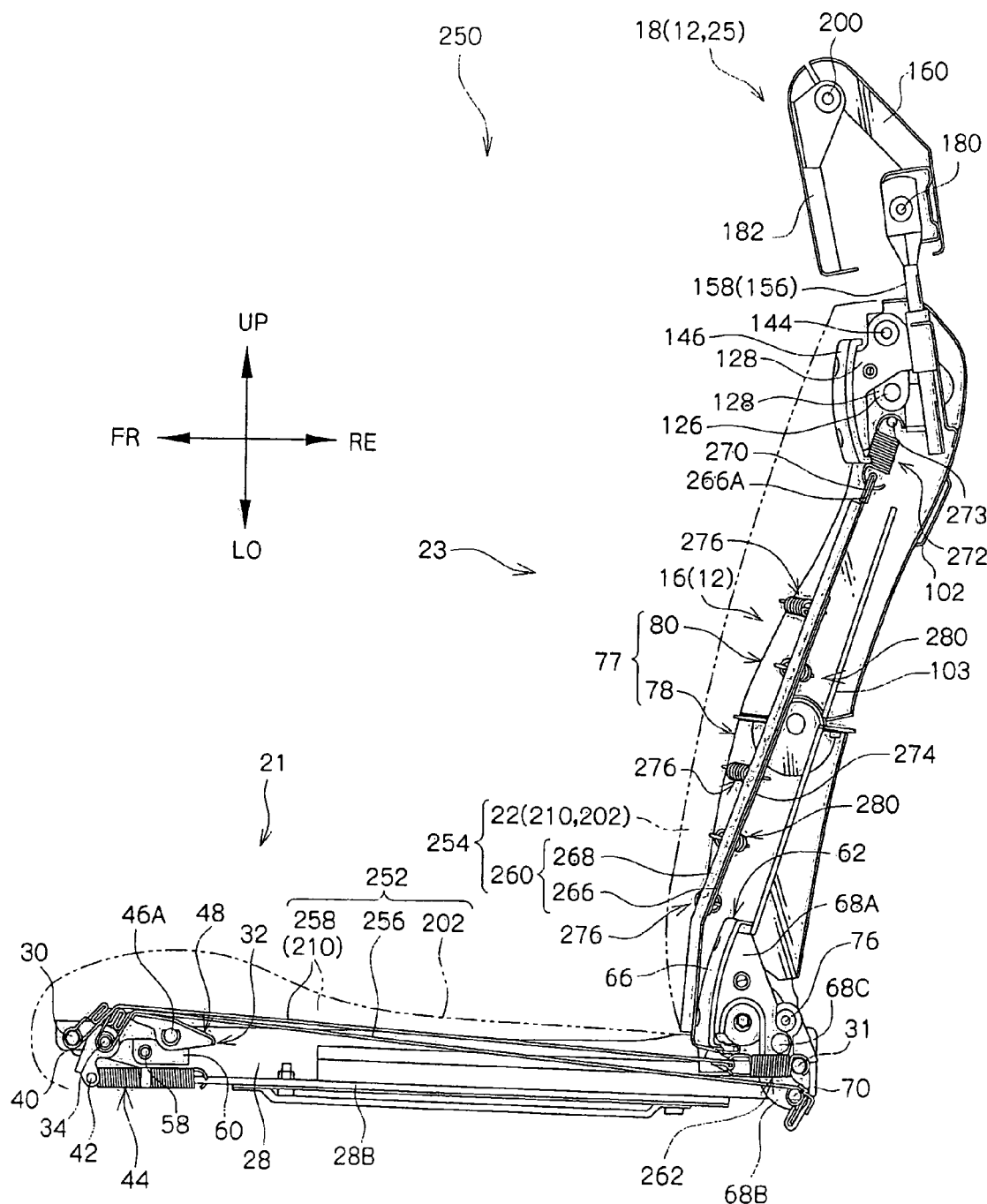
FIG. 31 is a side view of the vehicle seat according to a third embodiment of the invention, with a side frame located to viewer side having being removed.
Figure 32:
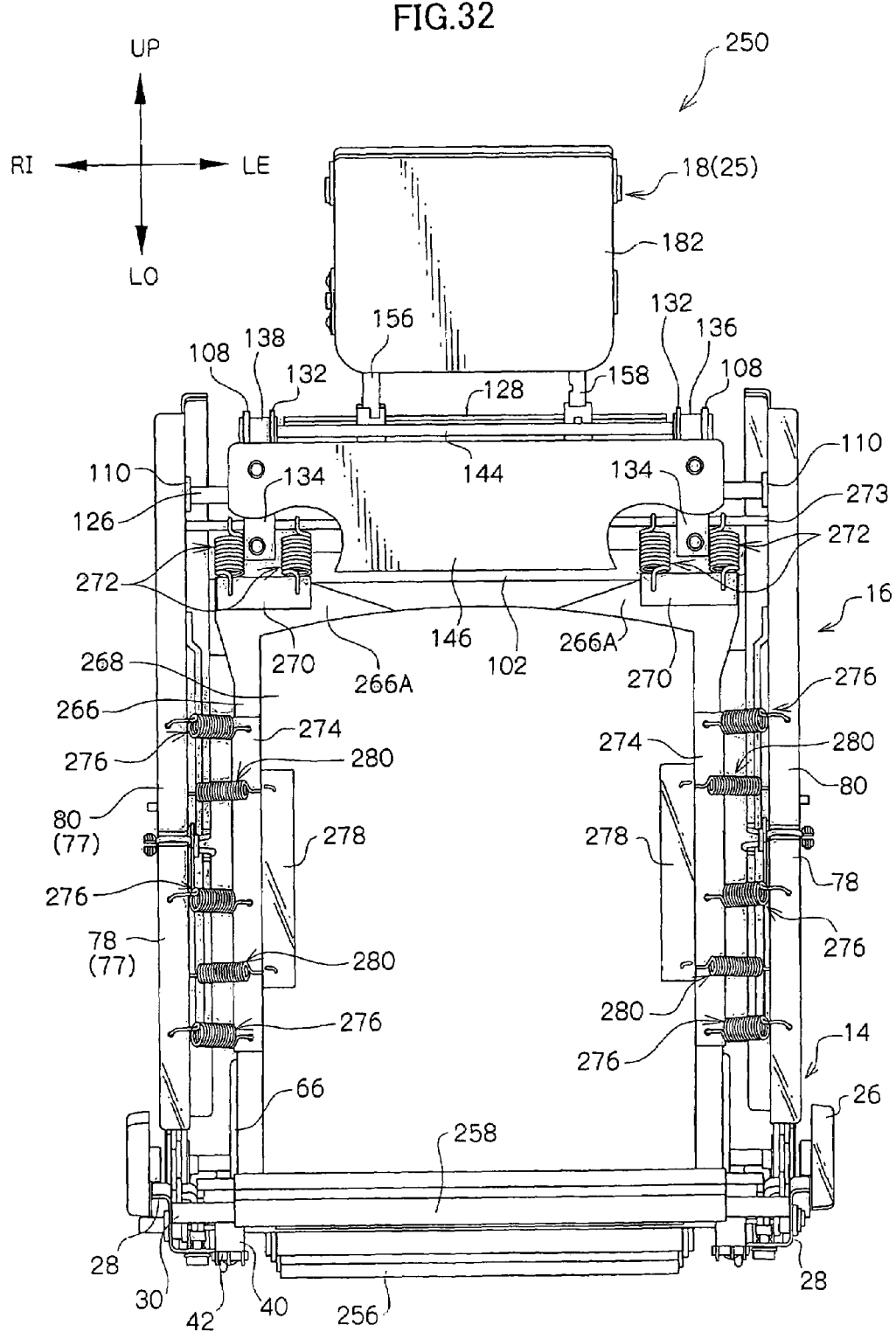
FIG. 32 is a front view of the vehicle seat according to the third embodiment of the invention.

FIG. 31 shows a side view of the vehicle seat 250 and FIG. 32 shows a partially broken side view of the vehicle seat 250. As shown in these Figures, the vehicle seat 250 is provided with the seat frame 12 and by providing the seating portion frame 14 of this seat frame 12 with a cushion material 252, the seat cushion 21 is constructed and by providing the back frame 16 with a cushion material 254, the seat back 23 is constructed. FIG. 31 is a side view thereof with the side frame 28 and the impact absorbing side frame 77 on viewer side removed.

The cushion material 252 is different from the cushion material 20 (in which a surface skin 202 is layered on a three-dimensional knitted structure 210 which is a three-dimensional tension structure body) in that a three-dimensional tension structure body 258 is layered on the two-dimensional tension structure body (cloth spring member) and the surface skin 202 is layered on the three-dimensional tension structure body 258. Further, the cushion material 254 is different from the cushion material 22 in that a lower cushion material 260 is layered below the cushion material 22. Hereinafter, this point will be described more in detail.

The two-dimensional tension structure body 256 which constitutes the cushion material 252 is two-dimensional woven fabric having net structure and can undergo elongation accompanying an internal dampening by tension and restoration by removing that tension. The front edge portion of this two-dimensional tension structure body 256 is engaged with the rotation shaft 34 of the leg supporting mechanism 32 fixedly (not following the rotation of the rotation shaft 34).

Figure 33:
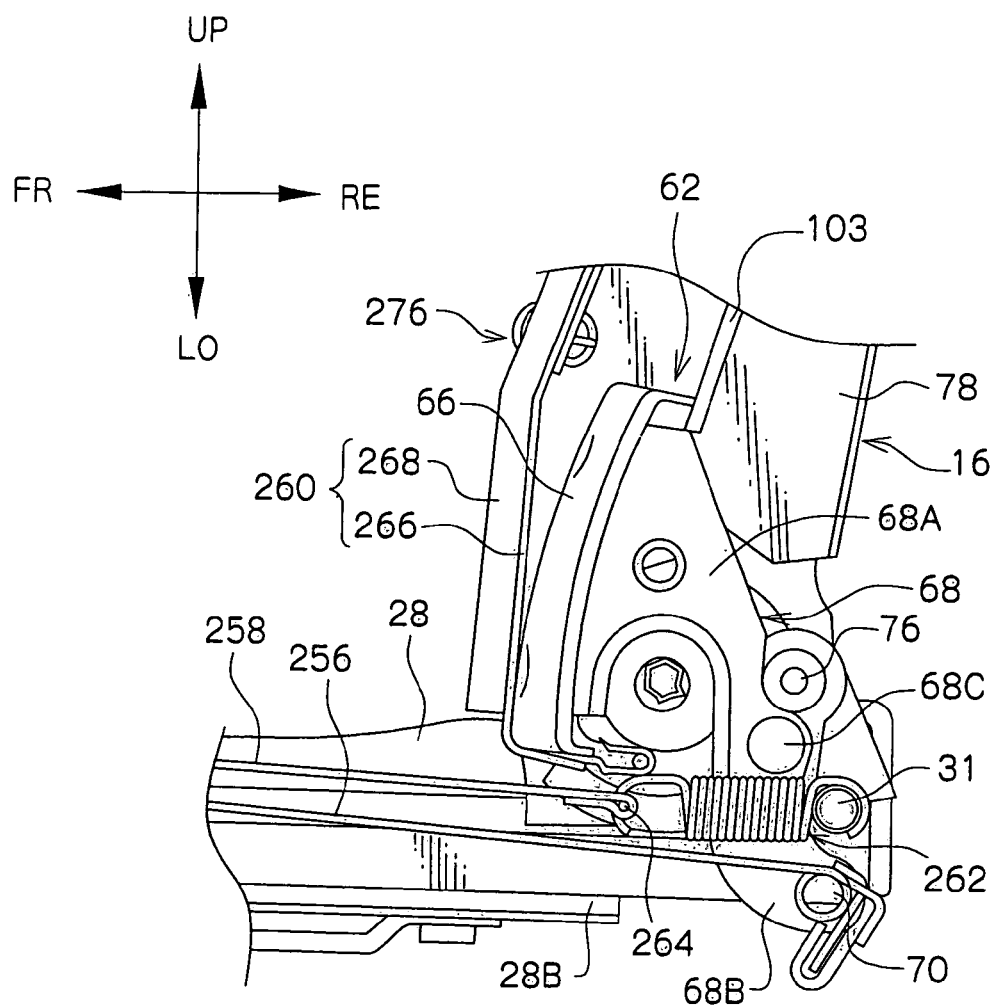
FIG. 33 is a partially enlarged side view of the vehicle seat according to the third embodiment of the invention, with a side frame located to viewer side having being removed.

As shown in FIG. 33, the rear edge portion of the two dimensional tension structure body 256 is engaged with the reinforcement pipe 70 which constitutes the pelvis plate 62 and links with the torsion bar 76. The reinforcement pipe 70 follows up the rotation of the pelvis plate 66 in a range in which the rivets 68C, 69C do not rupture and moves substantially downward in a forward direction by the rotation of the pelvis plate 66 in the direction of the arrow C.

Consequently, the two-dimensional tension structure body 256 twists the torsion bar 76 by a tension and rotates the reinforcement pipe 70 in the direction of the arrow C and then rotates the pelvis plate 66 in the direction of the arrow C, thereby moving the reinforcement pipe 70 forward in the downward direction, so that the two-dimensional tension structure body gets loose and the tension drops.

The three-dimensional structure body 258 which constitutes the cushion material 252 is fixed to the frame pipe 30 through its front edge portion and the rear edge portion is engaged with the frame pipe 31 through a tension coil spring. 262.

More specifically, a rod-like skeletal member 264, which is provided in a stretched manner in the right and left direction, is fixed on the rear edge portion of the three-dimensional tension structure body 258. An end portion of the paired tension coil springs 262 which are disposed outside in the right and left direction of the supporting brackets 68, 69 while the other end thereof is engaged with the frame pipe 31, is engaged with the skeletal member 264. In the meantime, it is permissible to provide three or more pieces of the tension coil springs 262 along the right and left direction.

Although the two-dimensional tension structure body 256 and the three-dimensional tension structure body 258 are disposed apart from each other in the vertical direction from the intermediate portion in the back and for the direction (after the pressing plate 48) up to the rear edge portion in the non-seated condition, they are layered in the vertical direction when a passenger is seated. This three-dimensional tension structure body 258 is constituted of three-dimensional knitted structure 210 according to the second embodiment.

According to the second embodiment, the surface skin 202 which constitutes the cushion material 252 (seat cushion 21) is composed of real leather, three-dimensional tension structure body (three-dimensional knitted structure 210) or the like.

On the other hand, the lower cushion material 260 which constitutes the cushion material 254 of the seat back 23 is constituted by laying the three-dimensional tension structure body 268 on the two-dimensional tension structure body (cloth spring material).

The two-dimensional tension structure body 266 and the three-dimensional tension structure body 268 are integrated with each other at the center portion in the right and left direction by sewing together along the center line (back bone of a seat occupant) in the right and left direction of the back frame 16.

The two-dimensional tension structure body 266 is two-dimensional woven fabric having net structure and enables elongation accompanying internal dampening by tension and restoration by removing the tension. This two-dimensional tension structure body 256 has a stretchingly-provided portion 266A whose top end portion except in the center in the right and left direction is slightly stretched upward and outward in the right and left direction and is entirely formed substantially in the shape of a letter Y. A reinforcement member 270 is fixed to the top end of the stretchingly-provided portion 266A on the right and left sides by sewing and an end portion of each tension coil spring 272 is engaged with the reinforcement member 270.

The other end portion of each tension coil spring 272 is engaged with an engagement rod 273 provided in a stretched and fixed manner between the top ends (above the top edge of each stretchingly-provided portion 266A) of the right and left side frame uppers 80. According to the second embodiment, each stretchingly-provided portion 266A (reinforcement member 270) has two tension coil springs 272.

As shown in FIG. 33, the bottom edge portion of the two-dimensional tension structure body 266 is wound around the bottom end portion of the pelvis plate 66 which is rotatable to the back frame 16 (seating portion frame 14) and fixed thereon. The pelvis plate 66 rotates in the direction of the arrow C so as to move its bottom end portion substantially upward (see FIGS. 24–27).

Consequently, the two-dimensional tension structure body 266 twists the torsion bar 76 by tension and rotates the pelvis plate 66 in the direction of the arrow C and when the pelvis plate 66 is rotated in the direction of the arrow C, it gets loose and its tension is reduced.

Reinforcement members 274 are fixed on both the right and left sides of this two-dimensional tension structure body 266 by sewing and an end of each of the plural (three each according to the second embodiment) tension coil spring 276 is engaged with each reinforcement member 274. The other end of the tension coil spring 276 is engaged with the front edge portion of the impact absorbing side frame 77. Consequently, the two-dimensional tension structure body 266 is provided in a stretched manner over the back frame 16 as if it is pushed forward.

A reinforcement member 278 is fixed on each of the right and left sides of the three-dimensional tension structure body 268 layered on the two-dimensional tension structure body 266 by sewing. An end of each of the plural (two each according to the second embodiment) tension coil springs 280 is engaged with each reinforcement member 278.

The other end of each tension coil spring 280 is engaged with the intermediate portion in the front-rear direction of the impact absorbing side frame 77 so as to push the three-dimensional tension structure body 268 backward. Each tension coil spring 280 is disposed between the tension coil springs 276 in the height direction. That is, the tension coil spring 276 and the tension coil spring 280 are disposed alternately in the height direction.

According to the second embodiment, two tension coil springs 276 are engaged with each of the right and left side frame lowers 78 while a tension coil spring 280 is engaged therewith. And a tension coil spring 276 and a tension coil spring 280 are engaged with each of the right and left side frame uppers 80.

The other structure of the vehicle seat 250 is basically the same as that of the vehicle seat 100.

In the vehicle seat 250 having the above-described structure, a tension field which has three-dimensional tension directions is generated in the lower cushion material 260 provided in a stretched manner over the back frame 16 (and the pelvis plate 66).

The push force forward acting on respective portions in the height direction on both the right and left sides of the two-dimensional tension structure body 266 is relaxed or canceled by a push force backward acting on the three-dimensional tension structure body 268 at portions which the forward push force is applied and in a steady condition (state in which no change occurs in load acting on the seat back 23), a three-dimensional tension field is generated in the lower cushion material 260.

Because such a structure increases the surface stiffness of the lower cushion material 260, even if a large man is seated on the wide seat back 23 (back frame 16), this structure is capable of supporting him such that his back is not bent forward.

Supporting the lower cushion material 260 with three-dimensional tension (generating a three-dimensional tension field) is equivalent to changing the spring constant in a pressing direction of the lower cushion material 260 corresponding to a distribution of mass of the upper body of a seat occupant continuously along the height direction and consequently, a supported load when he is seated is dispersed.

As a result, in case of a conventional urethane seat, vibration energy transmitted from the back frame 16 is concentrated on a load concentrating portion in which the shape of the urethane (cushion material) is inconsistent with the shape of the seat occupant body. On the other hand, under this structure, vibration energy transmitted from the back frame 16 through the tension coil springs 272, 276, 280 is absorbed by the lower cushion material 260 (converted to a friction force between the two-dimensional tension structure body 266 and the three-dimensional tension structure body 268 and consumed). After that, this energy is inputted to the human body as a vibration corresponding to load distribution and thus, vibration which the seat occupant feels is reduced and feeling of comfort on riding is improved.

Further, if a shock vibration is inputted to the seat back 23 of the vehicle seat 250, the elongation of the tension coil spring 276 is increased to a force in the pressing direction (backward) so that the tension of the two-dimensional tension structure body is increased.

On the other hand, because the tension coil spring 280 which supports the three-dimensional tension structure body 268 contracts, the tension of the three-dimensional tension structure body decreases.

As a result, the deformation of the three-dimensional tension structure body 268 near the human body increases thereby enhancing absorption of vibration by the lower cushion material 260.

If the human body is pushed forward by a repellent force of the tension coil spring 276 which supports the two-dimensional tension structure body 266 and the two-dimensional tension structure body 266 deflects forward over an initial position before the passenger is seated, a force of the tension coil spring 280 pulling back the three-dimensional tension structure body 268 is applied (relatively increased). Consequently, a pushing force acting on the human body decreases rapidly. That is, the force trying to swing back the human body forward is relaxed quickly in a swing-back process and the amount of the swing-back (over shoot) of the human body over the initial position before the impact is inputted is reduced.

Because the lower cushion material 260 supported by the three-dimensional tension possesses non-linear elastic characteristic or dampening characteristic, if a shock-like pressing force backward acts on the seat back 23 by the swing of the human body accompanied by traveling over, for example, a protrusion or difference of step, the human body swing can be absorbed quickly thereby improving feeling of comfort on riding.

Further, if an impact load pressing the seat cushion 21 is inputted to the vehicle seat 250 accompanied by traveling over, for example, a protrusion or a difference of step, the tension is applied z(the tension is increased) to the three-dimensional tension structure body 258 through the surface skin 202 of the cushion material 252 and the two-dimensional tension structure body 256 disposed under it.

Consequently, the tension coil spring 262 supporting elastically the three-dimensional tension structure body 258 is elongated. The two-dimensional tension structure body 256 pulls the reinforcement pipe 70 whose rear edge portion is engaged substantially forward accompanied by a distortion backward, twists the torsion bar 76 connected to the reinforcement pipe 70 through the supporting bracket 68 and then, rotates the pelvis plate 66 mounted to the supporting bracket 68 in the direction of the arrow C.

At this time, when the reinforcement pipe 70 rotates forward in the downward direction, the tension of the two-dimensional tension structure body 256 is reduced (an increase in tension is suppressed as compared to a structure in which it is connected to an unmovable portion of the seating portion frame 14). Further, because in the seat back 23, the pelvis plate 66 rotates in the direction of the arrow C, the tension of the two dimensional tension structure body 266 whose bottom edge portion is engaged with the pelvis plate 66 is reduced so that looseness is generated in the two-dimensional tension structure body 266.

Thus, if an impact is inputted to the seat cushion 21, the tension of the cushion material 252 is reduced, so that a upward pushing force is decreased and a forward pushing force in the seat back 23 is deceased also, thereby reducing the impact energy (load at the time of absorption) acting on the seat occupant. Consequently, an excellent impact absorption effect can be obtained.

Further, because the two dimensional tension structure body 256 of the seat cushion 21 and the two-dimensional tension structure body 266 of the seat back 23 are engaged with the movable portion of the pelvis plate mechanism 62 (fourth link mechanism) which is a common tension adjusting mechanism, both the tensions decrease by a rotation of the pelvis plate 66 in the direction of the arrow C.

Thus, even if an impact is inputted to the seat back 23, the pelvis plate 66 rotates in the direction of the arrow C by a tension (distortion) acting on the two-dimensional tension structure body 266 and consequently, the tension of the two-dimensional tension structure body 266 is decreased (an increase in tension is suppressed) like when an impact is inputted to the seat cushion 21. Further, the reinforcement pipe 70 rotates forward in the downward direction so that the tension of the two-dimensional tension structure body 256 decreases.

That is, in case of the vehicle seat 250, when an impact is inputted to the seat cushion 21 and the seat back 23, the two-dimensional tension structure bodies 256, 266 are relaxed and the pushing forces upward of the seat cushion and forward of the seat back decrease, thereby an excellent impact absorption effect being obtained.

Further, if the impact load is inputted directly to the pelvis plate 66 (position corresponding to the seat back 23) from the waist portion (hip) of the seat occupant through the bottom portion of the cushion material 254 and then, the pelvis plate 66 rotates in the direction of the arrow C due to that load, the two dimensional tension structure bodies 256, 266 are relaxed thereby an excellent impact absorption effect being obtained like the above described respective cases.

Further, because in the vehicle seat 250, when the impact is absorbed by the impact absorbing side frame 77, a linear distance between the engagement rod 273 and the pelvis plate 66 is reduced accompanied by a rotation of the side frame upper 80 in the direction of the arrow D to the side frame lower 78, the tension of the tension coil spring 272 engaged with the engagement rod 273 and the tension of the two dimensional tension structure body whose top and bottom ends are engaged with the tension coil spring 272 and the pelvis plate 66 are reduced further when the impact is absorbed by the impact absorbing side frame 77. Likewise, the tension of the surface skin 202 of the cushion material 254 is reduced also.

Thus, in the vehicle seat 250, the impact energy (load at the time of absorption) acting on the seat occupant when the impact is absorbed by the impact absorbing side frame 77 is reduced thereby a further excellent impact absorption effect being obtained.

As described above, the vehicle seat 250 includes not only the impact absorption effect by the seat frame 12 of multi-joint structure in the vehicle seat 100 but also the impact absorption effect by the tension adjusting mechanism in the seat cushion 21 and seat back 23 and the impact absorption effect based on reduction of the tension by the two-dimensional tension structure body 266 and the surface skin 202 when the impact is absorbed by the impact absorbing side frame 77. Thus, the impact load applied to a seat occupant can be reduced largely. Therefore, needless to say, the vehicle seat 250 of the second embodiment is capable of obtaining the same effect as the vehicle seat 100 of the second embodiment as well as the above-described respective effects.

Fourth Embodiment

A vehicle seat 300 of the third embodiment of the invention will be described with reference to FIGS. 34–40. Like reference numerals are attached to the same components as the vehicle seat 100 of the second embodiment and description thereof is omitted.

Figure 34:
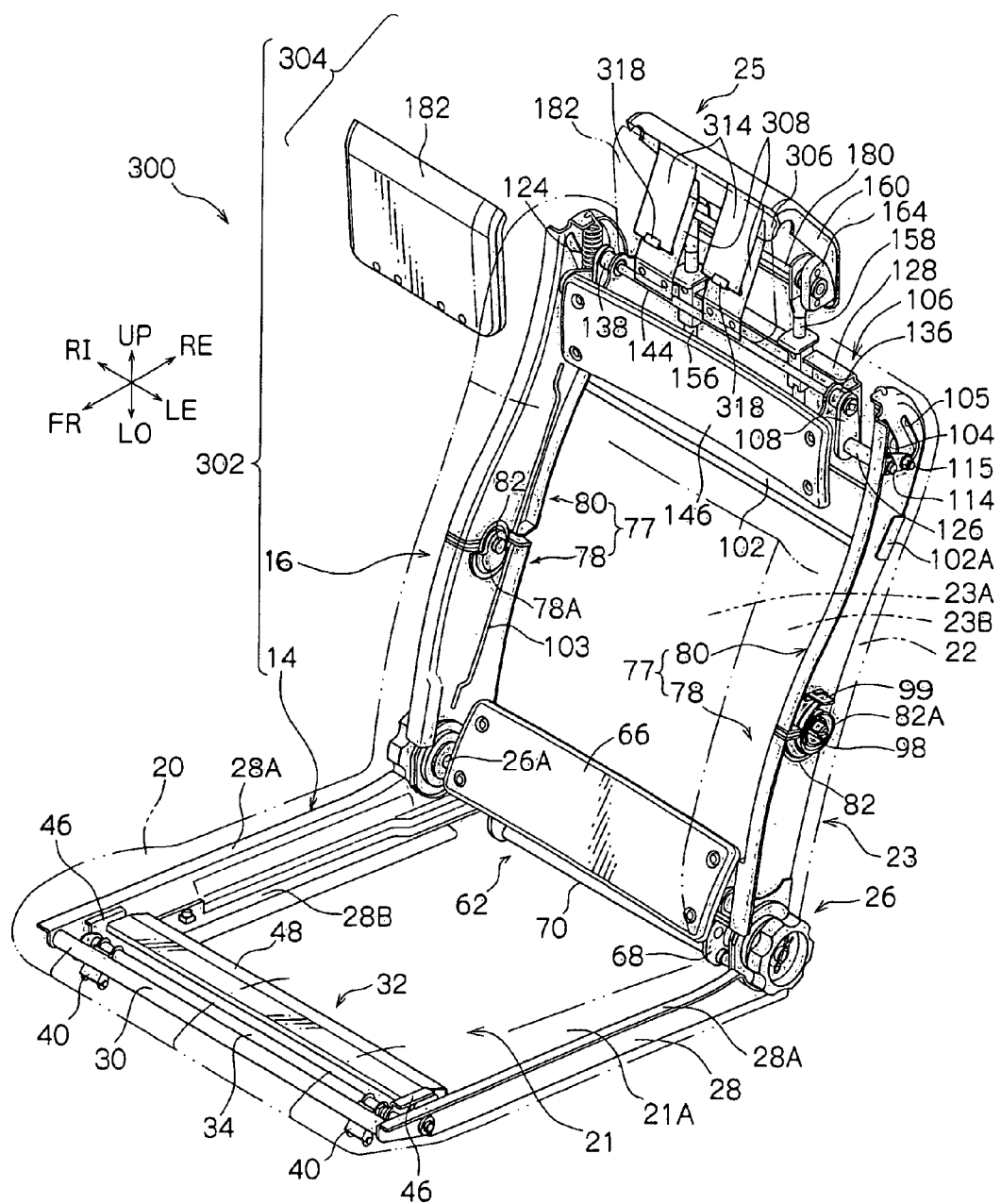
FIG. 34 is a perspective view of the vehicle seat according to a fourth embodiment of the invention, with the head rest being partially exploded.
Figure 35:
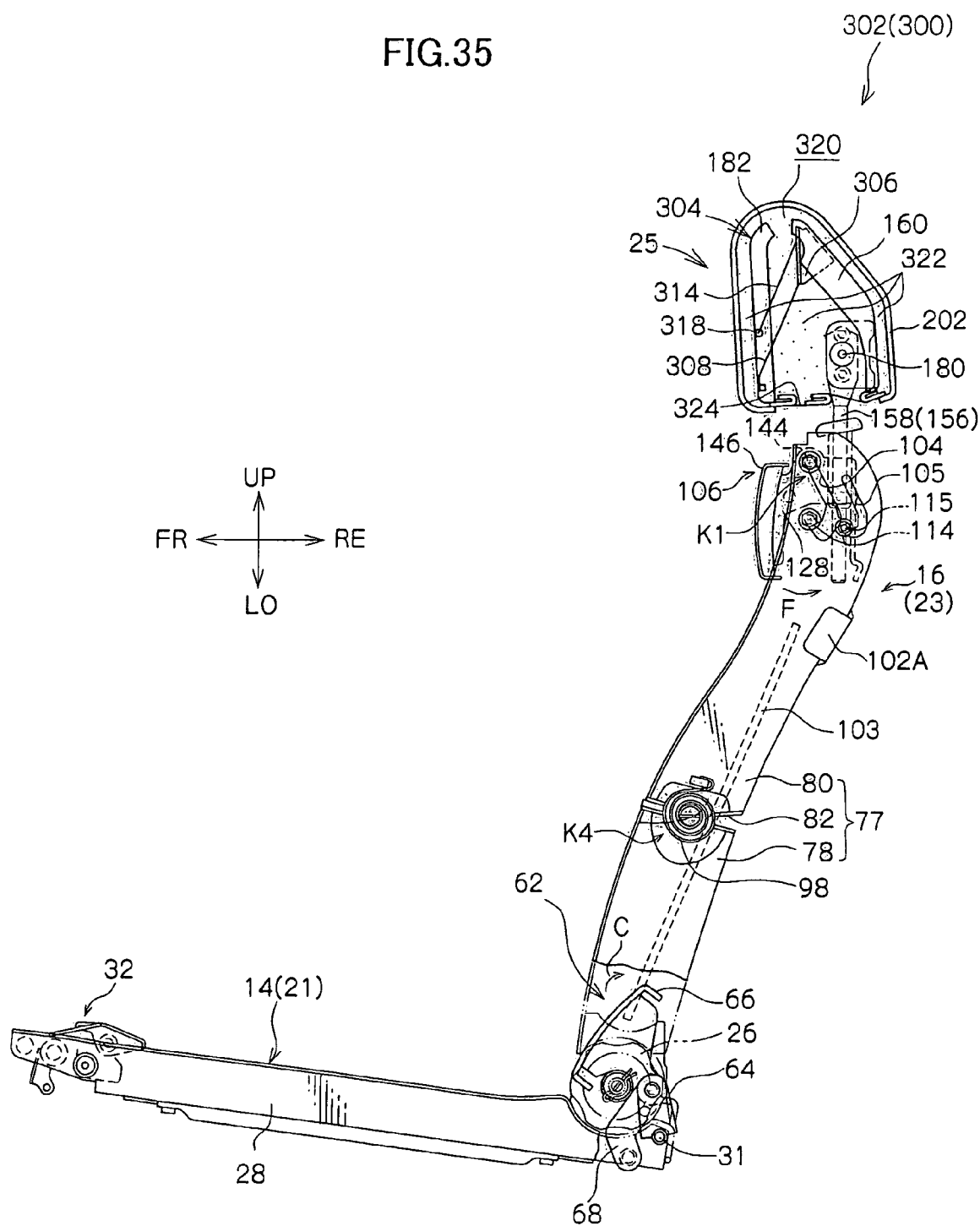
FIG. 35 is a side view of the seat frame which constitutes the vehicle seat according to the fourth embodiment of the invention.
Figure 36:
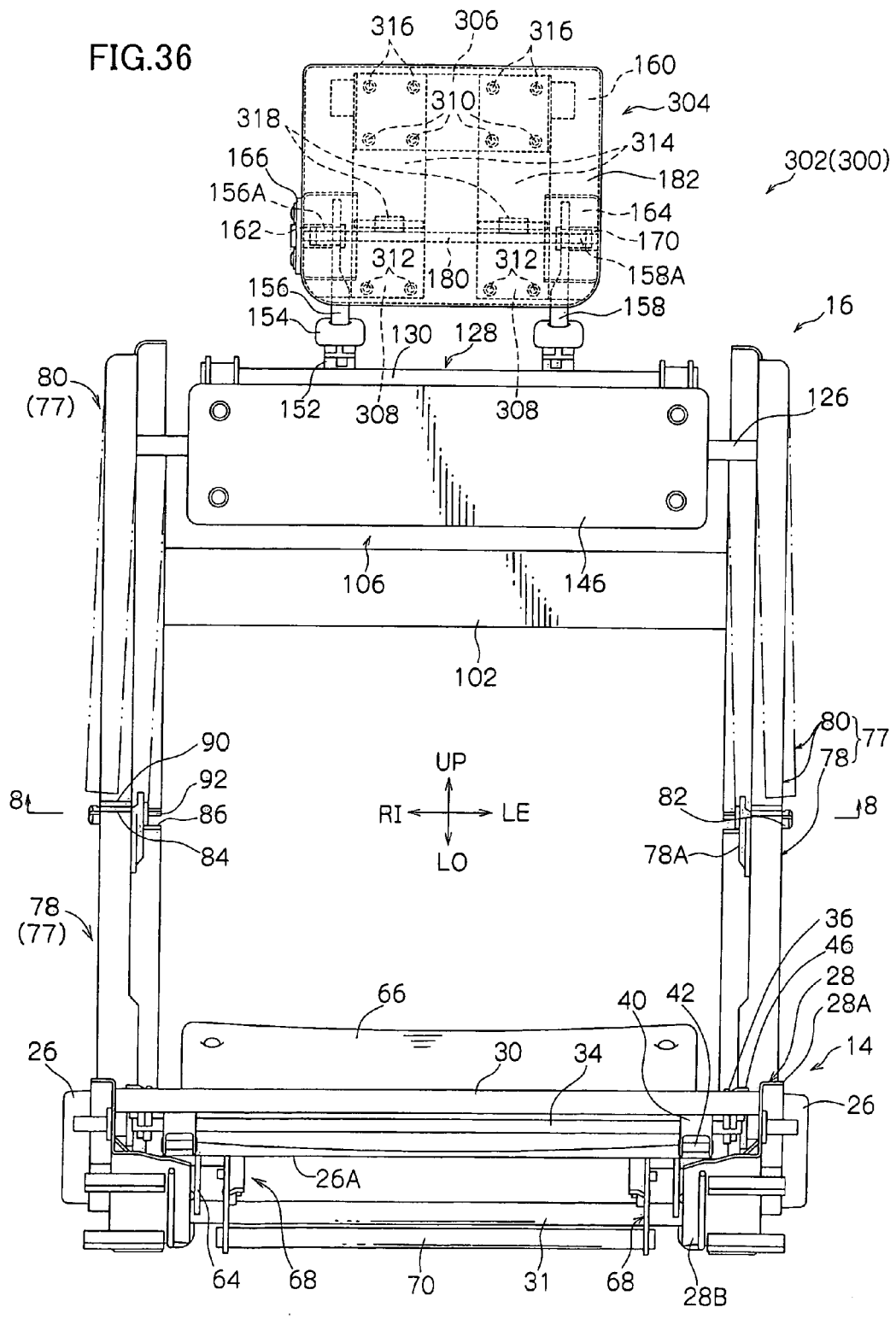
FIG. 36 is a front view of the seat frame which constitutes the vehicle seat according to the fourth embodiment of the invention.

FIG. 34 shows a perspective view of a partially disassembled vehicle seat 300 and FIGS. 35, 36 show a side view and a front view of a seat frame 303 which constitutes the vehicle seat 300. As shown in these Figures, the seat frame 302 is different from the seat frame 12 of the second embodiment in that it possesses a head rest frame 304 which constitutes the head rest 25 instead of the head rest frame 18.

The head rest frame 304 has the rear half 160 which is connected to the first pole 156 and the second pole 158 supported by the head rest moving mechanism 106 such that it is rotatable in the direction of the arrow H through the torsion bar 180 or the like.

As shown in FIG. 37, a plate spring base 306 is fixed in the vicinity of the top end of the rear half 160 and the top ends of the paired right and left plate springs 308 are fixed to the bottom of the plate spring base 306 with rivet 310. The bottom end portion of each plate spring 308 is located forward of the top end portion and a portion in the vicinity of the bottom end of the front half 182 is fixed to that bottom end portion with the rivet 312.

That is, the head rest frame 304 is coupled with the front half 182 and the rear half 160 through the plate spring 308 such that it can be separated instead of the holding members 184, 186 (bearing portions 188, 194), the supporting shafts 190, 196, the torsion bar 200 and the like.

The top end portions of paired right and left supplementary plate springs 314 are fixed to the top portion of the plate spring base 306 with the rivet 316. The respective supplementary plate springs 314 are disposed apart at a predetermined distance above the different plate springs 308.

A roller 318 is attached freely rotatably to the bottom end portion of each supplementary plate spring 314 and each roller 318 makes contact with a portion above the rivet 312 (fixing position of the plate spring 308) on the rear face of the front half 182. With this condition, the respective plate springs 308 and the respective supplementary plate springs 314 are set to such dimensions allowing them to be located substantially in parallel.

With this condition, an opening portion 320 which is a gap in the front-rear direction is formed between the top end of the rear half 160 and the top end of the front half 182 and the top end of the front half 182 is allowed to approach the rear half 160 (move backward). Accompanied by a move of the front half 182 to the rear half 160, a reaction force is generated based on the elastic deformation of the respective plate spring 308 and the respective supplementary plate spring 314.

Figure 38:
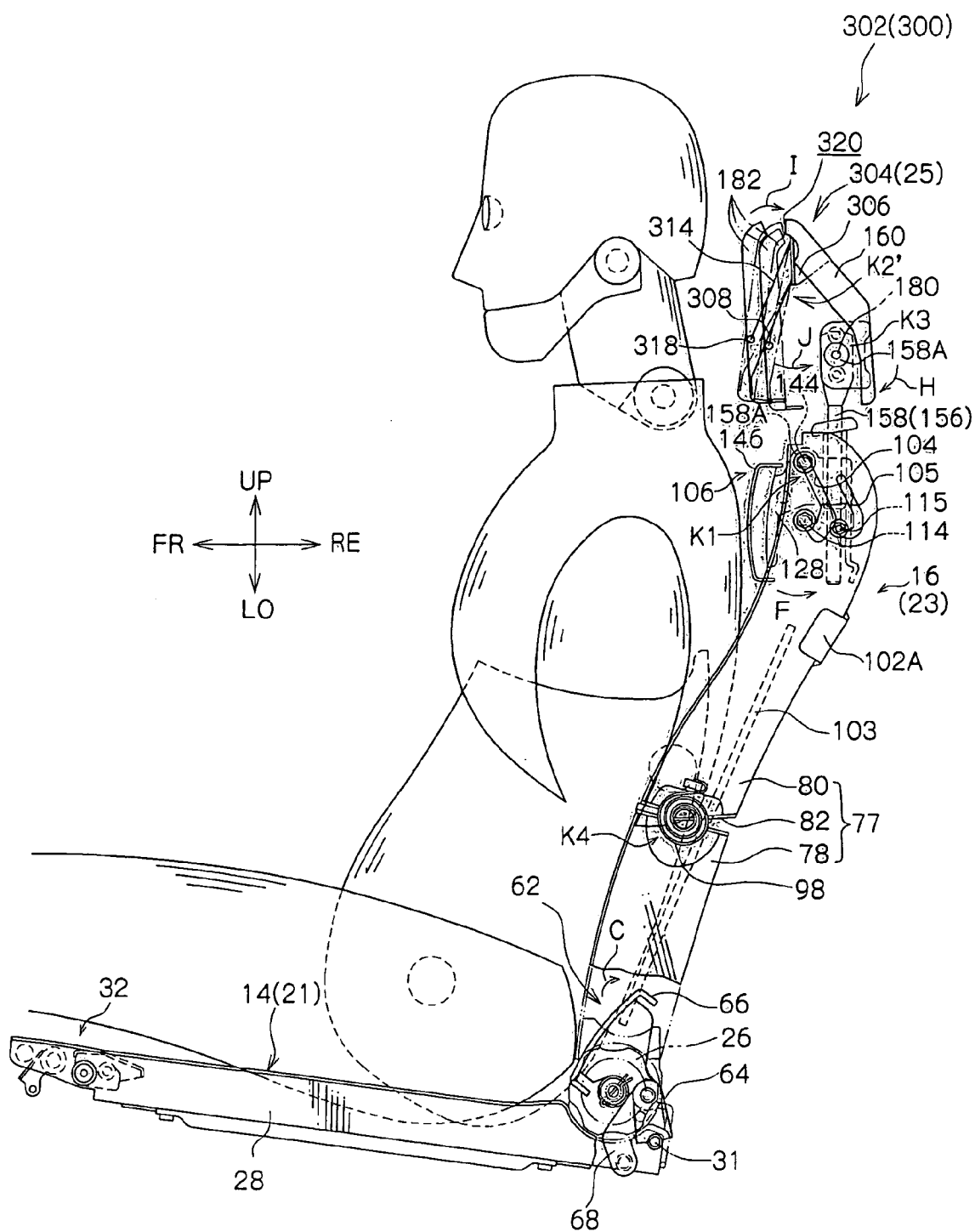
FIG. 38 is a side view showing a modification of the head rest frame which constitutes the vehicle seat according to the fourth embodiment of the invention.

More specifically, if a backward directed force is applied to the vicinity of the top end of the front half 182, the front half 182 rotates (tilts backward) in the direction of an arrow I indicated in FIG. 37 around a supporting point (virtual supporting point) which is located between a fixing position of the plate spring 308 and a contact position of the roller 318, moving the top end portion thereof substantially backward in a downward direction so as to close the opening portion 320 (see the condition indicated with tow-dots and dash line in FIG. 38).

The position of the supporting point when the front half 182 rotates relative to the rear half 160 is determined by the height of a load application point in the vicinity of the top end of the front half 182 and spring constant ratio between the plate spring 308 and the supplementary plate spring 314.

The state indicated with the two-dot and dash line in FIG. 38 exemplifies a case where the front half 182 rotates in the direction of the arrow I around the vicinity of the contact position of the roller 318. Because at this time, the front half 182 presses the roller 318 downward in a backward direction while deforming the supplementary plate spring 314, an urging force of the supplementary plate spring 314 acts as a reaction force accompanied by the rotation (tilting backward) of the front half 182. Further, because the plate spring 308 is deformed in the direction of an arrow J around the fixing position (or the vicinity thereof) to the plate spring base 306 by a backward force acting on the front half 182, the front half 182 receives the urging force accompanied by the deformation of the plate spring 308 as a reaction force and moves backward.

In the above described process, the front half 182 moves from the steady position indicated with a solid line in FIG. 38 through an intermediate position indicated with a two-dot and dash line to a position indicated by a dot and dash line, absorbing the aforementioned force (impact force).

If a backward moving force transmitted from the front half 182 to the rear half 160 exceeds a predetermined force, that is, the amount of deformation of the plate spring 308 and the supplementary plate spring 314 exceeds a predetermined deformation amount, the torsion bar 180 is twisted and the head rest 25 (head rest frame 304) rotates in the direction of an arrow H relative to the back frame 16 resisting a reaction force based on the twisting load of the torsion bar 180.

In the head rest 25 constituted of the head rest frame 304, even if the head portion of the a seat occupant makes contact with the vicinity of the top end so that a backward impact force is applied, first, the front half 182 is deflected to the rear half 160 securely.

If the backward impact force is applied to an intermediate portion in the vertical direction of the front half 182 or the lower portion thereof, the front half 182 rotates based on deformation of the respective plate springs 308 in the direction of the arrow J and approaches the rear half 160 resisting a reaction force generated by deformation of the plate spring 308 and the supplementary plate spring 314 and before the torsion bar 180 is twisted, absorbs the impact force.

Urethane member (urethane foam) 322 is loaded as dampening member between the front half 182 and the rear half 160. Consequently, because the urethane member 322 is deformed accompanied by the deformation of the front half 182 to the side of the rear half 160, dampening force is generated as a reaction force and therefore, a backward impact force (energy) acting on the head rest 25 is dampened and absorbed further effectively.

As shown in FIG. 37, the urethane member 322 is loaded between the outer surface of the head rest frame 304 and the surface skin 202, it forms a cushion material for constituting the head rest 25 instead of the cushion material 24 composed of the three-dimensional knitted structure 210. Further, the bottom of the head rest 25 is closed with sheet-like member 324.

Figure 39:
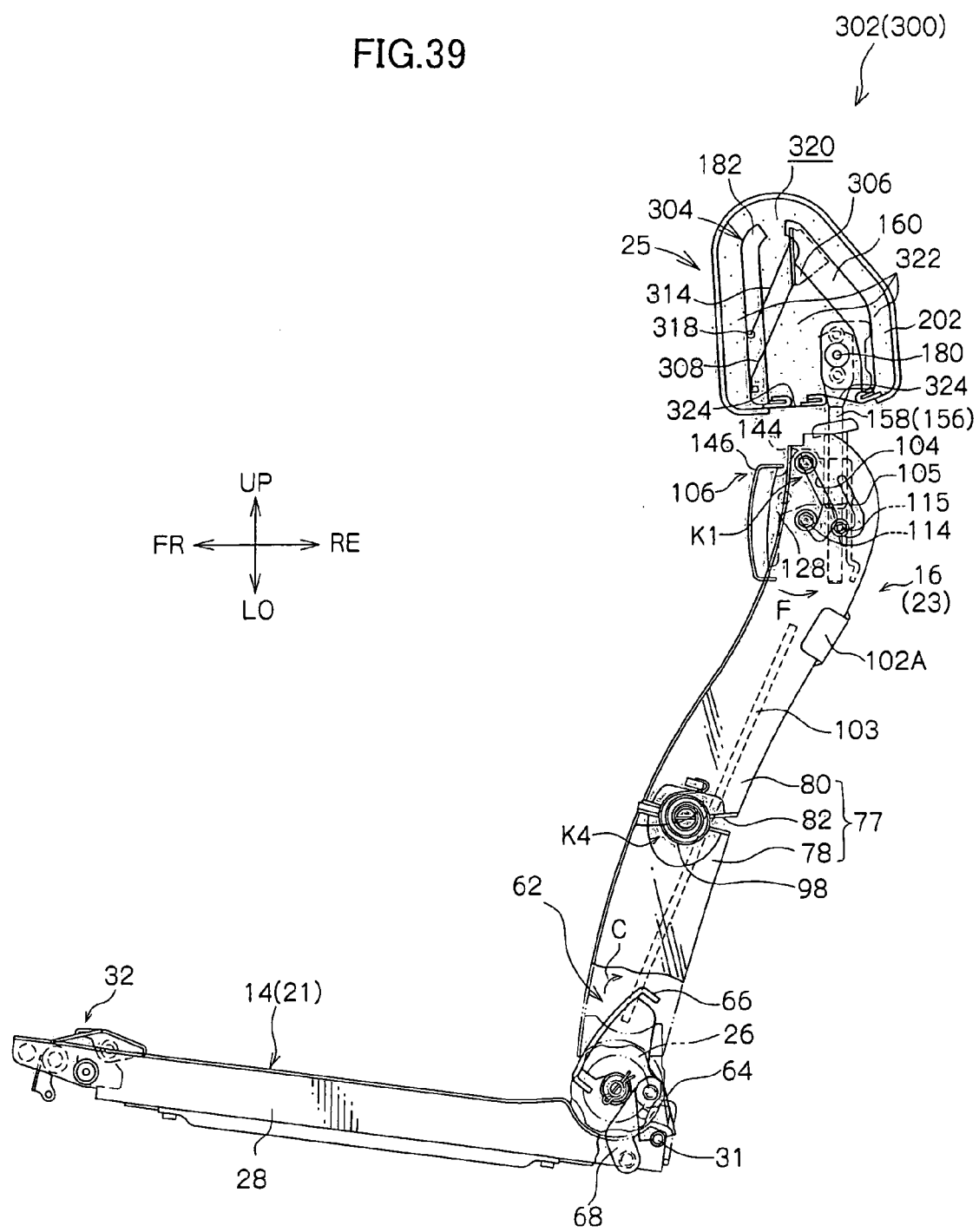
FIG. 39 is a side view showing a modification of the head rest which constitutes the vehicle seat according to the fourth embodiment of the invention.
Figure 40:
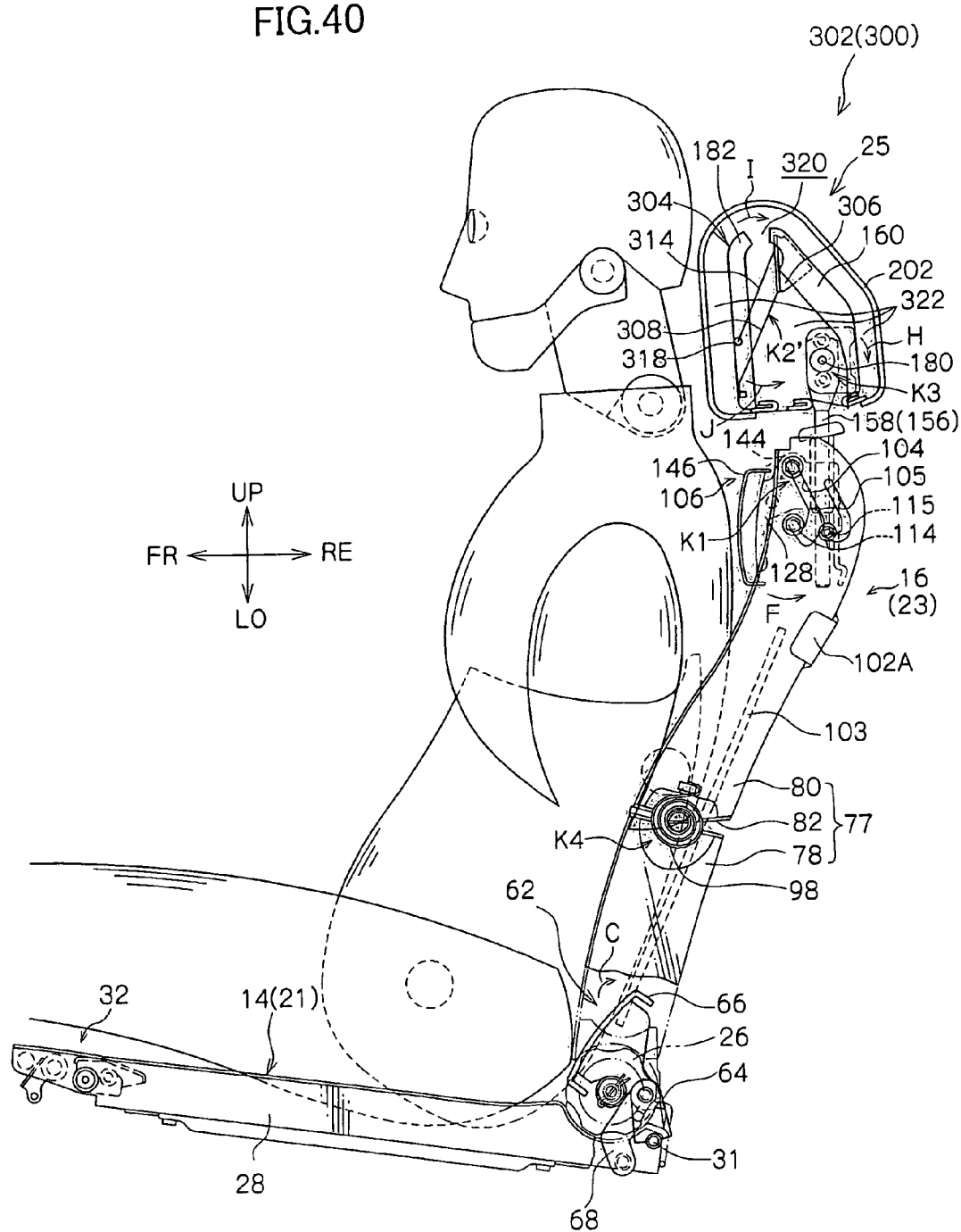
FIG. 40 is a side view showing a modification of the head rest which constitutes the vehicle seat according to the fourth embodiment of the invention.

A portion which constitutes a cushion material outside the head rest frame 304 in the urethane member 322 may be formed thicker than the cushion material 24 corresponding to a required characteristic as shown in FIGS. 39, 40.

The cushion material 24 composed of the three-dimensional knitted structure 210 may be provided between the outer surface of the head rest frame 304 and the surface skin 202 like the second embodiment (conversely, it is permissible to load the urethane member 322 within the head rest frame 18 of the second or third embodiment, that is, between the front half 182 and the rear half 160.)

As described above, the head rest frame 304 constitutes the multi-joint structure link mechanism with the joint K3 and a pseudo link K2' which has no a joint shaft but can be regarded as a joint in a wide meaning, enabling a relative displacement between the front half 182 and the rear half 160 with the plate spring 308 and corresponds to the second link mechanism and the impact absorbing head rest mechanism of the invention. Further, the plate spring 308, the supplementary plate spring 314 and the urethane 322 correspond to the buffering member or the second buffering member of the invention.

The plate spring 308, the supplementary plate spring 314, the urethane member 322 and the torsion bar 180 generate a reaction force corresponding to changes in the joint angle.

Like the second embodiment, the reaction force generated by the torsion bar 180, the plate spring 308 and the supplementary plate spring 314 is set to be as strong as it restricts a displacement (velocity) of the head portion so that the seat occupant is protected from whiplash when a collision from backward occurs and as weak as a load acting on the head portion does not become excessive in impact absorbing process (lowering the load peak).

Basically, the other structure of the vehicle seat 300 is the same as those of the vehicle seat 10 and the vehicle seat 250.

In the vehicle seat 300 of the third embodiment, if the head portion of a seat occupant presses the head rest 25 backward at the time of, for example, a collision from backward, the head rest frame 304 generates a reaction force based on the elastic force and dampening force of the respective plate spring 308 and the supplementary plate spring 314 and the front half 182 moves backward (approaches the rear half 160), absorbing the impact energy.

That is, if the impact load acts on the top portion of the head rest 25, the opening portion 320 is eliminated and the front half 182 moves in the directions of the arrow I and the arrow J in a complex way and approaches the rear half 160. If the impact load acts on an intermediate portion in the vertical direction and the bottom portion of the head rest 25, the front half 182 rotates mainly in the direction of the arrow J and approaches the rear half 160, relaxing a load applied to the head portion of the seat occupant.

When the load transmitted from the front half 182 to the rear half 160 through the plate spring 308, the supplementary plate spring 314 and the urethane member 322 exceeds a predetermined level, a reaction force is generated based on an elastic twisting load of the torsion bar 180 and the rear half 160 rotates in the direction of the arrow H (with the front half 182), absorbing the impact energy.

In the head rest frame 304 like in the head rest frame 18, the respective joints K2', K3' deflect (in terms of angle) with a passage of time depending on a difference between the reaction force generated at each time and the backward moving load on the head portion of the seat occupant, absorbing the impact energy on the head portion of the seat occupant.

The vehicle seat 300 of the third embodiment is capable of obtaining just the same effect as the vehicle seat 10 (or vehicle seat 250) and the front half 182 is coupled to the rear half such that it is capable of deflecting relatively through the plate spring 308 and the supplementary plate spring 314 so as to form the opening portion 320. Thus, even if the head portion of the seat occupant presses the vicinity of the top end of the head rest 25, the front half 182 deflects securely relative to the rear half 160 prior to absorption of an impact by the torsion bar 180, and the respective joints K2', K3 deflect with a passage of time so as to absorb an impact energy on the head portion of the seat occupant effectively.

Further, because the urethane member 322 is loaded within the head rest frame 304, namely between the front half 182 and the rear half 160, which deflect relatively, the aforementioned impact energy can be dampened and absorbed further effectively by a dampening force (internal dampening) accompanied by deformation of the urethane member 322.

Although the second to fourth embodiment includes a preferable structure in which the seat frames 12, 302 have the joints K1–K5 (pseudo joint K2' instead of the joint K2), the invention is not restricted to this example, but for example, the seat frame 12 may be constituted of only the joint K1–K4 and the seat frame 12 may be constituted of part or all of the joint K1–K5 with other joints instead of the above-mentioned joints K1–K5.

Further, the invention is not restricted to such a preferable structure in which the link mechanism L2 (head rest frame 304) which is the head rest frame 18 possesses two joints K2 (K2'), K3 but the link mechanism L2 may be constituted of one joint or three or more joints. Conversely, any of the link mechanisms L1, L3, L4 may be constituted of two or more joints.

Although according to the second-fourth embodiment, the side frame upper 80 is preferably structured to be capable of deflecting in the right and left direction (rotating in the direction of the arrow E) relative to the side frame lower 78, the invention is not restricted to this example.

The side frame upper 80 may be coupled to the side frame lower 78 so that it is capable of rotating and returning only in the direction of the arrow D relative to the side frame lower 78 and the side frame upper 80 may be structured to deflect in the front-rear direction relative to the side frame lower 78 so as to absorb a body vibration of the seat occupant. That is, the joint K4 is not restricted to the structure having two stages of freedom but may be structured in a single stage of freedom.

Further, the invention is not restricted to such a preferable structure of multi-joint structure but for example, the side frame upper 80 in the back frame 16 over which a tension structure is provided in a stretched manner may be structured to be capable of deflecting only in the right and left direction relative to the side frame lower 78.

Further, the second to fourth embodiments exemplify a preferable spring constant characteristic of the cushion material to be provided in a stretched manner over the seat frame 12 and a stretch structure of the cushion materials 252, 254. However, the invention satisfies its own object if it is provided with any one of the seat frame 12 of multi-joint structure, the head rest moving mechanism 106, the pelvis plate mechanism 62, the mechanism for absorbing a body vibration accompanied by breathing of the seat occupant (mechanism which allows a rotation in the direction of the arrow E of the side frame upper 80 in the impact absorbing side frame 77) and any mechanism equivalent to these and the invention is not restricted by any preferable structure of the cushion materials 22, 252.

Further, although according to the above-described respective embodiments, the invention concerns the structure of a vehicle seat, the invention is not restricted to this example, but the invention can be applied to seats of train, ship, airplane and other transportation machine, office chair, furniture chair and other various kinds of seats.

As described above, the seat of the invention has excellent effects of effectively absorbing an impact applied to an occupant of the seat.

What is claimed is:

1. A seat, comprising:
    a seat cushion;
    a seat back frame connected to said seat cushion, the seat back frame being adapted to bend in a range of a specific bending angle in a direction of moving a top end thereof backward by a backward load over a predetermined value, by way of a joint provided at an intermediate portion in the vertical direction, such that the seat back frame receives a reaction force corresponding to the bending angle, wherein said seat back frame comprises a lower frame connected to the seat cushion, an upper frame whose bottom end portion is connected to a top end portion of said lower frame such that the upper frame is capable of bending in the front-rear direction by way of said joint, and a buffering member which generates a reaction force in said upper frame corresponding to an angle at which said upper frame is bent backward relative to the lower frame; and
    a stopper positioned to restrict a forward limit of the specific bending angle of the seat back frame to an angle wherein the direction of the length of a portion of said upper frame adjacent said lower frame is substantially an extension of the direction of the length of a portion of said lower frame adjacent said upper frame, whereby the bending of the seat back frame in the range of a specific bending angle in a direction of moving the top end thereof backward by a backward load over a predetermined value comprises moving the top end backward from a position wherein the direction of the length of the portion of said upper frame adjacent said lower frame is substantially an extension of the direction of the length of the portion of said lower frame adjacent said upper frame.

2. A seat comprising:
    a pair of lower side frames each bottom end portion of which is attached to each of right and left ends of a seat cushion;
    a pair of upper left and right side frames, bottom end portions of which are coupled to the top end portions of said paired lower side frames so that the bottom end portions of the upper side frames are displaceable in at least one of front-rear direction, right and left direction and rotating direction;
    an elastic member which is provided between said lower side frame and the upper side frame and generates a reaction force corresponding to displacement of the upper side frame with respect to the lower side frame; and
    a cushion material composed of a tension structure body provided in a stretched manner over said lower side frame and upper side frame.

3. The seat according to claim 2, wherein said cushion material containing said elastic member has, as elasticity characteristic, a Duffing type non-linear characteristic in which spring constant in the vicinity of a point of equilibrium is smaller than spring constants at points other than the vicinity of the point of equilibrium.

4. The seat according to claim 3, wherein the spring constant in the vicinity of the point of equilibrium of said cushion material containing said elastic member is in a range of 0 N/mm to 49 N/mm.

5. A seat, comprising:
a seat cushion; and
a seat back frame coupled to said seat cushion, said seat back frame including:
at least one joint which is provided at a predetermined position higher than the gravity of a seat occupant, in the vertical direction of said seat back frame, and when a backward load over a predetermined value is applied on the seat back frame, a joint angle of the joint changes corresponding to the load within a predetermined range of angle; and a buffering member which is provided at each joint and generates a reaction force corresponding to each joint angle which changes depending on the load, wherein, when said load is applied on said seat back frame, said seat back frame is bent at each joint at each joint angle in a direction of moving the top end backward, each joint angle having been changed in accordance with said load, and said seat back frame is adapted to receive a reaction force corresponding to each joint angle thus changed from said buffering member.

6. The seat according to claim 5, wherein when the joint angle of a specific joint reaches a predetermined joint angle by an external force acting on the seat occupant, the joint angle of another joint coupled to that joint changes so as to deform said frame, whereby a reaction force generated accompanied by the deformation acts in the direction of restoring said frame.

* * * * *